United States Patent
Yamashita et al.

(10) Patent No.: US 11,232,593 B2
(45) Date of Patent: Jan. 25, 2022

(54) CALIBRATION APPARATUS, CALIBRATION SYSTEM, AND CALIBRATION METHOD

(71) Applicant: Sony Interactive Entertainment Inc., Tokyo (JP)

(72) Inventors: Noriyuki Yamashita, Tokyo (JP); Akio Ohba, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 46 days.

(21) Appl. No.: 16/643,678

(22) PCT Filed: May 9, 2018

(86) PCT No.: PCT/JP2018/018015
§ 371 (c)(1),
(2) Date: Mar. 2, 2020

(87) PCT Pub. No.: WO2019/049421
PCT Pub. Date: Mar. 14, 2019

(65) Prior Publication Data
US 2020/0273205 A1    Aug. 27, 2020

(30) Foreign Application Priority Data

Sep. 8, 2017 (WO) .................. PCT/JP2017/032563

(51) Int. Cl.
G06T 7/80    (2017.01)
G06T 7/70    (2017.01)
(Continued)

(52) U.S. Cl.
CPC .............. G06T 7/80 (2017.01); G06T 5/006 (2013.01); G06T 7/70 (2017.01); G06T 15/20 (2013.01);
(Continued)

(58) Field of Classification Search
CPC .. G06T 7/80; G06T 7/70; G06T 5/006; G06T 15/20; G06T 2207/30244; H04N 17/002; H04N 17/00
See application file for complete search history.

(56) References Cited

U.S. PATENT DOCUMENTS 8,169,527 B2    5/2012 Yamaoka
9,361,562 B1 *  6/2016 Hanina ................ G06K 7/1408
(Continued)

FOREIGN PATENT DOCUMENTS

CN    101305596 A    11/2008
CN    103136747 A2   6/2013
(Continued)

OTHER PUBLICATIONS

Kashyap et al. ("Fisheye Camera Calibration and Applications", Arizona State University, Dec. 2014). (Year: 2014).*
(Continued)

Primary Examiner — Kee M Tung
Assistant Examiner — Khoa Vu
(74) Attorney, Agent, or Firm — Matthew B. Dernier, Esq.

(57) ABSTRACT

In a calibration apparatus, a captured image acquisition unit acquires data of an image of a calibration chart captured by a fish-eye imaging apparatus. A distortion correction unit makes an assumption of a parameter of the imaging apparatus, takes into account a projection system to make a correction, and adjusts the parameter until an image of the original chart is obtained. A pseudo image drawing unit uses model data of a chart to draw a pseudo captured image. A point-of-view adjustment unit compares the pseudo image and the captured image and adjusts a point-of-view position of a virtual camera according to a difference between
(Continued)

positions of markers or intervals of patterns to specify a position of the imaging apparatus.

19 Claims, 32 Drawing Sheets

(51) Int. Cl.
*G06T 5/00* (2006.01)
*G06T 15/20* (2011.01)
*H04N 17/00* (2006.01)

(52) U.S. Cl.
CPC . *H04N 17/002* (2013.01); *G06T 2207/30244* (2013.01)

(56) References Cited

U.S. PATENT DOCUMENTS

| | | | |
|---|---|---|---|
| 10,178,314 B2 | 1/2019 | Morimoto | |
| 2005/0122400 A1* | 6/2005 | Kochi | G06T 5/006 348/207.99 |
| 2009/0041378 A1 | 2/2009 | Yamaoka | |
| 2011/0228103 A1* | 9/2011 | Takemoto | G06T 7/80 348/187 |
| 2013/0135474 A1 | 5/2013 | Sakano | |
| 2013/0258047 A1 | 10/2013 | Morimoto | |
| 2014/0375845 A1* | 12/2014 | Lee | G06T 5/003 348/241 |
| 2016/0373734 A1* | 12/2016 | Cole | H04N 17/002 |
| 2017/0243374 A1* | 8/2017 | Matsuzawa | G01B 11/00 |

FOREIGN PATENT DOCUMENTS

| | | |
|---|---|---|
| CN | 104809739 A | 7/2015 |
| CN | 106815805 A | 6/2017 |
| EP | 0999518 A1 | 5/2000 |
| JP | 2003141521 A | 5/2003 |
| JP | 2012085026 A | 4/2012 |
| JP | 2013115540 A | 6/2013 |
| WO | 2007055336 A1 | 8/2007 |
| WO | 2012120561 A1 | 9/2012 |

OTHER PUBLICATIONS

The First Office Action for corresponding CN Application 201880058435.8, 33 pages, dated Jan. 26, 2021.
International Preliminary Report on Patentability and Written Opinion for corresponding PCT Application PCT/JP2018/018015, 4 pages, dated Mar. 19, 2020.
International Search Report for corresponding PCT Application PCT/JP2018/018015, 4 pages, dated Aug. 14, 2018.
International Search Report for corresponding PCT Application PCT/JP2017/032563, 3 pages, dated Dec. 5, 2017.
Zhengyou Zhang, "A Flexible New Technique for Camera Calibration," Microsoft Research Technical Report, MSR-TR-98-71, 22, pages, dated Dec. 2, 1998.

* cited by examiner (a)　　　　　　　　　　　(b)

FIG.21
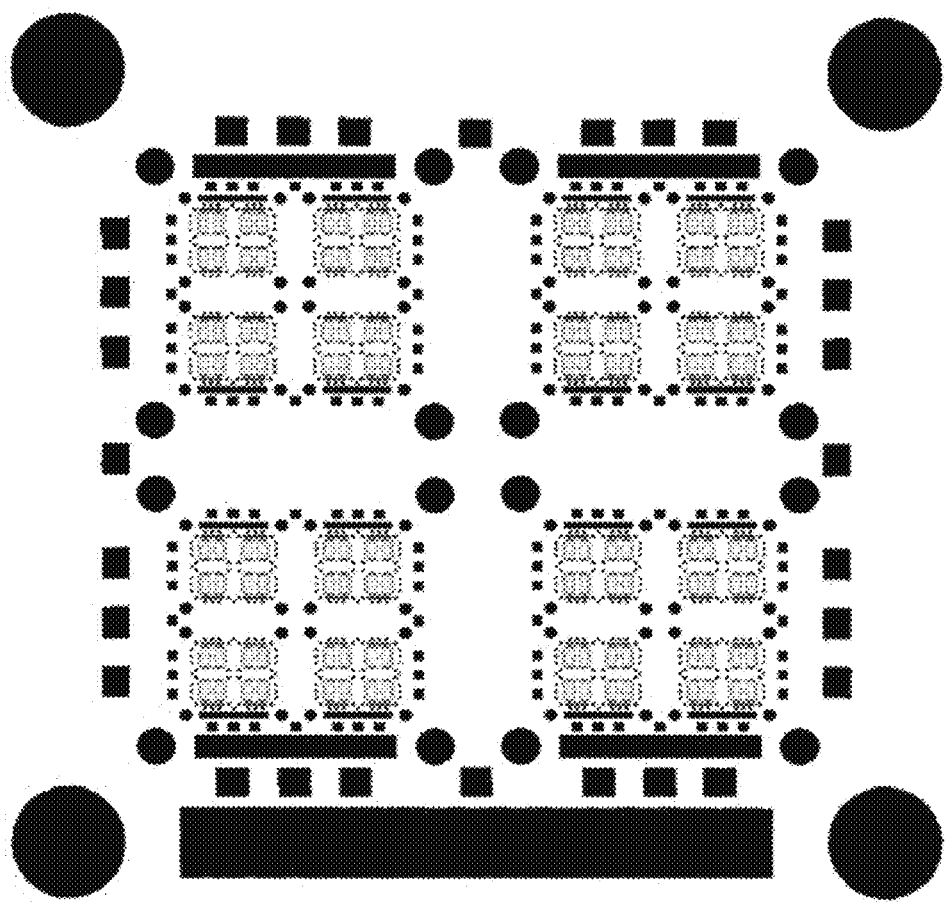
FIG.22
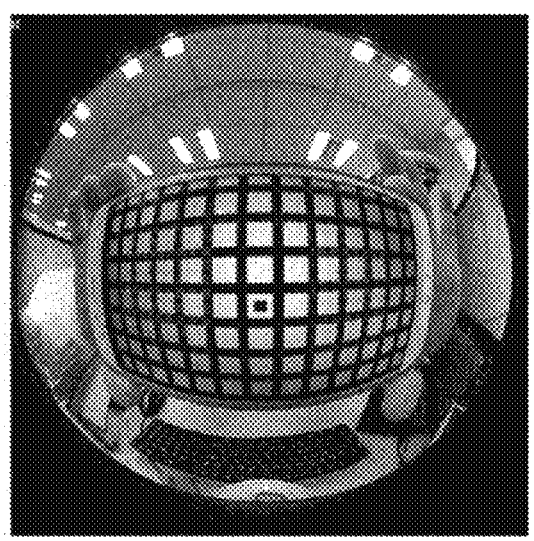 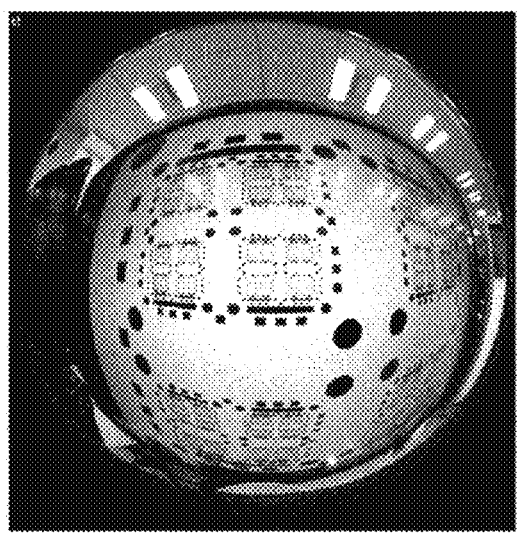
(a)  (b)

FIG. 24
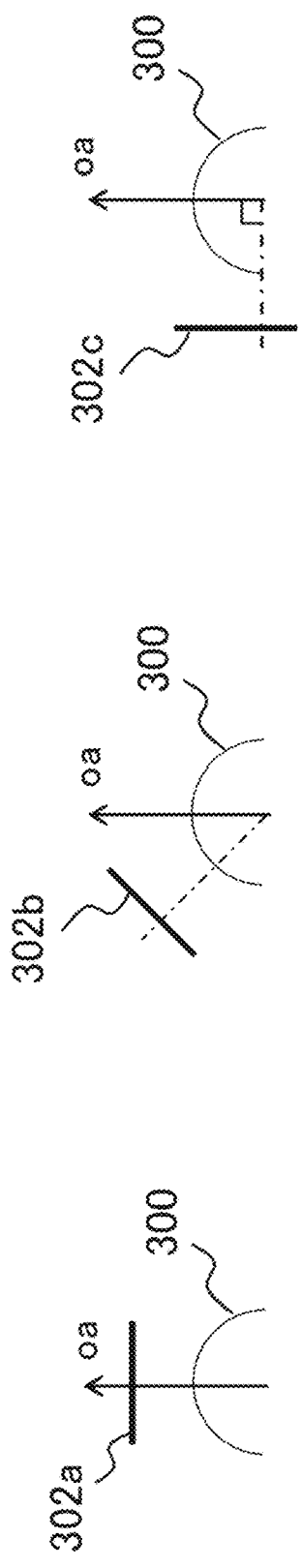
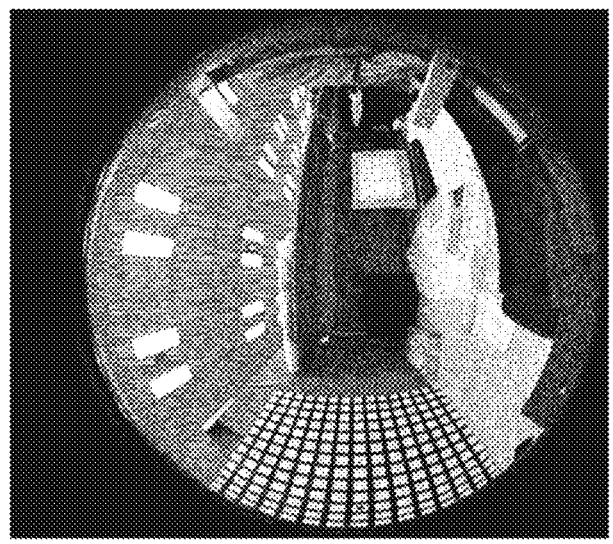
(c)
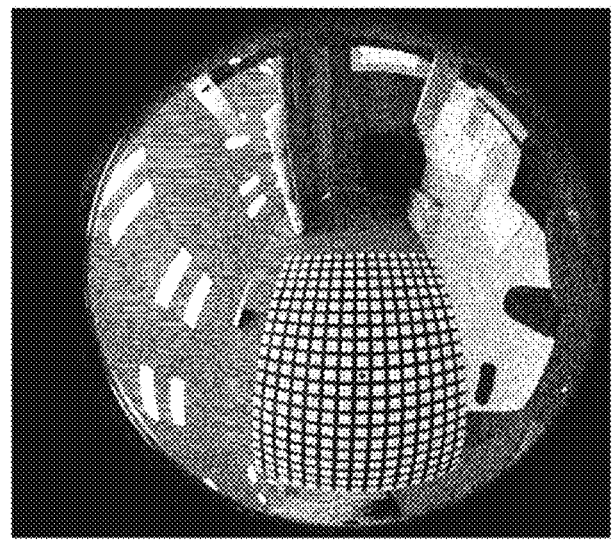
(b)
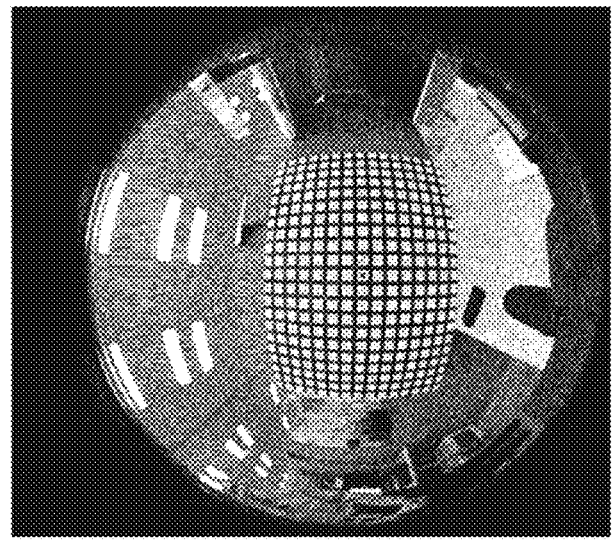
(a)

FIG. 26
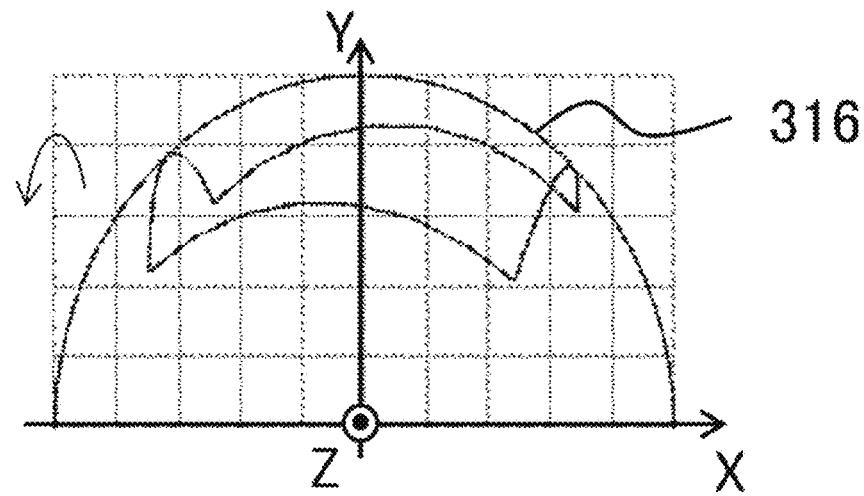
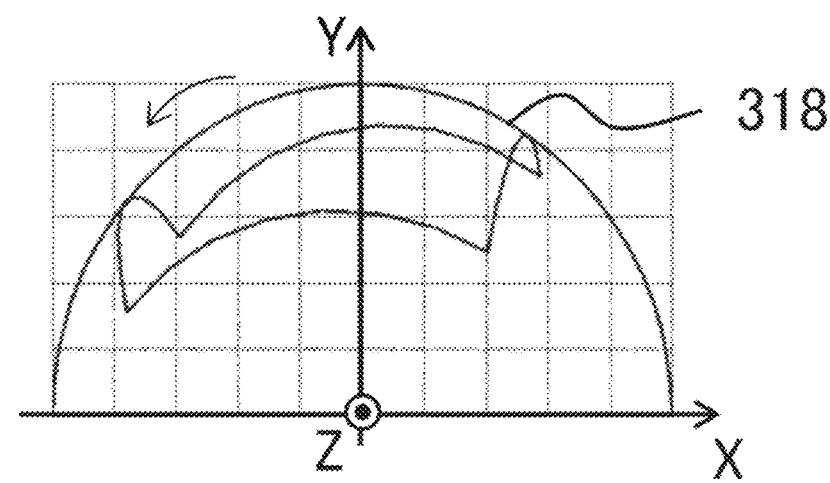
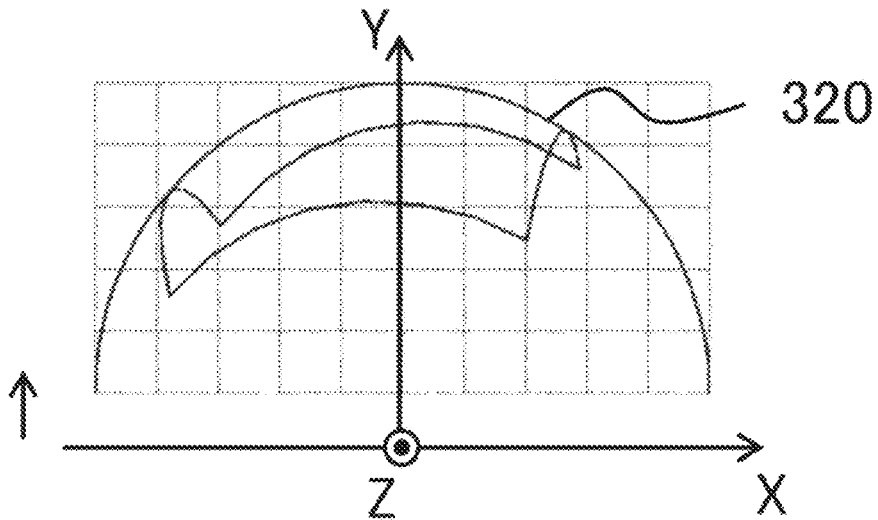

FIG. 28
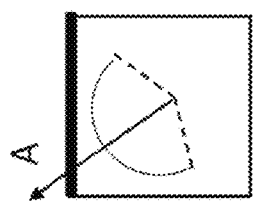
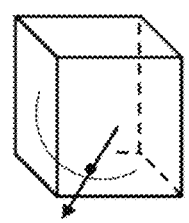
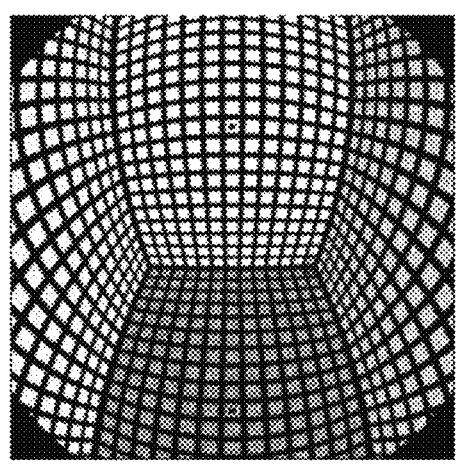
(b)
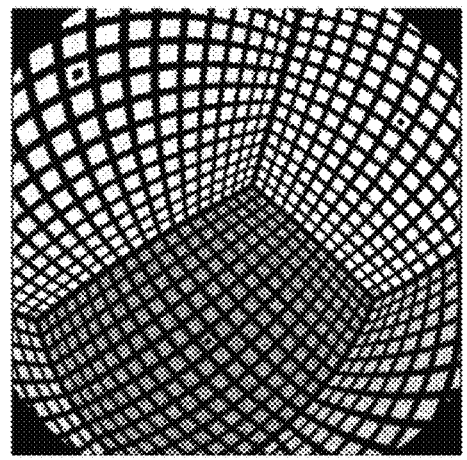
(d)
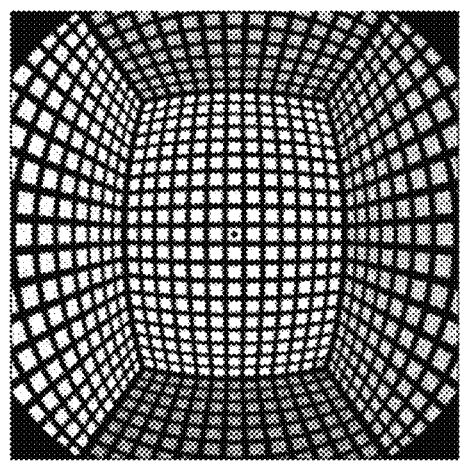
(a)
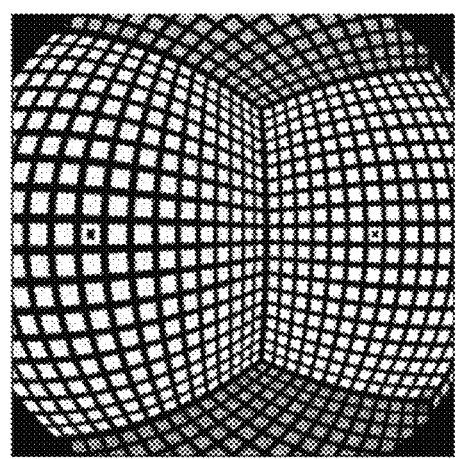
(c)
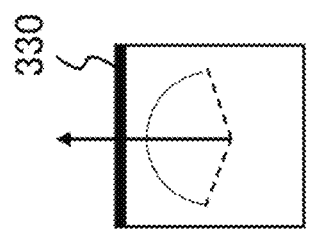
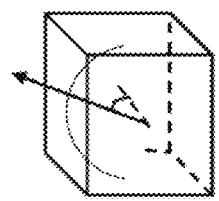

FIG. 29
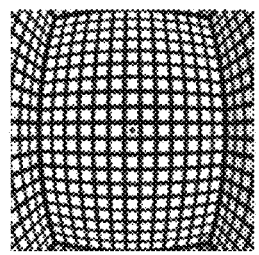
(a)
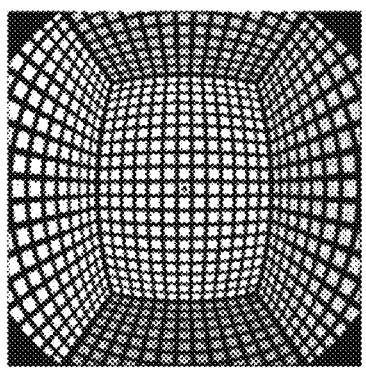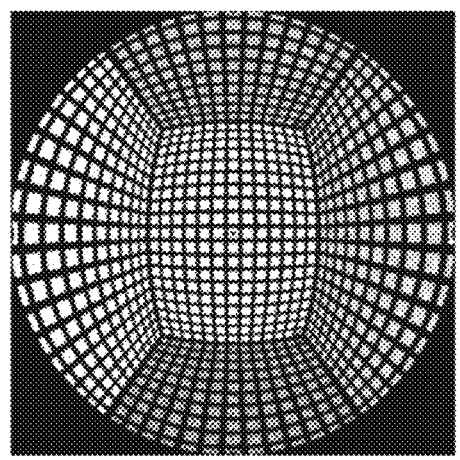
(b) (c)
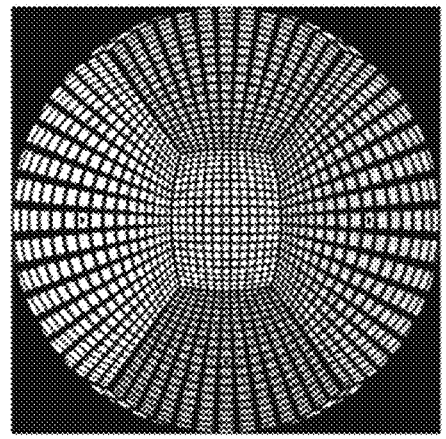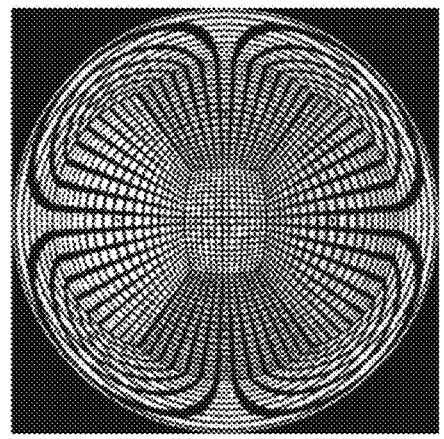
(d) (e)

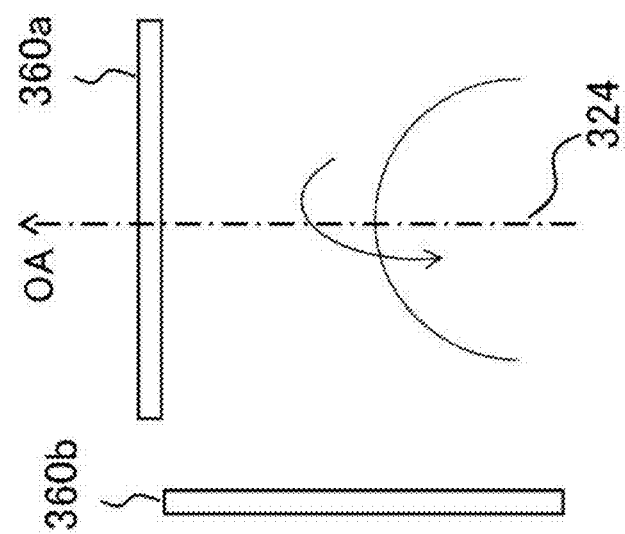
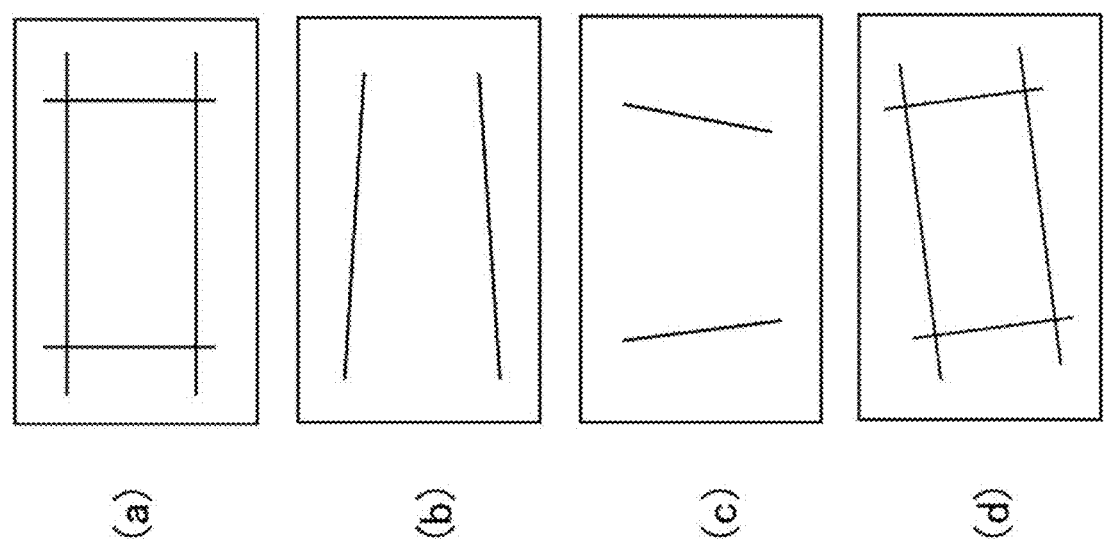
FIG. 35

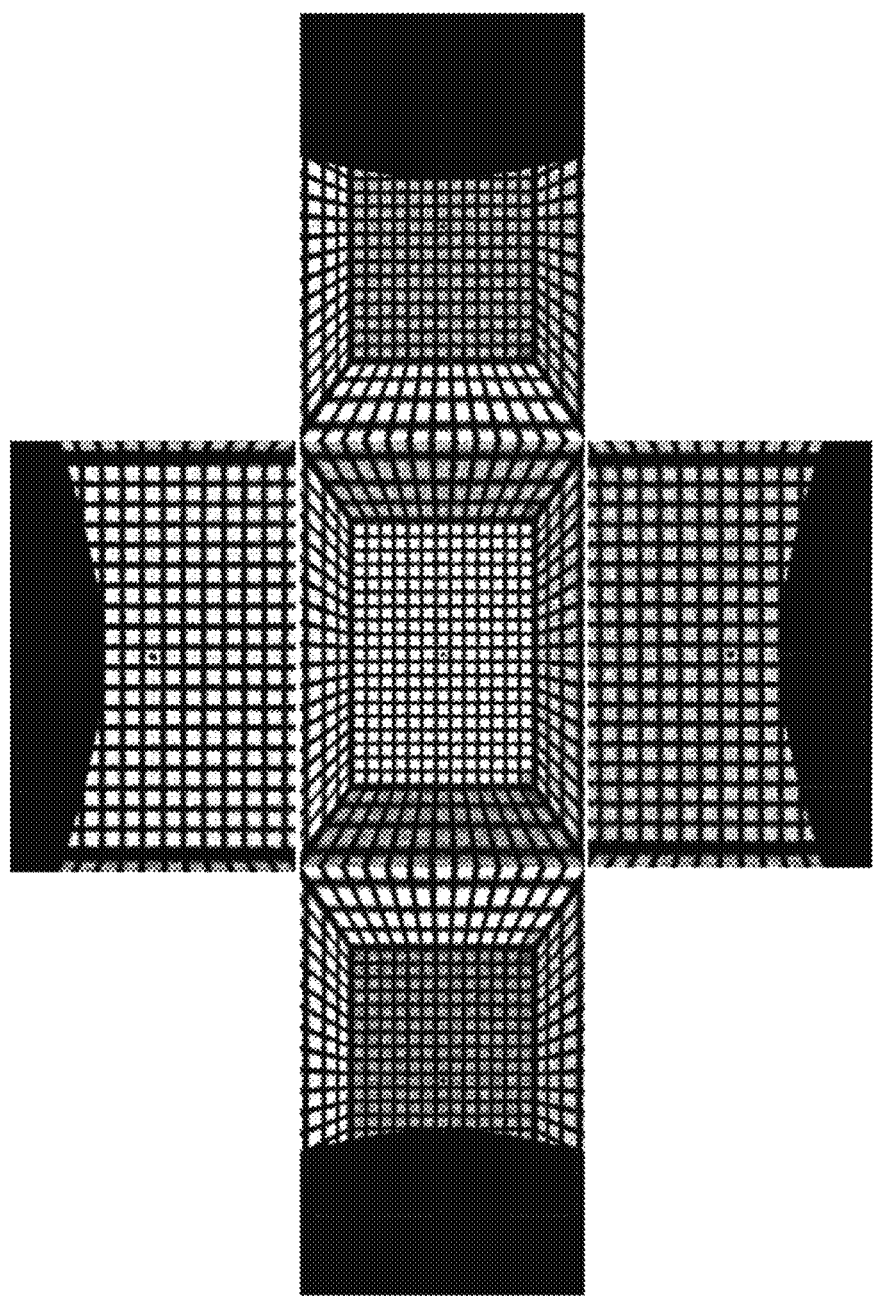
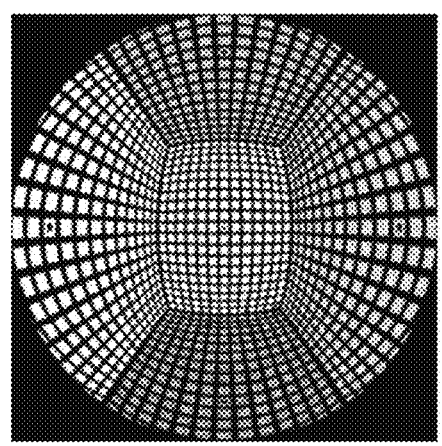
FIG. 37

FIG. 38
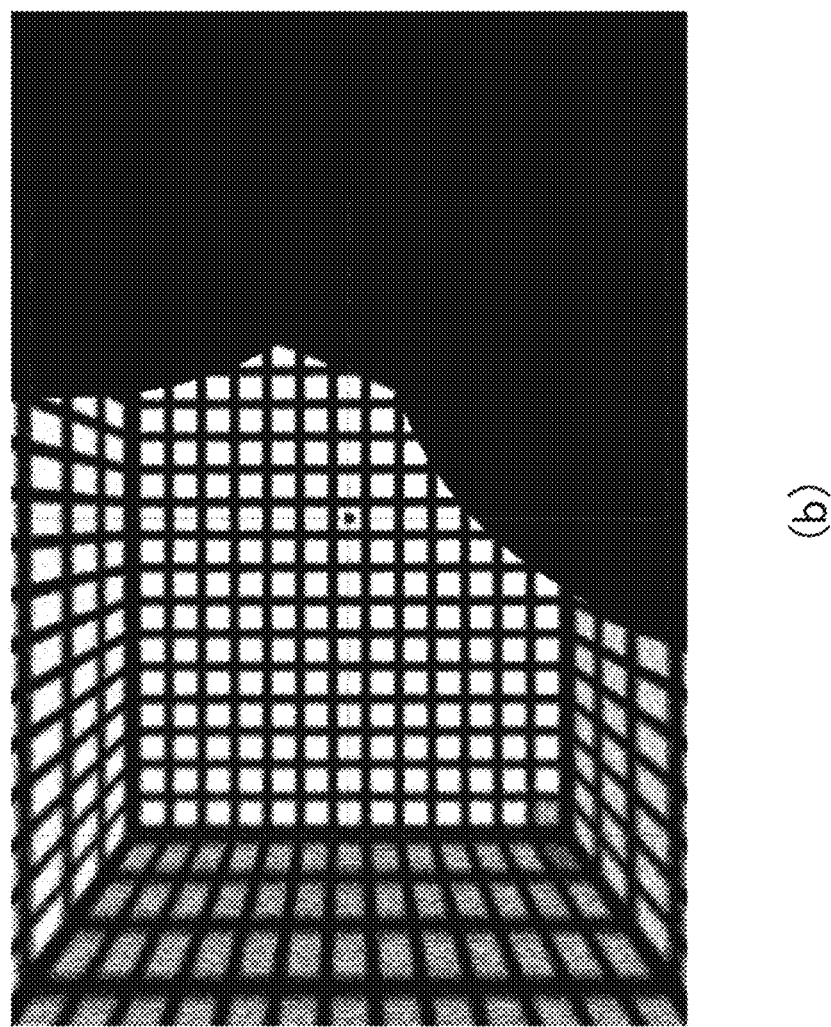
(b)
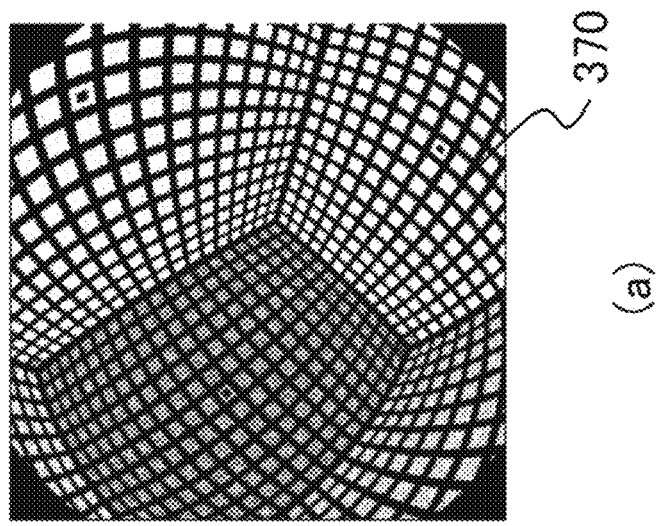
(a)
370

CALIBRATION APPARATUS, CALIBRATION SYSTEM, AND CALIBRATION METHOD

CROSS REFERENCE TO RELATED APPLICATIONS

This application is a National Stage application claiming priority to International Application No.: PCT/JP2018/018015, filed on May 9, 2018, which claims priority to International Application No.: PCT/JP2017/032563, filed on Sep. 8, 2017, the entire disclosures of which are hereby incorporated by reference.

TECHNICAL FIELD

The present invention relates to an apparatus, a calibration system, and a calibration method for realizing calibration of an imaging apparatus.

BACKGROUND ART

There is a known game, in which a camera images the body of a user or a marker, and a region of the image is replaced with another image and displayed on a display (for example, see PTL 1). A technique of detecting and analyzing an image in a captured image to acquire the position or the motion of a subject or a camera or to recognize attributes of the subject is widely implemented not only in a camera mounted on a gaming apparatus or an information terminal, but also in systems including a security camera, a vehicle-mounted camera, a robot-mounted camera, and the like.

To guarantee the processing accuracy in the systems, a calibration process of acquiring, in advance, information specific to an apparatus, such as an internal parameter of an imaging apparatus, a distortion correction coefficient, and an external parameter, is executed. The internal parameter defines a relationship between position coordinates of pixels in a captured image and position coordinates in a camera coordinate system, in which the origin is at the optical center, and the unit is length. The distortion correction coefficient is a coefficient for correcting barrel distortion or distortion in the circumferential direction caused by the lens.

The external parameter defines a relationship between the camera coordinate system and a world coordinate system, and the external parameter is particularly used to, for example, perform the calibration at the same time for a multi-lens camera, such as a stereo camera, to adjust the slopes of the images captured by the cameras. An example of a widely known calibration technique includes a Zhang method for imaging a plane chart in a checkered pattern from a plurality of points of view and optimizing parameters so that positions of feature points on the captured image and positions of the feature points in the plane of the chart in a real space correctly correspond (see NPL 1).

CITATION LIST

Patent Literature

[PTL 1] European Patent Application Publication No. 0999518

Non Patent Literature

[NPL 1] Zhengyou Zhang, "A Flexible New Technique for Camera Calibration," Microsoft Research Technical Report, MSR-TR-98-71, Dec. 2, 1998.

SUMMARY

Technical Problems

In the Zhang method, the imaging apparatus and the chart need to be set at some positions and postures to repeat the imaging, and the workload is large. In addition, although a technique of using a fish-eye lens to capture a wide-angle image is generally used in recent years, it is difficult to accurately correct the distortion specific to the fish-eye lens in the entire image.

The present invention has been made in view of the problems, and an object of the present invention is to provide a technique for easily and accurately performing calibration of a fish-eye camera.

Solution to Problems

To solve the above problems, an aspect of the present invention relates to a calibration apparatus. The calibration apparatus includes: a captured image acquisition unit that acquires data of a captured image of a calibration chart from an imaging apparatus including a fish-eye lens; and a correction unit that corrects distortion caused by the lens based on a relationship between a position on a screen corresponding to the fish-eye lens and a position on a surface of the chart imaged at the position and that evaluates the corrected image to derive and output a value of a parameter regarding the imaging apparatus.

Another aspect of the present invention also relates to a calibration apparatus. The calibration apparatus includes: a captured image acquisition unit that acquires data of a captured image of a calibration chart from an imaging apparatus including a fish-eye lens; a parameter acquisition unit that acquires a value of a parameter regarding the imaging apparatus; a pseudo image drawing unit that arranges a virtual camera and an object model of the chart in a virtual three-dimensional space and that uses the value of the parameter to generate a pseudo image of the captured image as an image captured by the virtual camera; and a point-of-view adjustment unit that compares the generated pseudo image and the captured image to derive a position of the imaging apparatus with respect to the chart.

Yet another aspect of the present invention relates to a calibration system. The calibration system includes an imaging apparatus including a fish-eye lens; and the calibration apparatus.

Yet another aspect of the present invention relates to a calibration method. The calibration method includes: a step of acquiring data of a captured image of a calibration chart from an imaging apparatus including a fish-eye lens; a step of correcting distortion caused by the lens based on a relationship between a position on a screen corresponding to the fish-eye lens and a position on a surface of the chart imaged at the position; and a step of evaluating the corrected image to derive and output a value of a parameter regarding the imaging apparatus.

Note that arbitrary combinations of the constituent elements and things obtained by converting the expressions of the present invention between a method, an apparatus, a system, a recording medium, a computer program, and the like are also effective as modes of the present invention.

Advantageous Effect of Invention

According to the present invention, the calibration of the imaging apparatus can be easily and accurately performed.

BRIEF DESCRIPTION OF DRAWINGS

FIG. 21 is a diagram illustrating another example of a pattern of a chart that can be applied to the present embodiment.

FIG. 22 is a diagram exemplifying captured images of the chart according to the present embodiment.

FIG. 24 is a diagram exemplifying captured images of a chart pattern in which the position and the posture with respect to the fish-eye lens are different according to the present embodiment.

FIG. 26 is a diagram for describing a procedure of generating the pseudo image in the present embodiment.

FIG. 28 is a diagram illustrating examples of the pseudo image that can be generated in the present embodiment.

FIG. 29 is a diagram illustrating examples of the pseudo images that can be generated in the present embodiment.

FIG. 35 is a diagram for describing parameters to be evaluated in a posture detection process of the imaging apparatus based on orthogonality of the chart pattern according to the present embodiment.

FIG. 37 is a diagram illustrating images obtained by restoring the chart of each surface from a pseudo image, in which the chart pattern is indicated inside a cube, and the images are captured with the point of view at the center, in the present embodiment.

FIG. 38 is a diagram illustrating a result of restoration of the chart of a surface from a pseudo image in which the inside of the cube is imaged at an arbitrary posture in the present embodiment.

DESCRIPTION OF EMBODIMENTS

Embodiment 1

Figure 1:
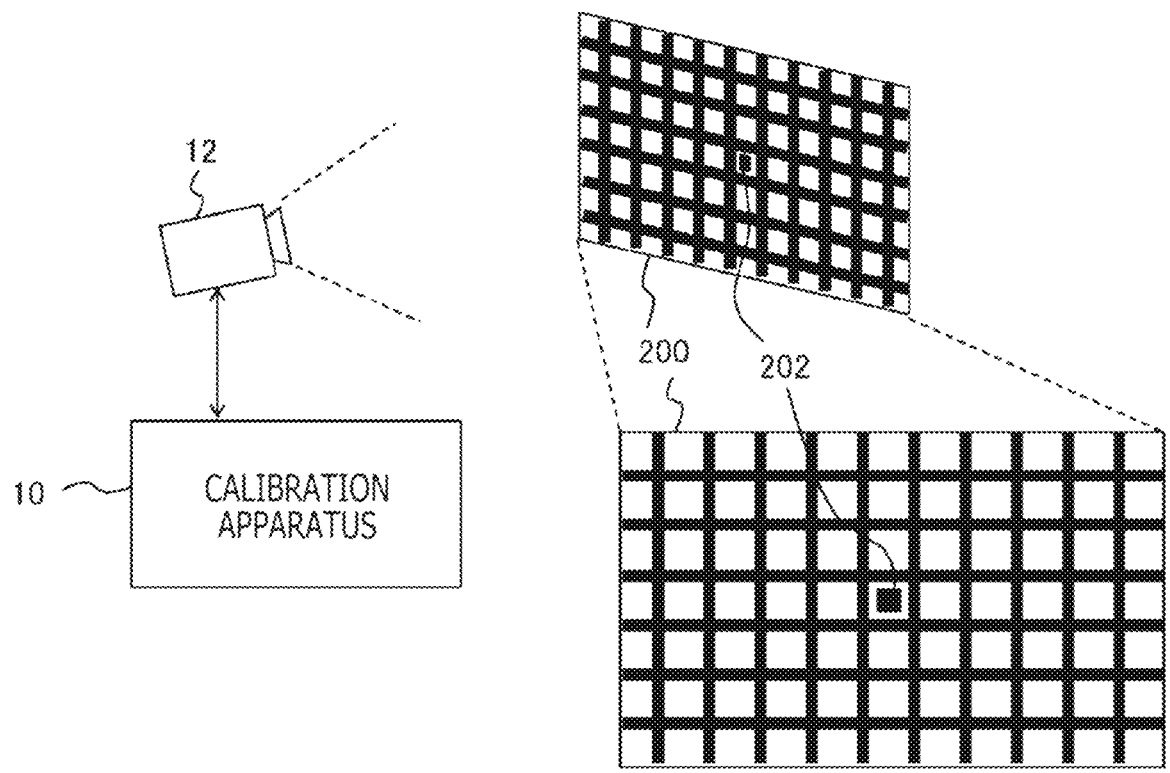
FIG. 1 is a diagram exemplifying a configuration of a system in which the present embodiment can be applied.

FIG. 1 exemplifies a configuration of a system in which the present embodiment can be applied. The system includes an imaging apparatus 12, a calibration chart 200, and a calibration apparatus 10 that uses images of the chart 200 captured by the imaging apparatus 12 to carry out calibration. The calibration apparatus 10 uses captured images of the chart 200 to acquire predetermined parameters regarding the imaging apparatus 12. Here, the predetermined parameters include general camera parameters, such as a lens distortion correction coefficient, a position of a lens center, and a tangential distortion correction coefficient, as well as a position, a posture, and a horizontal/vertical angle of view (hereinafter, simply referred to as "angle of view") of the imaging apparatus 12 at the time of imaging the chart 200.

The imaging apparatus 12 includes an imaging optical system including a fish-eye lens, an image sensor, such as a charge coupled device (CCD) sensor and a complementary metal oxide semiconductor (CMOS) sensor, and a mechanism that carries out general image processing, such as demosaicing process. The imaging apparatus 12 images a subject space at a wide angle. The imaging apparatus 12 may be a single-lens camera including only one set of a lens and an imaging sensor or may be a multi-lens camera including a plurality of sets. The configuration of the camera included in the imaging apparatus 12 may be determined according to the details of information processing executed by using captured images.

For example, in a case of acquiring the position of an object, such as a user and a controller, in a three-dimensional space from a captured image to realize an electronic game, the camera can be a stereo camera including two cameras provided on the left and right at a known interval. In addition, the mode of the imaging apparatus 12 is not limited to the illustrated one. For example, the imaging apparatus 12 may be integrated with the calibration apparatus 10. Alternatively, the imaging apparatus 12 may be installed on a robot or a head mounted display. In this case, images corresponding to the field of view of the robot or the user wearing the head mounted display can be captured at a predetermined frame rate to reflect the images on the action of the robot, or corresponding images can be used for the display on the head mounted display.

The chart 200 is a real object, such as a planar board or paper, representing a predetermined pattern (design). Alternatively, a display apparatus displaying the design, an electronic device including the display apparatus, or the like may be used. In the illustrated example, the pattern of the chart 200 includes grid lines including black horizontal lines and vertical lines of a predetermined width arranged at equal intervals on a white background and a marker 202 arranged at a predetermined position, such as on a center rectangle, in a two-dimensional array of white rectangles formed by the grid lines, as illustrated in a front view in the lower part of FIG. 1.

However, the pattern of the chart 200 is not limited to this, and the pattern can be any combination of a design indicating the horizontal direction and the vertical direction of the chart at predetermined intervals and a design indicating a specific position on the chart. For example, a marker may be added to a checkered pattern in which white and black are reversed in adjacent rectangles among rectangular regions divided in a grid, or a barcode or the like exemplified later may be used. Although the marker 202 is a black square in the illustrated example, this is not intended to limit the marker 202 to this, and the marker 202 can have any known shape and color that allow to clearly distinguish the marker 202 from the grid lines.

The calibration apparatus 10 sets a captured image of the chart 200 as input data and acquires the parameters regarding the imaging apparatus 12. Here, the captured image set as input data is an image before correction of barrel distortion specific to the fish-eye lens. The calibration apparatus 10 uses the lens distortion to acquire, from one captured image, parameters such as a posture, a correction coefficient, and the like of the imaging apparatus 12. The calibration apparatus 10 further uses separately prepared model data of the chart to create a pseudo captured image and derives the position of the imaging apparatus 12 in the three-dimensional space based on the position and the size of the image of the marker 202.

The calibration apparatus 10 stores the obtained parameters in an internal memory or outputs the obtained parameters to an external apparatus not illustrated. Alternatively, the calibration apparatus 10 may have a function of using the obtained parameters to execute information processing of the electronic game or the like and causing an output apparatus not illustrated to display the obtained parameters. Furthermore, the calibration apparatus 10 can be provided in a robot along with the imaging apparatus 12, and the parameters may be used to analyze the captured image to create a surrounding environment map. These cases can realize an information processing apparatus having the functions of the calibration apparatus 10.

Figure 2:
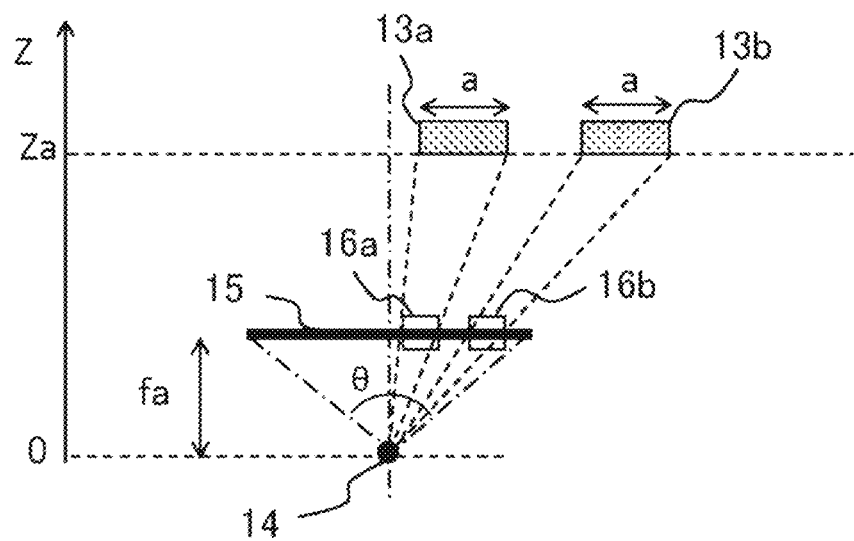
FIG. 2 is a diagram for describing central projection performed by a general imaging apparatus.

FIG. 2 is a diagram for describing central projection performed by a general imaging apparatus without a fish-eye. FIG. 2 illustrates a bird's-eye view of a state in which an imaging apparatus with a focal length fa images a plane at a distance Za from a principal point 14. The image taken by the imaging apparatus corresponds to an image obtained by projecting a subject onto a screen 15 at the distance fa from the principal point 14. In addition, when the sensor size is known, the focal length fa determines an angle of view θ. In this case, ranges 13a and 13b in a same size a on the surface of the subject form images 16a and 16b in the same size (fa·a/Za) regardless of the position on the captured image.

That is, the size of the image is provided by a function of a ratio of the focal length fa and the distance Za. Therefore, if the ratio is the same, the size of the image may be the same even if the distance Za is different. In other words, the position of the point of view and the angle of view cannot be obtained at the same time from the image size of one captured image. Therefore, in the calibration of a general imaging apparatus, the chart is imaged from various directions to provide simultaneous equations, or the distance to the chart is fixed to capture an image to thereby obtain various camera parameters.

Figure 3:
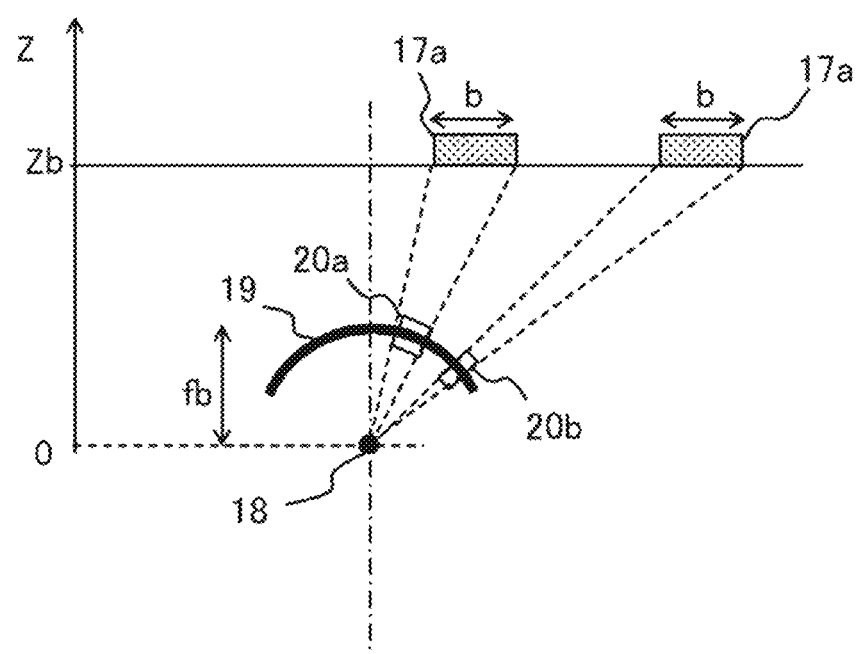
FIG. 3 is a diagram for describing equidistant projection performed by an imaging apparatus according to the present embodiment.

FIG. 3 is a diagram for describing equidistant projection performed by the imaging apparatus according to the present embodiment. FIG. 3 also illustrates the state in which the imaging apparatus with a focal length fb images a plane at a distance Zb from a principal point 18. On the other hand, in the imaging apparatus 12 of the present embodiment, a screen 19 on which the image is projected by the fish-eye lens is spherical. In this case, the longer the distance from the center on the captured image, the smaller the images 20a and 20b of ranges 17a and 17b in a same size b on the surface of the subject.

Furthermore, the change in reduction ratio with respect to the distance from the center on the captured image is dependent on the curvature of the sphere of the screen 19, that is, the focal length fb, regardless of the position of the principal point. This is used in the present embodiment to evaluate the distortion caused by the fish-eye lens to thereby specify the focal length as well as the angle of view and to evaluate the position and the size of the image to thereby specify the position of the imaging apparatus. This enables calibration by using just one captured image of the chart 200 without strict positioning.

Figure 4:
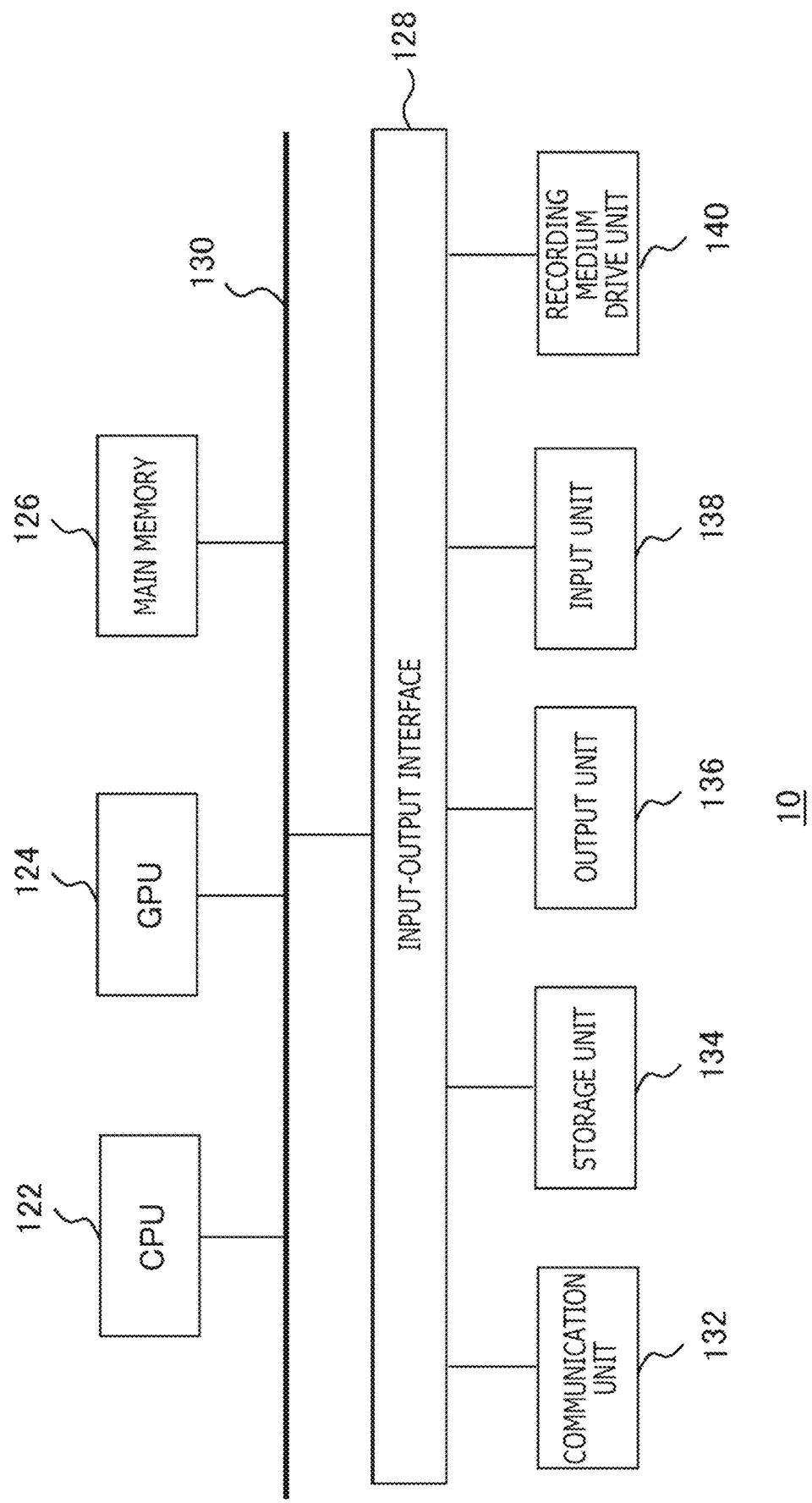
FIG. 4 is a diagram illustrating an internal circuit configuration of a calibration apparatus according to the present embodiment.

FIG. 4 illustrates an internal circuit configuration of the calibration apparatus 10. The calibration apparatus 10 includes a central processing unit (CPU) 122, a graphics processing unit (GPU) 124, and a main memory 126. The CPU 122 controls processing and signal transmission in the constituent elements inside the apparatus based on a program of an operating system, an application, or the like. The GPU 124 executes image processing. The main memory 126 includes a random access memory (RAM) and stores programs and data necessary for processing.

These components are connected to each other through a bus 130. An input-output interface 128 is further connected to the bus 130. The components connected to the input-output interface 128 include: a communication unit 132 including a peripheral device interface of a universal serial bus (USB), Institute of Electrical and Electronics Engineers (IEEE) 1394, or the like and a network interface of a wired or wireless local area network (LAN); a storage unit 134, such as a hard-disk drive and a non-volatile memory; an output unit 136 that outputs data to an output apparatus, such as a display apparatus and a printer, not illustrated; an input unit 138 that receives data from the imaging apparatus 12 or an input apparatus not illustrated; and a recording medium drive unit 140 that drives a removable recording medium, such as a magnetic disk, an optical disk, and a semiconductor memory.

The CPU 122 executes an operating system stored in the storage unit 134 to control the entire apparatus. The CPU 122 also executes various programs that are read from a removable recording medium and loaded on the main memory 126 or that are downloaded through the communication unit 132. The GPU 124 has a function of a geometry engine and a function of a rendering processor and draws an image according to a drawing command from the CPU 122.

Figure 5:
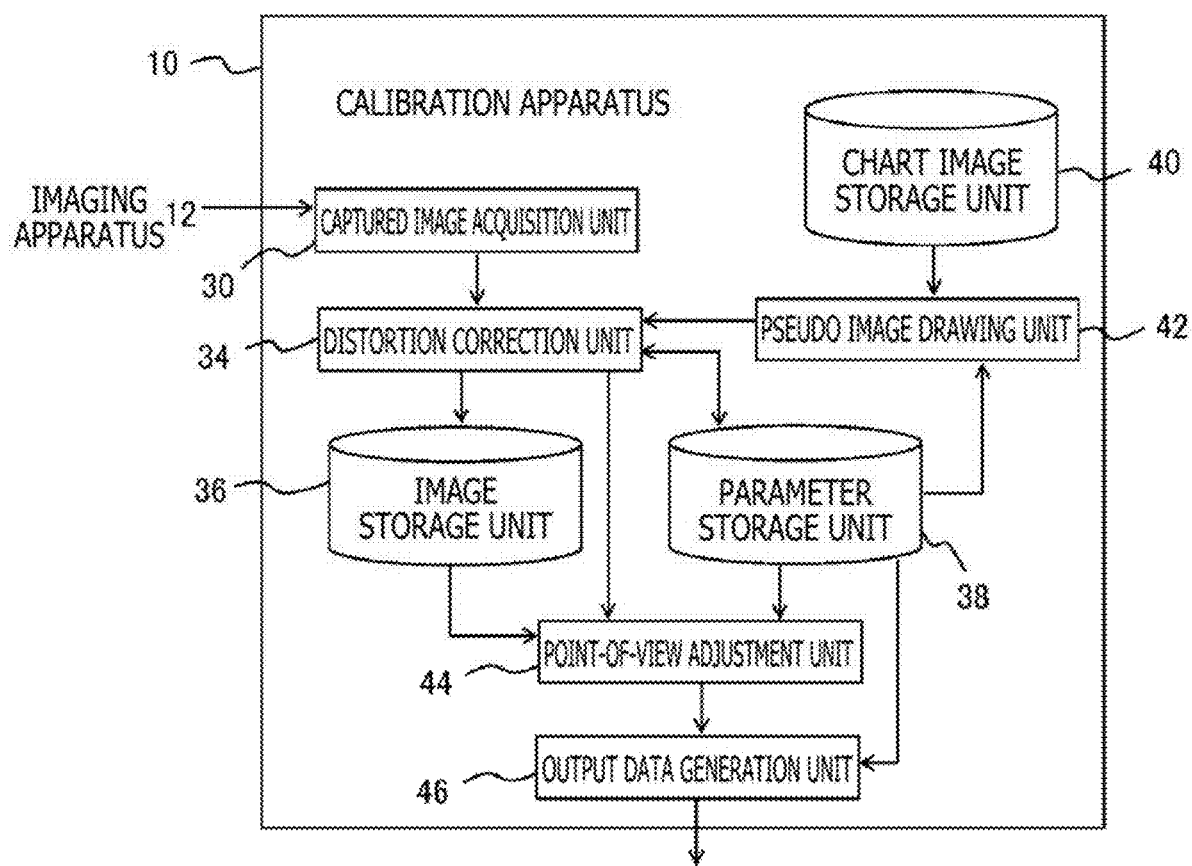
FIG. 5 is a diagram illustrating a configuration of functional blocks of the calibration apparatus according to the present embodiment.

FIG. 5 illustrates a configuration of functional blocks of the calibration apparatus 10. The functional blocks illustrated in FIG. 5 can be realized by the CPU 122, the GPU 124, the main memory 126, and the like illustrated in FIG. 4 in terms of hardware and can be realized by a computer program or the like loaded from a hard disk or a recording medium to a main memory in terms of software. Therefore, it can be understood by those skilled in the art that the functional blocks can be realized in various forms, such as only hardware, only software, and combinations of hardware and software, and the functional blocks are not limited to any of these.

The calibration apparatus 10 includes: a captured image acquisition unit 30 that acquires data of a captured image; a distortion correction unit 34 that performs projective transformation of an image generated from an actual captured image and a model and that corrects lens distortion; an image storage unit 36 that stores a corrected image; a parameter storage unit 38 that stores parameters acquired in the correction; a chart image storage unit 40 that stores model data of the pattern of the chart 200; a pseudo image drawing unit 42 that uses the model data of the chart 200 to generate a distorted pseudo image; a point-of-view adjustment unit 44 that acquires a point-of-view position of the imaging apparatus 12 based on the position and the size of the image of the marker; and an output data generation unit 46 that outputs parameters obtained in relation to the imaging apparatus or that generates and outputs data indicating a result of information processing using the parameters.

The captured image acquisition unit 30 acquires, from the imaging apparatus 12, data of the captured image of the chart 200. In the case where the imaging apparatus 12 includes a multi-lens camera, the captured image acquisition unit 30 acquires all data of the image captured by each camera. The image of the chart in the captured image is distorted due to a slope corresponding to the posture of the imaging apparatus or due to the fish-eye lens. Hereinafter, the deformation from the original chart in the captured image may be collectively referred to as "distortion."

The distortion correction unit 34 performs correction of removing the distortion from the captured image. Specifically, the distortion correction unit 34 transforms the image captured in the equidistant projection system into data of central projection and further uses a distortion correction equation to make a more detailed correction. As a result, the grid lines of the chart 200 substantially become straight lines. Furthermore, the distortion correction unit 34 performs projective transformation to eliminate the slope of the image of the chart 200 caused by the posture of the imaging apparatus 12. In these processes, the distortion correction unit 34 uses the angle of view, the posture, the lens distortion correction coefficient, the position on the image corresponding to the lens center (hereinafter, referred to as "the position of the lens center"), and the tangential distortion correction coefficient of the imaging apparatus 12.

The distortion correction unit 34 first makes an assumption of the parameters to make a correction and adjusts the parameters so that the result indicates the image of the pattern of the original chart. As a result, each parameter can be obtained. The distortion correction unit 34 further applies the same process to the pseudo captured image generated by the pseudo image drawing unit 42 using the model data of the chart. The data of the image after the correction obtained by these correction processes is stored in the image storage unit 36, and the parameters are stored in the parameter storage unit 38.

The pseudo image drawing unit 42 reads the model data of the chart 200 stored in the chart image storage unit 40 and arranges the model data in a virtual three-dimensional space along with a virtual camera. Here, the posture of the imaging apparatus 12 obtained from the actual captured image is provided to the virtual camera. The position of the imaging apparatus 12 is unknown, and therefore, a temporary value is set. In addition, equidistant projection of the chart 200 as an object model is performed to create the same state as the actual imaging environment of the imaging apparatus 12. In this case, the angle of view, the lens distortion correction coefficient, the position of the lens center, and the tangential distortion correction coefficient obtained with respect to the imaging apparatus 12 stored in the parameter storage unit 38 are used to make a correction opposite the correction for eliminating the lens distortion to thereby generate a distorted image similar to the captured image. Hereinafter, the image will be referred to as a "pseudo image."

The point-of-view adjustment unit 44 compares the position and the size of the marker 202 in the image after the correction of the captured image and the position and the size of the marker 202 in the image after the correction of the pseudo image. If the position of the virtual camera that is set when the pseudo image drawing unit 42 generates the pseudo image is not correct, there are differences in the parameters. Therefore, the position of the point of view is adjusted based on the differences to specify the actual position of the imaging apparatus 12.

The output data generation unit 46 acquires various parameters stored in the parameter storage unit 38 and the position of the captured image specified by the point-of-view adjustment unit 44 and stores the parameters and the position as output data in the storage apparatus or outputs the output data to an external apparatus. Alternatively, the output data generation unit 46 may use the information to correct the image captured during operation or use the information for image analysis to carry out predetermined information processing to thereby generate and output the output data of a display image or the like. For example, in the case where the imaging apparatus 12 is a stereo camera, the differences between the cameras regarding the intervals of principal points and the postures are found out based on the position and the posture of each camera. Therefore, the parameters can be used to correct the stereo image obtained during operation or can be used for calculation based on triangulation to thereby accurately specify the position of the object.

Figure 6:
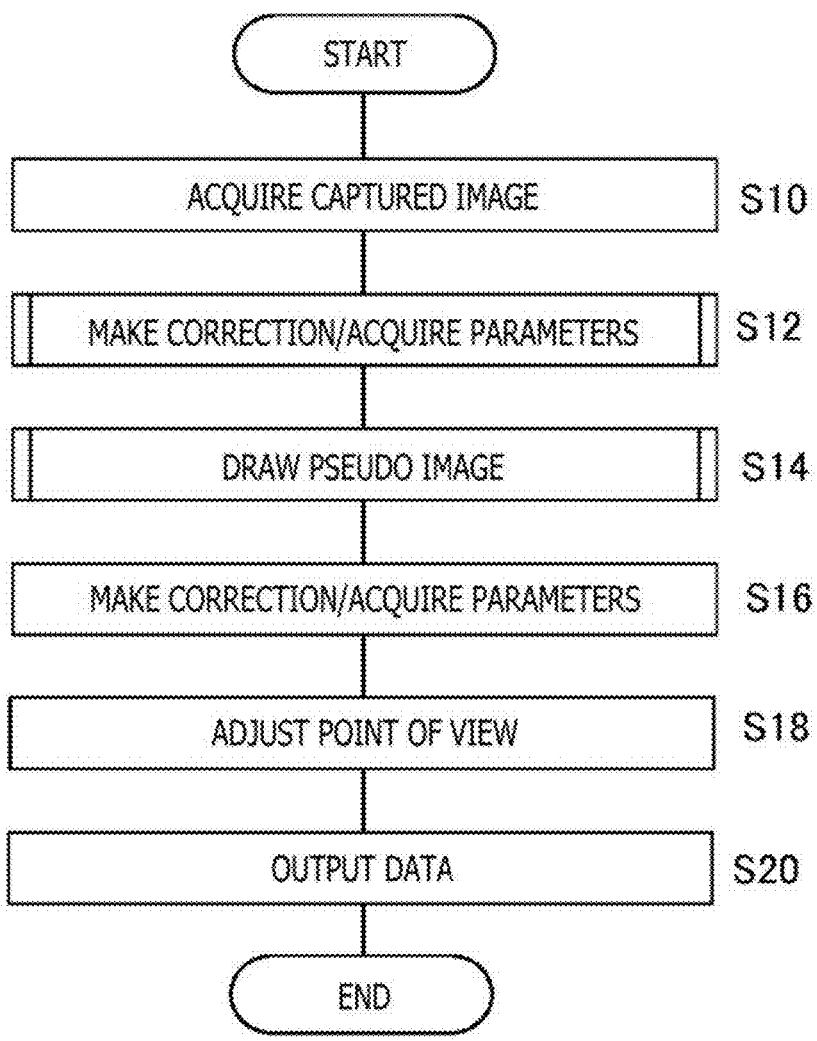
FIG. 6 is a flow chart illustrating a procedure of specifying parameters of the imaging apparatus executed by the calibration apparatus according to the present embodiment.

Next, an action of the calibration apparatus 10 that can be realized by the configuration will be described. FIG. 6 is a flow chart illustrating a procedure of specifying the parameters of the imaging apparatus executed by the calibration apparatus 10. First, the captured image acquisition unit 30 acquires the data of the captured image of the chart 200 from the imaging apparatus 12 (S10). In the case where the imaging apparatus 12 is a multi-lens camera, the captured image acquisition unit 30 acquires the data of the image captured by each camera. The data can be an image of the chart 200 captured from substantially the front, and strict positioning is not necessary at the imaging.

The posture/distortion correction unit 34 corrects the captured image to make the captured image similar to the pattern of the original chart to thereby acquire the parameters regarding the imaging apparatus (S12). As described above, the distortion of the captured image includes distortion caused by the posture of the imaging apparatus 12 and distortion caused by the structure of the imaging apparatus 12 such as a fish-eye lens. Therefore, the posture/distortion correction unit 34 makes an assumption of the parameters necessary for the correction to sequentially perform the correction for eliminating the distortion caused by the posture and the distortion caused by the structure and adjusts the parameters until the obtained data after the correction becomes substantially the same as the pattern of the chart. In this way, the posture/distortion correction unit 34 acquires the final image after the correction and the values of the parameters. However, the position of the imaging apparatus 12 is not used for the correction of the distortion, and the position is not found out at this stage. Note that in a case where the position of the imaging apparatus 12 does not have to be obtained, the process of S14 to S18 described next can be skipped.

Next, the pseudo image drawing unit 42 reads the model data of the chart 200 from the chart image storage unit 40, arranges the model data in a virtual space, and draws the pseudo image based on the image of the model data captured by the virtual camera (S14). In this case, the posture of the virtual camera is set to the value acquired in S12, and a temporary value is provided for the position. In addition, the virtual camera includes the fish-eye lens and has the same angle of view, lens distortion correction coefficient, position of lens center, and tangential distortion correction coefficient as those of the imaging apparatus 12. Accordingly, the chart on the model can be projected and distorted to thereby generate an image similar to the captured image acquired in S10.

Next, the posture/distortion correction unit 34 corrects the pseudo image drawn in S14, as in S12 (S16). That is, the posture/distortion correction unit 34 performs the correction of using the parameters obtained in S12 to eliminate the distortion. As a result, an image similar to the pattern of the chart is obtained, and the position and the magnification of the chart on the image are dependent on the position of the virtual camera that is set in drawing the pseudo image. The point-of-view adjustment unit 44 adjusts the position of the virtual camera so that the position of the marker and the intervals of the grid in the image after the correction of the captured image acquired in S12 and the position of the marker and the intervals of the grid in the image after the correction of the pseudo image acquired in S16 become substantially the same (S18).

The position of the virtual camera when the difference between them is equal to or smaller than a predetermined threshold is acquired as the actual position of the imaging apparatus 12. The output data generation unit 46 generates and outputs data representing the parameters obtained in the process so far or representing the results of image analysis or information processing performed by using the parameters (S20). As described above, the data may be output to an apparatus that executes other processing, such as a game and display, or to a storage apparatus. Alternatively, the data may be output to the imaging apparatus 12.

Figure 7:
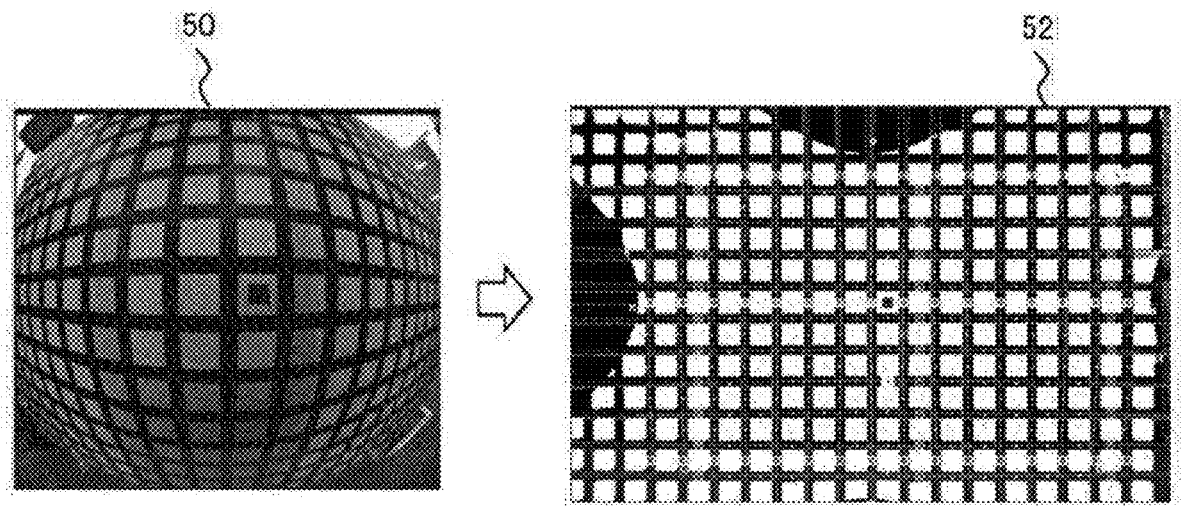
FIG. 7 is a diagram exemplifying a state in which an actual captured image is corrected in the present embodiment.

Next, a correction method of the captured image performed by the distortion correction unit 34 in S12 of FIG. 6 will be described. FIG. 7 exemplifies a state in which the actual captured image is corrected. A chart in a captured image 50 has a pattern including black straight lines of a predetermined width indicated in a grid on a white background and further including a black rectangular marker indicated in one of the rectangles surrounded by the grid lines, as described in FIG. 1. The imaging apparatus 12 includes the fish-eye lens. Therefore, the longer the distance from substantially the center of the image plane corresponding to the center of the lens is, the more the image is reduced.

The distortion correction unit 34 corrects the captured image 50 to generate a state similar to the original chart pattern, that is, an image 52 after the correction in which the black straight lines are orthogonal to each other at equal intervals. As described above, the degree of reduction of the image toward the image edges as well as the condition of curve of the straight lines are mainly dependent on the internal structure of the imaging apparatus 12, such as the angle of view of the imaging apparatus 12 and the deviation of the position of the lens center. The degree of inclination of the grid in the horizontal direction and the vertical direction of the image plane is dependent on the posture of the imaging apparatus 12. Therefore, the parameters of them can be derived in the course of correction from the captured image 50 to the image 52.

Figure 8:
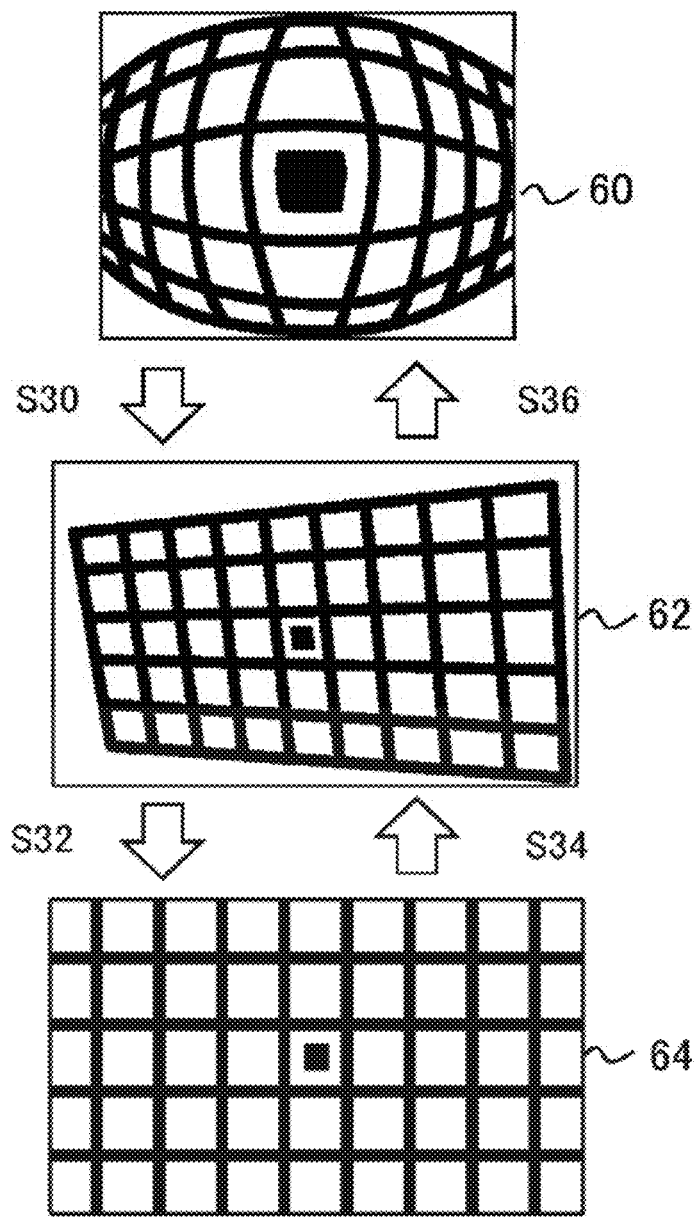
FIG. 8 is a diagram illustrating transition of a conceptual image based on correction by a distortion correction unit of the present embodiment.

FIG. 8 illustrates a transition of a conceptual image based on the correction by the distortion correction unit 34. As described above, the correction is a process of eliminating the lens distortion in a captured image 60 to generate an image 62 with a linear grid (S30) and performing projective transformation of the image 62 to obtain an image 64 after correction in which the grid is orthogonal (S32). Image processing is a process of inputting the position coordinates on the captured image 60 and outputting the position coordinates on the image 64 after correction. Furthermore, in the present embodiment, the angle of view, the correction coefficient, and the like of the imaging apparatus 12 are searched so that the grid becomes a linear image in the process of S30, and the original posture of the imaging apparatus 12 is searched so that the grid becomes orthogonal in the process of S32.

That is, this includes a process of evaluating the linearity and the orthogonality in the target images, such as the images 62 and 64, and checking how the linearity and the orthogonality are improved in the case where various parameters are adjusted. In this case, the position coordinates on the images 62 and 64 to be evaluated can be input, and a processing path for outputting the original position coordinates on the captured image 60 can be prepared to make the adjustment process efficient. That is, a processing path is prepared, in which inverse projective transformation is applied to the image 64 after correction (S34) to provide lens distortion (S36).

The distortion correction unit 34 appropriately uses these processes to efficiently generate the image 64 after correction. Hereinafter, the processing path of generating the image of the chart pattern from the distorted image as in S30 and S32 will be referred to as "forward direction correction," and the processing path of generating the distorted image from the image of the chart pattern as in S34 and S36 will be referred to as "backward direction correction."

Figure 9:
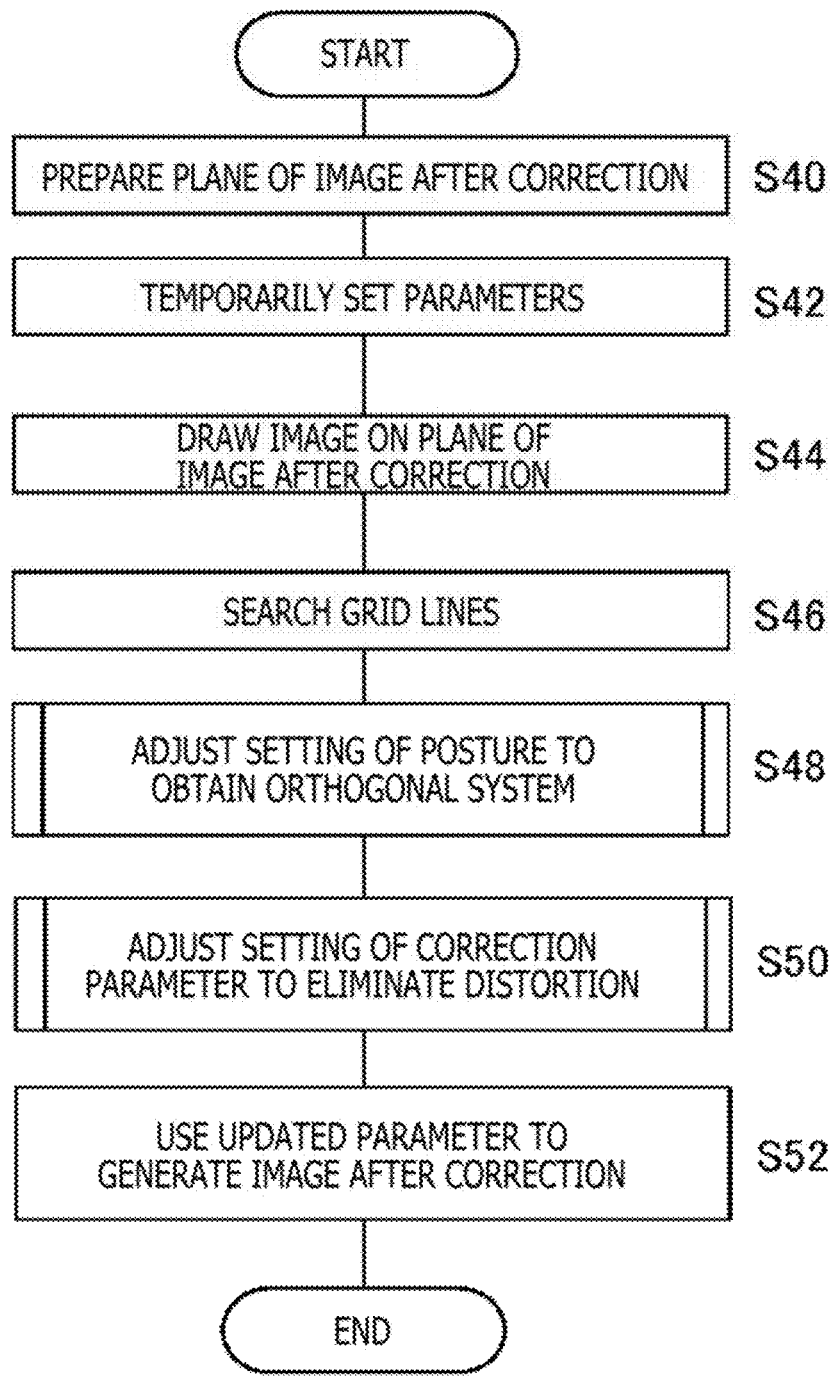
FIG. 9 is a flow chart illustrating a procedure of correcting the captured image executed by the distortion correction unit in the present embodiment.

FIG. 9 is a flow chart illustrating a procedure of correcting the captured image executed by the distortion correction unit 34. The process corresponds to S12 of FIG. 6. First, the plane of the image after correction is prepared (S40), and the parameters used for the correction are temporarily set (S42). Specifically, the angle of view, the posture (pan angle, tilt angle, and roll angle), the lens distortion correction coefficient, the position of the lens center, and the tangential distortion correction coefficient of the imaging apparatus 12 are set. In many cases, the lens distortion is corrected by the following equations using lens distortion correction coefficients k2, k4, and k6.

$$i'=i(1+k2*r^2+k4*r^4+k6*r^6)/(1+k2+k4+k6)$$

$$j'=j(1+k2*r^2+k4*r^4+k6*r^6)/(1+k2+k4+k6)$$

Here, (i, j) represents the position coordinates in the distorted image, and (i', j') represents the position coordinates after the correction of the distorted image. In addition, r represents the distance between the position coordinates (i, j) in the image before the correction and the lens center, and r is defined by the following equation where (ic, jc) represents the position coordinates of the lens center.

$$r=((i-ic)^2+(j-jc)^2)^{1/2}$$

Note that although the equation indicates the correction up to the sixth degree, the degree of correction is not limited. On the other hand, the tangential distortion is corrected by the following equations using tangential distortion correction coefficients p1 and p2.

$$i'=i+(2p1*ij+p2(r^2+2i^2))$$

$$j'=j+(p1(r^2+2j^2)+2p2*ij)$$

That is, the equations are used to make a correction dependent on only the distance from the lens center.

Note that as described later, the difference in projection system is first taken into account to correct the distortion caused by the fish-eye lens, and the equations are further used to correct the distortion to improve the correction accuracy in the present embodiment. Next, the corrected image at the time of using the temporary parameters set in S42 is drawn on the image plane prepared in S40 (S44). The processing path used in the process is a processing path of the backward direction correction in which the position coordinates of each pixel in the image plane are used as input values to obtain the corresponding position coordinates on the captured image. As a result, an image similar to the chart pattern is generated, in which the temporarily set parameters are used for the correction.

Next, the straight lines included in the grid of the chart pattern are searched in the image (S46). In a case where the posture of the imaging apparatus 12 set in S42 is different from the actual posture, the straight lines are not orthogonal, and the setting of the posture is adjusted until the straight lines become orthogonal to each other (S48). However, only the intersections of four straight lines that are upper, lower, left, and right straight lines detected on the extreme outside are monitored here to adjust the setting of the posture to thereby increase the processing efficiency. As a result, the posture of the imaging apparatus 12 is found out. In a case where a parameter other than the posture set in S42 is different from the actual parameter, the grid lines in the image generated in S48 are still distorted a little or inclined. Therefore, the setting of the parameter is adjusted until the distortion is eliminated (S50).

In this case, the points bisecting the width of the grid lines are sampled at predetermined intervals, and only errors with respect to approximate straight lines of the points are monitored to adjust the setting of the parameter to thereby increase the processing efficiency. As a result, the angle of view, the correction coefficient, and the position of the lens center of the imaging apparatus 12 are found out. As a result of the process of S48 and S50, the parameters set in S42 are updated. Therefore, the updated values are used to carry out the drawing process similar to S44 again to generate the final image after correction (S52). In this case, the grid lines and the markers are also detected from the image to specify the intervals of the grid lines and the size of the marker. The data of the image after correction is stored in the image storage unit 36, and the updated parameters are stored in the parameter storage unit 38.

Figure 10:
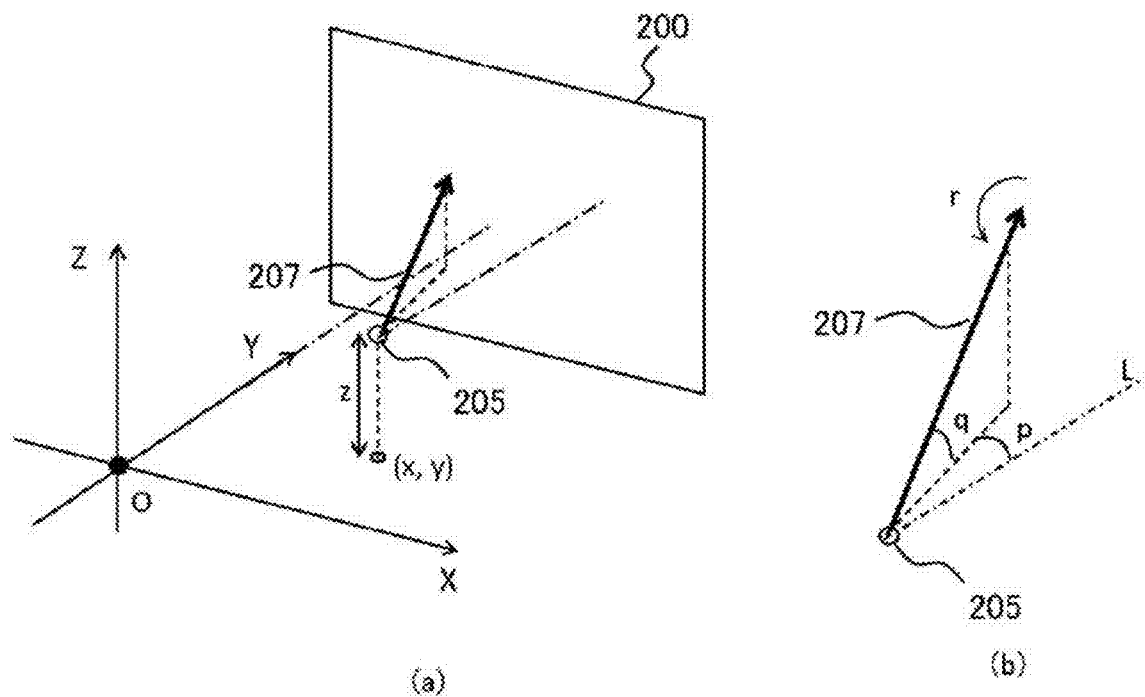
FIG. 10 is a diagram for describing a process of projective transformation in S32 of FIG. 8.

FIG. 10 is a diagram for describing the process of projective transformation in S32 of FIG. 8. In FIG. 10, (a) illustrates a three-dimensional space including the chart 200 and illustrates a point of view 205 and a line-of-sight vector 207 of the imaging apparatus 12. Note that the line-of-sight vector 207 here defines the direction of the optical axis of the imaging apparatus. In the illustrated example, position coordinates (x, y, z) of the point of view 205 are defined by a three-dimensional space formed by an XZ plane parallel to the chart 200 and a Y-axis vertically intersecting the center of the chart. An origin O of the three-dimensional space is a point of view when the Y-axis direction is set as the line-of-sight vector to display the chart pattern in the entire field of view. In other words, the image 64 after correction in FIG. 8 is obtained in a reference state, in which the point of view is at the origin O, and the line-of-sight vector overlaps the Y-axis (imaging apparatus 12 directly faces the chart 200).

In (b) of FIG. 10, the line-of-sight vector 207 is enlarged to illustrate parameters defining the posture of the imaging apparatus 12. A pan angle p and a tilt angle q are defined based on a perpendicular line L (Y-axis direction) from the point of view 205 to the chart 200, and a roll angle r is defined in the rotation direction of the line-of-sight vector 207. The change in position coordinates on the image when the point of view 205 and the line-of-sight vector 207 are displaced to the standard state can be obtained by a general projective transformation matrix using the parameters.

If the point of view 205 as a start point and the line-of-sight vector 207 are known, the image 64 after correction in FIG. 8 can be obtained by the projective transformation. In the present embodiment, the point of view 205 and the line-of-sight vector 207 are unknown. Therefore, the parameters defining the point of view 205 and the line-of-sight vector 207 are temporarily set to check the image after the transformation, and the set parameters are adjusted to obtain the target image of the chart pattern. In this way, the point of view 205 and the line-of-sight vector 207 as well as the position and the posture of the imaging apparatus 12 can be specified.

Figure 11:
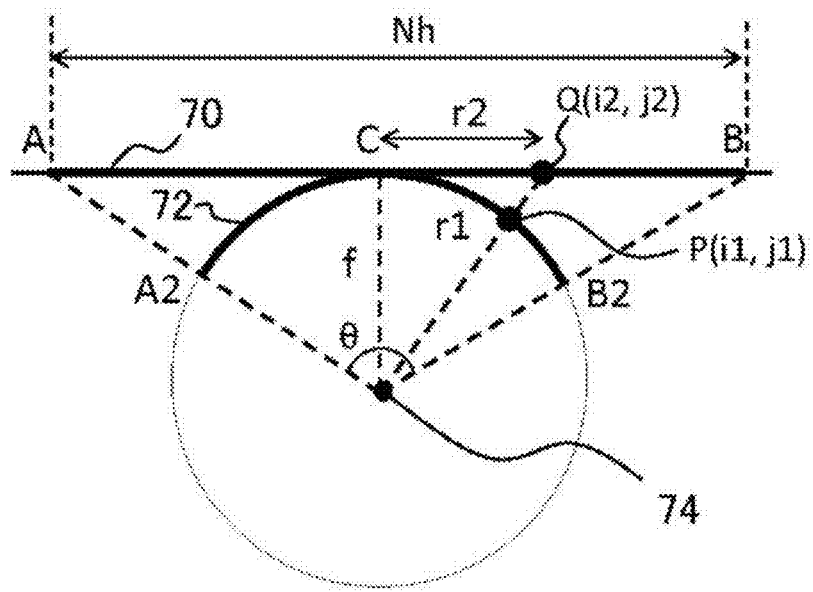
FIG. 11 is a diagram for describing a process of distortion correction in S30 of FIG. 8.

FIG. 11 is a diagram for describing the process of distortion correction in S30 of FIG. 8. In the case of the fish-eye lens, particularly in the general distortion correction using the correction equations, the amount of correction may be insufficient in image edge portions at a large distance from the optical axis, and the elimination of the distortion may not be sufficient. Therefore, in the present embodiment, the projection system is taken into account to correct the distortion specific to the fish-eye lens, and then general correction equations are applied. FIG. 11 illustrates a bird's-eye view of a point of view 74, a screen surface 70 of the central projection indicated by a straight line AB, and a screen surface 72 of the equidistant projection of the fish-eye lens indicated by an arc A2B2.

A and B represent left and right edges in an image with the number of horizontal pixels Nh in the central projection where θ represents the angle of view, and A2 and B2 represent left and right edges in an image of the fish-eye lens corresponding to A and B. A distance f from the point of view 74 to the image is expressed by the following equation, in which the unit is pixel.

$$f = Nh/(2*(\tan(q/2)))$$

A point P (i1,j1) on the screen surface 72 of the equidistant projection and a point Q (i2, j2) on the screen surface 70 of the central projection corresponding to the point P (i1,j1) are in the following relationships with respect to distances r1 and r2 from an image center (strictly speaking, position of the lens center) C, respectively.

$$r1 = f*\text{atan}(r2/f)$$

$$r2 = (i2+j2)^{1/2}$$

Here, atan (r2/f) represents an angle formed by the line-of-sight vector to the point P (i1, j1) and the point Q (i2, j2) before and after the correction and the optical axis. A ratio s of the distance r1 to the distance r2 is obtained as follows by using the position coordinates of the point Q (i2, j2).

$$s = r1/r2 = (f*a \tan(r2/f))/r2$$

A ratio R of the length from the center to the image edge is $$R = (2f*\text{atan}(Nh/2f))/Nh,$$

and therefore, a normalized ratio s' is as follows.

$$s' = s/R = (Nh/2r2)*(\text{atan}(r2/f)/\text{atan}(Nh/2f))$$

The calculation is based on the angle of the line-of-sight vector with respect to the optical axis, unlike the general correction equation based on the distance from the image center. That is, not only the information on the plane of the image, but also the three-dimensional information considering the relationship between the information and the point of view can be used to correct the image.

This can realize a correct correction regardless of the position on the image. Note that the point Q (i2, j2) after the correction is known in obtaining the ratio s'. This is because in the actual process, the screen surface 70 of the central projection is prepared first, and the position coordinates of the pixel on the surface are multiplied by the ratio s' to specify the referenced pixel in the image of the fish-eye lens before the correction. The pixel values of the referenced pixel can be referenced in this way to generate the image after the correction.

Even after the distortion caused by the fish-eye lens is eliminated in this way, the distortion caused by the individual difference or the condition of assembly of the lens still remains, and the general correction equation based on the distance from the lens center is used to make the correction. However, in the case where the distortion of the fish-eye lens is corrected as described above, the quadratic term of the lens distortion correction equation is skipped. In the present embodiment, the set of processes can be used to perform the distortion correction to obtain an image in which the distortion is accurately eliminated up to the edges of the image. In the correction, the angle of view, the lens distortion correction coefficient, the position of the lens center, and the tangential distortion correction coefficient of the imaging apparatus are used. Therefore, an assumption of the parameters are made once to carry out the correction, and consequently, the parameters are adjusted until the grid lines become similar to straight lines with sufficient accuracy. In this way, final values of the parameters are determined.

Figure 12:
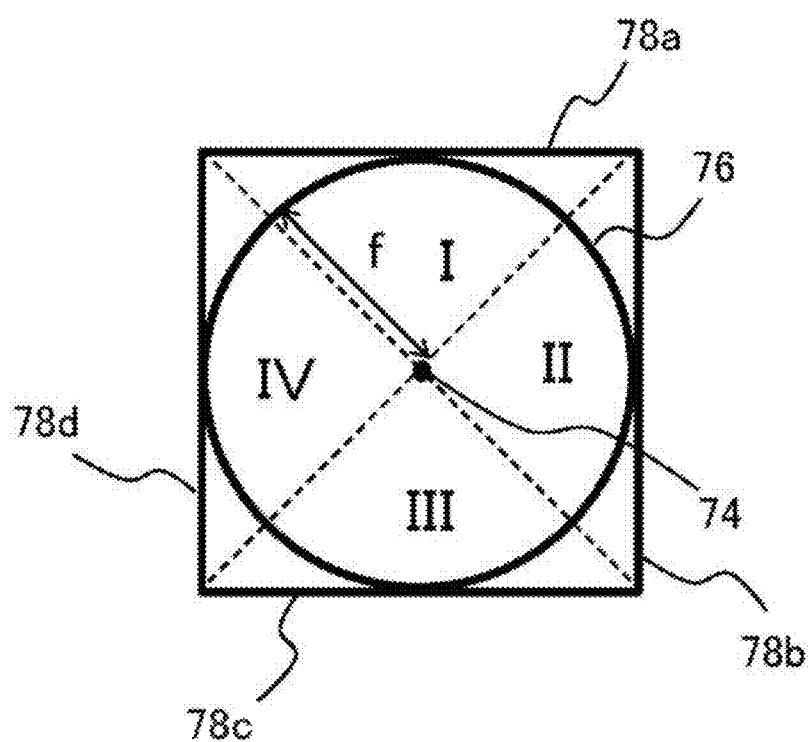
FIG. 12 is a diagram exemplifying a relationship between an expanded screen surface of central projection and a screen surface of a fish-eye lens according to the present embodiment.

In the illustrated example, the angle of view θ of the fish-eye lens is limited to approximately 100°, and the transformation onto the screen surface 70 of the central projection is easy. On the other hand, the camera using the fish-eye lens has an advantage that images with an angle of view of 360° relative to the point of view can be obtained at one time. To utilize the characteristic, the screen surface of the central projection can be expanded. FIG. 12 exemplifies a relationship between the expanded screen surface of the central projection and the screen surface of the fish-eye lens. As in FIG. 11, FIG. 12 is a bird's-eye view of the point of view 74 and each screen surface. The angle of view is set to 360°, and a screen surface 76 of the fish-eye lens is the entire sphere in which the focal length f is the radius.

In this case, to correct the entire image, inner walls of six surfaces of a cube circumscribing the screen surface 76 of the sphere are set as screen surfaces of the central projection (for example, screen surfaces 78a, 78b, 78c, and 78d). In addition, the space is divided into regions in a quadrangular pyramid shape, in which the point of view 74 is a vertex, and each surface of the inner wall is a bottom surface. The screen surface to be switched is selected based on the region to which the target pixel on the screen surface 76 of the sphere belongs. In FIG. 12, the screen is looked down from above, and the screen is divided into four quadrants of 90° around the point of view 74. An image belonging to quadrant I of the screen surface 76 of the sphere is corrected to an image on the screen surface 78a. Images belonging to quadrants II, III, and IV are corrected to images on the screen surfaces 78b, 78c, and 78d, respectively.

The calculation of the correction in each quadrant can be similar to the calculation described above. As for the chart 200, the chart pattern can also be indicated on the inner walls of the cube, and the imaging apparatus 12 can be arranged at the center of the chart pattern to capture images. In this way, the other processes of the present embodiment can also be similarly executed for each quadrant. As a result, the image of the fish-eye lens can be corrected to an image with almost no distortion, without a restriction on the angle of view. In addition to the case in which the angle of view is 360°, an appropriate number of planes can be prepared for arbitrary angles of view smaller than 360°, and the correction can be performed in the same way. In addition, the planes to be prepared are not limited to the surfaces of the cube, and the planes may be planes of a polyhedron circumscribing the screen surface 76 of the sphere, planes of a cylinder circumscribing the screen surface 76 of the sphere, or the like.

Other than to specify the correction coefficients as described so far, the method can also be applied to a mode of generating an image without distortion from an image captured during operation and displaying the image. For example, in a case where the imaging apparatus including the fish-eye lens is provided on a head mounted display to display the captured image as it is or to draw and display a virtual object, the image is temporarily corrected to the image on the screen of the central projection. Furthermore, necessary processing can be executed on each screen, and the image can be projected again on a view screen corresponding to the line of sight of the user to thereby efficiently display the image without distortion.

The forward direction correction of S30 and S32 in FIG. 8 has been mainly illustrated in the description so far. On the other hand, the process in S44 of FIG. 9 determines the pixel values in the image plane after the correction, and the process is backward direction correction for obtaining the position coordinates of the captured image from the position coordinates. The processing efficiency of the process of adjusting the setting of the posture so that the grid lines become orthogonal to each other in S48 and the process of adjusting the correction parameters to eliminate the distortion in S50 can also be increased by using the backward direction correction to evaluate the condition of adjustment based on only the specific pixels sampled on the temporarily corrected image.

The projective transformation in S34 of FIG. 8 in the backward direction correction can be easily realized by, for example, means for using an inverse matrix of the projective transformation matrix described in relation to S32. On the other hand, the inverse correction of the distortion correction caused by the lens in S36 of FIG. 8 particularly includes a reverse process of the correction using the distortion correction equations based on the correction coefficients, and the inverse correction requires devising. In the present embodiment, the set of "the distortion correction specific to the fish-eye lens and the correction using the correction coefficients" is carried out as described above. The set is also used as it is in the inverse correction so that the correction becomes substantially opposite.

Figure 13:
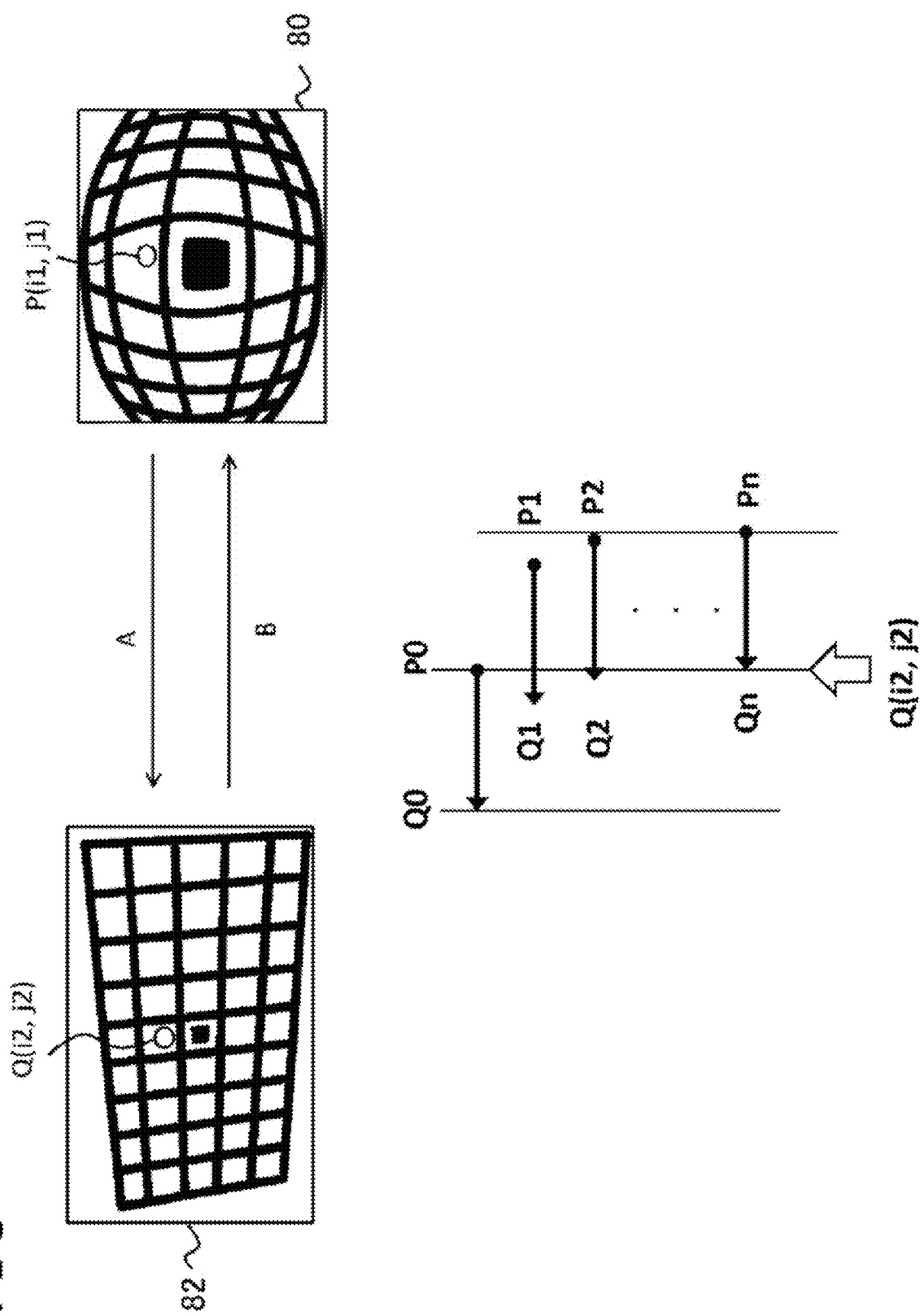
FIG. 13 is a diagram for describing a method of inverse correction of the distortion correction of the lens according to the present embodiment.

FIG. 13 is a diagram for describing a method of inversion correction of the distortion correction of the lens. As illustrated in the upper part of FIG. 13, the process includes a process of using the point Q (i2, j2) on an image 82 without lens distortion to obtain the corresponding point P (i1, j1) in an image 80 with lens distortion (arrow B). The correction in the forward direction for eliminating the lens distortion (arrow A) is as described above, and the correction is also used as it is in the inverse correction.

Specifically, as illustrated in the lower part of FIG. 13, a start point is searched as follows so that an end point after the correction in the forward direction is at the point Q (i2, j2). First, an initial value P0 of the start point is temporarily set at the position of the target point Q (i2, j2), and the correction in the forward direction is performed. An end point Q0 obtained by the correction is obviously deviated from the target point Q (i2, j2). Therefore, for example, the position coordinates of the point P0 are multiplied by a predetermined proportion of the amount of deviation to shift the start point. The correction in the forward direction is applied to the start point P1 again to obtain an end point Q1.

Furthermore, the position coordinates of the point P1 are multiplied by a predetermined proportion of the amount of deviation between the end point Q1 and the target point Q (i2, j2) to further shift the start point, and the correction in the forward direction is performed. The process is repeated until a position Qn of the end point falls withing a predetermined range from the target point Q (i2, j2). A start point Pn upon convergence is set as the end point P (i1, j1) of the inverse correction in the distorted image 80.

Figure 14:
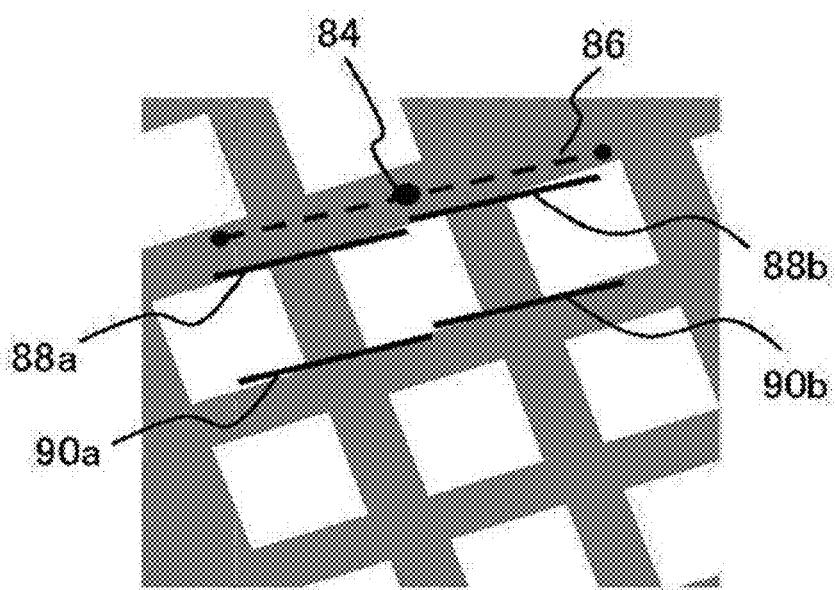
FIG. 14 is a diagram for describing an example of a method of searching grid lines of an image after the correction in S46 of FIG. 9.

FIG. 14 is a diagram for describing an example of the method of searching the grid lines of the image after the correction in S46 of FIG. 9 executed by the distortion correction unit 34. FIG. 14 illustrates an enlarged region near the center in the image after the correction. In the image region, for example, a line segment of a predetermined length around a center 84 of the image is defined, and the total of the pixel values of the line segment is acquired while changing the angle and the position of the line segment. The pixel values are minimum if the entire line segment is in a black region of the grid lines, and therefore, a line segment 86 in such a state is determined.

Next, the line segment 86 is divided into equal parts at the center 84 to obtain two line segments, and the total of the pixel values of each line segment is acquired while moving the line segment in the downward direction of the image plane. When the line segment enters a white rectangle of the chart pattern, the total of the pixel values is large. Threshold determination is actually used to detect such a state. FIG. 14 illustrates line segments 88a and 88b in the state. Here, the right line segment 88b reaches the white rectangle earlier than the left line segment 88a. As a result, it is found out that the initial line segment 86 extends downward to the right with respect to the grid lines of the chart pattern. Therefore, the line segment 86 is adjusted upward to the right by a predetermined angle, and line segments obtained by dividing the line segment 86 again are moved downward to search for a white rectangle. The angle of the original line segment is adjusted based on the timing that the divided line segments reach the white rectangles.

The process is repeated for a predetermined number of times to find out approximate angle and position of the lower edge of the horizontal line of the grid line of the chart pattern. Similarly, the angle and the position are used to define the line segment, and the line segment is divided to obtain two line segments. The totals of the pixel values of the line segments are acquired while further moving the line segments in the downward direction of the image plane. The total of the pixel values is small when the line segment enters a black grid line of the chart pattern. Threshold determination is actually used to detect such a state. FIG. 14 illustrates line segments 90a and 90b in the state. In this case, a process of adjusting the angle based on which one of the line segments reaches the black grid line first and searching for a black grid line again is repeated. As a result, approximate angle and position of the upper edge of the horizontal line of the grid line of the chart pattern are found out.

Subsequently, the search is performed while adjusting the angle upward and downward based on the straight lines, and all of the slopes and the positions of the upper edges and the lower edges of the horizontal lines of the grid lines can be specified. A similar process can also be applied to the vertical lines of the grid lines to specify the slopes and the positions of the left edges and the right edges. A similar process is also carried out when the final image after correction is generated in S52 of FIG. 9. In this case, a region with a black center is further searched in the white rectangular regions surrounded by the grid lines of the chart pattern to thereby detect the image of the marker. In addition, the size of the marker is obtained, and the size is used along with the intervals of the grid lines to acquire the point-of-view position of the imaging apparatus 12.

Figure 15:
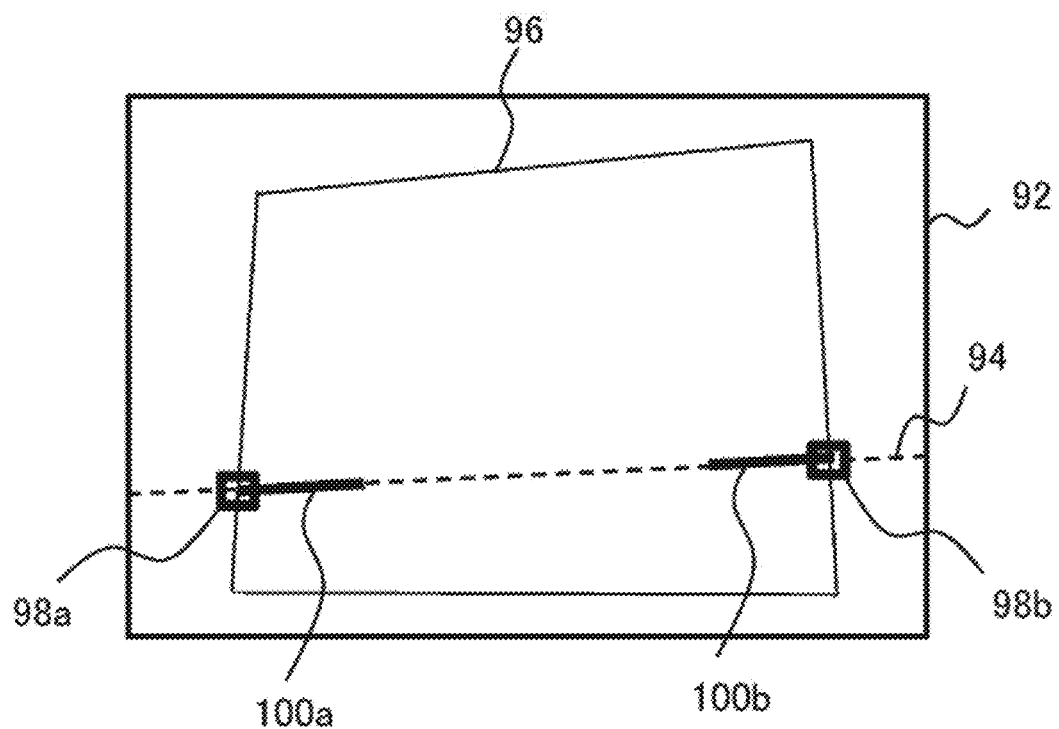
FIG. 15 is a diagram for describing a method of slightly adjusting a line representing a boundary line of the grid line in the present embodiment.

The slope and the position of the boundary line of the grid line specified as described above may be checked in a wide region and slightly adjusted to increase the accuracy. FIG. 15 is a diagram for describing a method of slightly adjusting a line representing the boundary line of the grid line. FIG. 15 illustrates a rectangle 96 detected in an image 92 to be searched, including four outermost straight lines as sides, and illustrates a line 94 to be adjusted. First, intersections 98*a* and 98*b* of the line 94 and the rectangle 96 are acquired.

Next, the intersections 98*a* and 98*b* are set as start points to define, in the center direction of the image, line segments 100*a* and 100*b* of a predetermined length, with the same slope as the line 94. Furthermore, a principle similar to the method of FIG. 14 is used to acquire the totals of the pixel values of the line segments 100*a* and 100*b* while moving the line segments 100*a* and 100*b* upward or downward. In this way, the timing that the line segments 100*a* and 100*b* enter the white rectangles is detected, and the slopes of the straight lines obtained based on the positions are reflected to define the line segments again to repeat the search. According to the process, the slopes and the positions of the boundary lines can be detected at separate positions near both edges of the image, and the boundary lines are connected to provide a line after the adjustment of the line 94.

Figure 16:
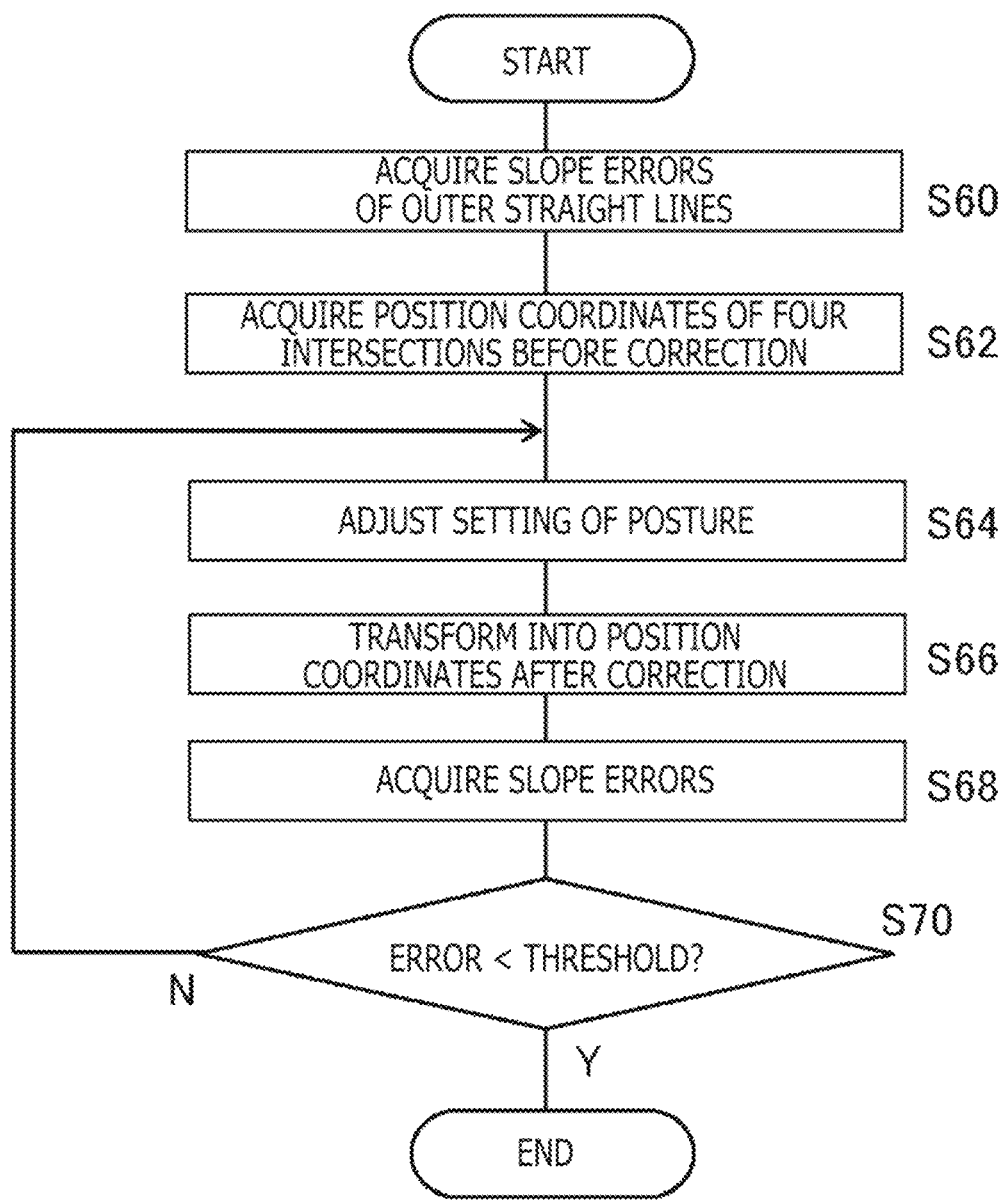
FIG. 16 is a flow chart illustrating a procedure of adjusting the setting of a posture of the imaging apparatus to bring an image of the grid line after the correction into line with horizontal and vertical directions of an image plane in S48 of FIG. 9.

FIG. 16 is a flow chart illustrating a procedure of adjusting the setting of the posture of the imaging apparatus 12 to bring the image of the grid lines after the correction into line with the horizontal and vertical directions of the image plane in S48 of FIG. 9 executed by the distortion correction unit 34. First, slope errors from the horizontal direction or the vertical direction of the image plane are obtained for four outermost straight lines included in the sides of the rectangle 96 of FIG. 15 among the boundary lines of the grid lines detected as described above (S60). Subsequently, the position coordinates of the intersections of the straight lines are acquired, and the position coordinates before the correction of the four points are specified on the captured image (S62). The backward direction correction can be applied to the process.

Furthermore, the setting of the posture of the imaging apparatus 12 is adjusted in the direction for eliminating the errors obtained in S60 (S64), and an assumption of the posture is made to correct the position coordinates of the four points (S66). Furthermore, the slope errors from the horizontal direction or the vertical direction of the image plane are obtained again for each side of the rectangle with the vertex at the position coordinates after the correction (S68). In a case where the errors are equal to or greater than a predetermined threshold (N in S70), the processes from S64 to S68 are repeated. Once the errors become smaller than the threshold, it is determined that the set posture is correct, and the process ends (Y in S70). As a result, the posture of the imaging apparatus 12 can be accurately obtained by tracking the correction status of just four points.

Figure 17:
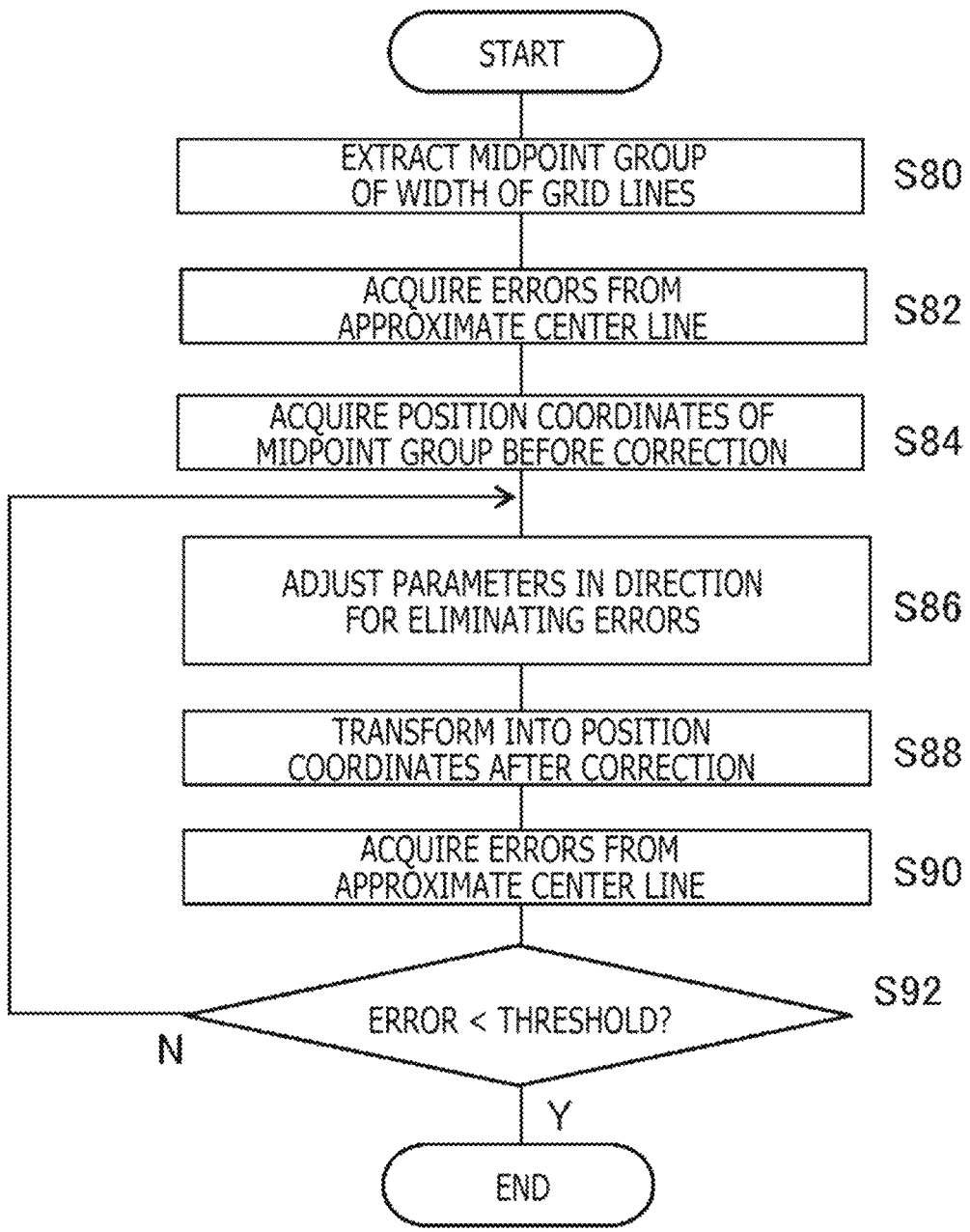
FIG. 17 is a flow chart illustrating a procedure of adjusting an angle of view and a coefficient of the distortion correction in S50 of FIG. 9.

FIG. 17 is a flow chart illustrating a procedure of adjusting the angle of view and the coefficient of the distortion correction in S50 of FIG. 9 executed by the distortion correction unit 34. As described above, the distortion caused by the lens is eliminated from the captured image in the present embodiment, and the distortion correction specific to the fish-eye lens and the correction using the correction coefficient are carried out. The angle of view and the correction coefficient of the imaging apparatus are used for the correction. On the other hand, the temporarily set values are used in the process of S44 in FIG. 9, and the grid lines may be distorted or tilted. Therefore, the parameters are adjusted while the linearity of the grid lines is checked to thereby derive the correct parameters.

First, the information of the boundary lines of the grid lines of the chart pattern detected as described in FIGS. 14 and 15 is used to extract, at predetermined intervals, a midpoint group dividing the width of the grid lines into two equal parts (S80). Next, the least-squares method or the like is used to approximate the extracted midpoint group to a straight line, and the total of the distance from each midpoint to the straight line is acquired as an error (S82). Furthermore, the position coordinates of the midpoint group before the correction are specified on the captured image (S84). The backward direction correction can be applied to the process. Furthermore, each parameter is adjusted in the direction for eliminating the errors obtained in S82 (S86), and the position coordinates of the midpoint group after the correction when the parameters are used to perform the correction are obtained (S88).

Furthermore, as in S82, the errors from the approximate straight line are obtained (S90), and in a case where the errors are equal to or greater than the threshold (N in S92), the processes from S86 to S90 are repeated. Once the errors become smaller than the threshold, it is determined that correct parameters are obtained, and the process ends (Y in S92). In this case, the parameters including the angle of view of the imaging apparatus 12 can also be efficiently obtained by tracking the correction status of a limited number of points.

Figure 18:
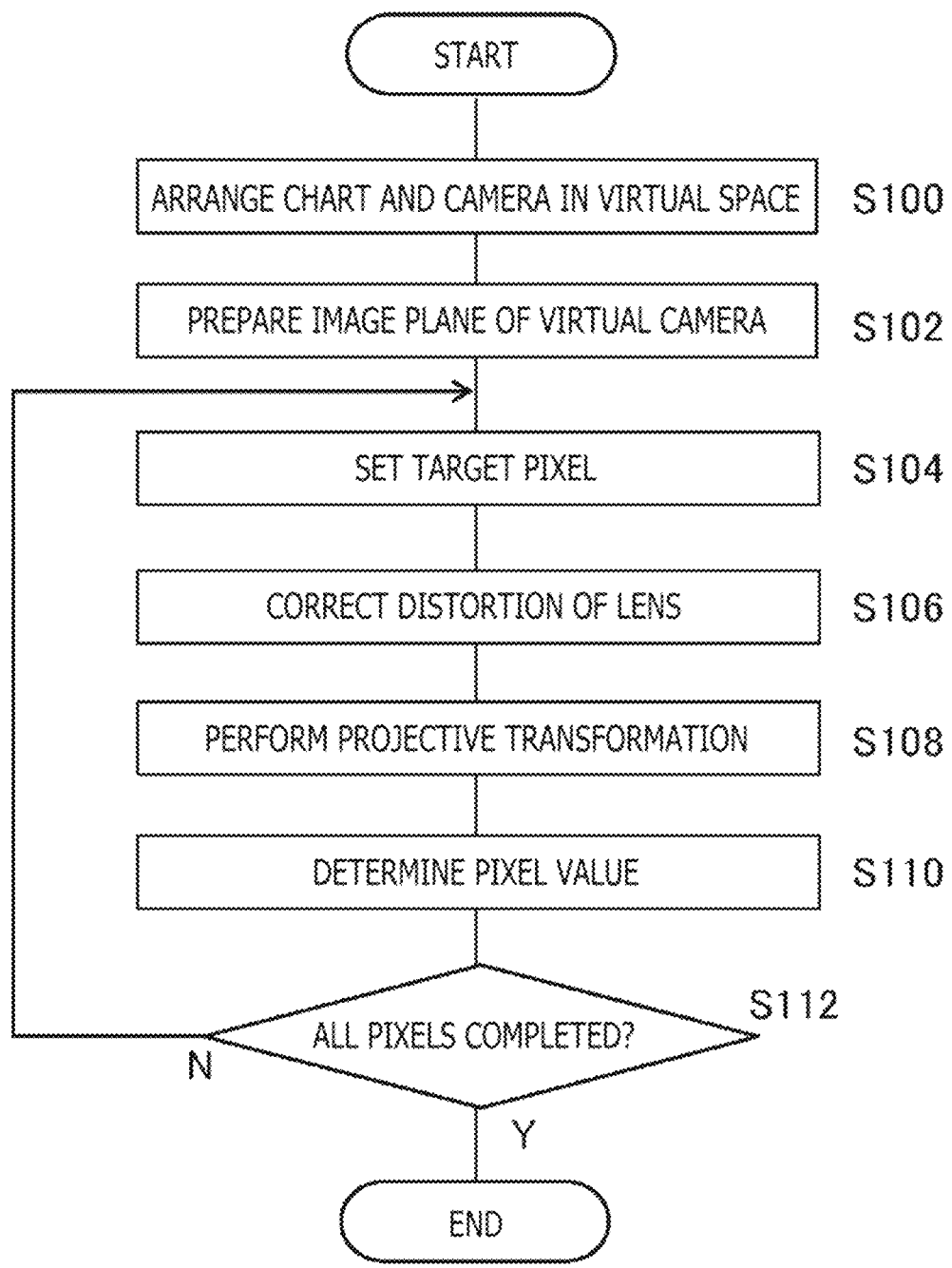
FIG. 18 is a flow chart illustrating a procedure of drawing a pseudo image executed by a pseudo image drawing unit according to the present embodiment.

FIG. 18 is a flow chart illustrating a procedure of drawing the pseudo image executed by the pseudo image drawing unit 42. The process corresponds to S14 of FIG. 6. The pseudo image drawing unit 42 first arranges the object model of the chart 200 in the virtual three-dimensional space as illustrated in FIG. 10 and further arranges the virtual camera with the posture and the angle of view of the imaging apparatus 12 acquired as illustrated in FIGS. 16 and 17 (S100). Temporary values are set for the position. Furthermore, the image plane of the virtual camera is prepared (S102), and each pixel in the image plane is set as a start point to obtain the corresponding position on the chart 200. The process corresponds to the forward direction correction.

That is, as described in FIG. 8, for each pixel of the image plane of the virtual camera in which the distorted image is to be originally displayed (S104), the distortion specific to the fish-eye lens is corrected, and the correction coefficient is used to perform the correction (S106). The value of each parameter of the imaging apparatus 12 illustrated in FIG. 17 is used for the correction. At this point, the pixel array of the central projection without lens distortion is provided, and the general projective transformation according to the position and the posture of the virtual camera is used to determine the position coordinates of the referenced pixel on the pattern of the chart 200 (S108).

Furthermore, the pixel value is referenced from the position of the referenced pixel to determine the pixel value of the target pixel in the image plane of the virtual camera (S110). The processes from S104 to S110 are applied to all pixels of the image plane (N in S112), and the process ends once the process is completed (Y in S112). The pseudo image of the captured image generated in this way is supplied to the distortion correction unit 34. The distortion correction unit 34 applies the same process as described in FIG. 9 to the image. That is, the distortion correction unit 34 uses various parameters regarding the imaging apparatus obtained in the correction process for the captured image to carry out the correction process and generates the image without distortion.

In this case, the grid lines are also searched in the image as described in FIGS. 14 and 15, and the marker is further detected to acquire the intervals of the grid lines and the position of the marker. Furthermore, the intervals of the grid lines and the position of the marker are compared with the intervals of the grid lines and the position of the marker in the corrected image of the captured image acquired in S52 of FIG. 9, respectively. In the case where the position of the virtual camera is different from the actual position, the parameters are different from the values obtained for the captured image. Therefore, the point-of-view adjustment unit 44 adjusts the point-of-view position of the virtual camera to eliminate the difference. For example, the pseudo image drawing unit 42 is caused to draw again a pseudo image at the point-of-view position after the adjustment, and the pseudo image is corrected to make an adjustment so that the intervals of the grid lines and the position of the marker match the actual intervals of the grid lines and the position of the marker.

On the other hand, the adjustment process may be made efficient by using only the image after the correction of the pseudo image. That is, the relationship between the differences between the intervals of the grid lines and the actual intervals of the grid lines and between the position of the marker and the actual position of the marker and the amount of movement of the point-of-view position necessary for eliminating the difference is obtained in advance. The point-of-view position moved by using the relationship based on the actual difference is the position of the imaging apparatus to be obtained. Note that in the case where the imaging apparatus 12 is a multi-lens camera, the process illustrated in FIG. 6 is applied to each captured image. As a result, the position and the posture of each camera can be obtained, and the position and the posture can be used in the same way as external parameters of a general camera. That is, the position and the posture can be used to correct the captured image in extracting the corresponding point from the image captured by each camera.

Figure 19:
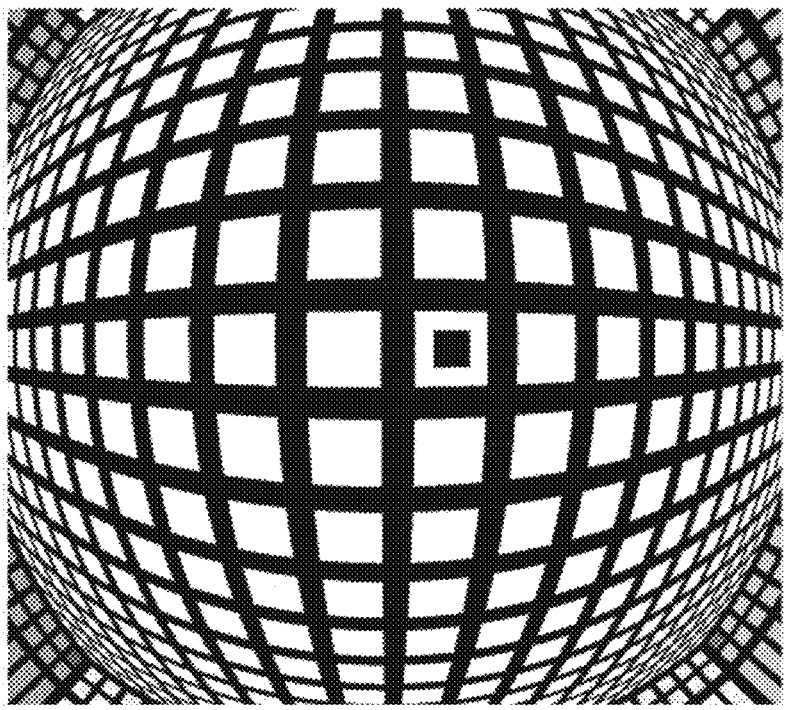
FIG. 19 is a diagram exemplifying an actual pseudo image generated by the pseudo image drawing unit according to the present embodiment.
Figure 20:
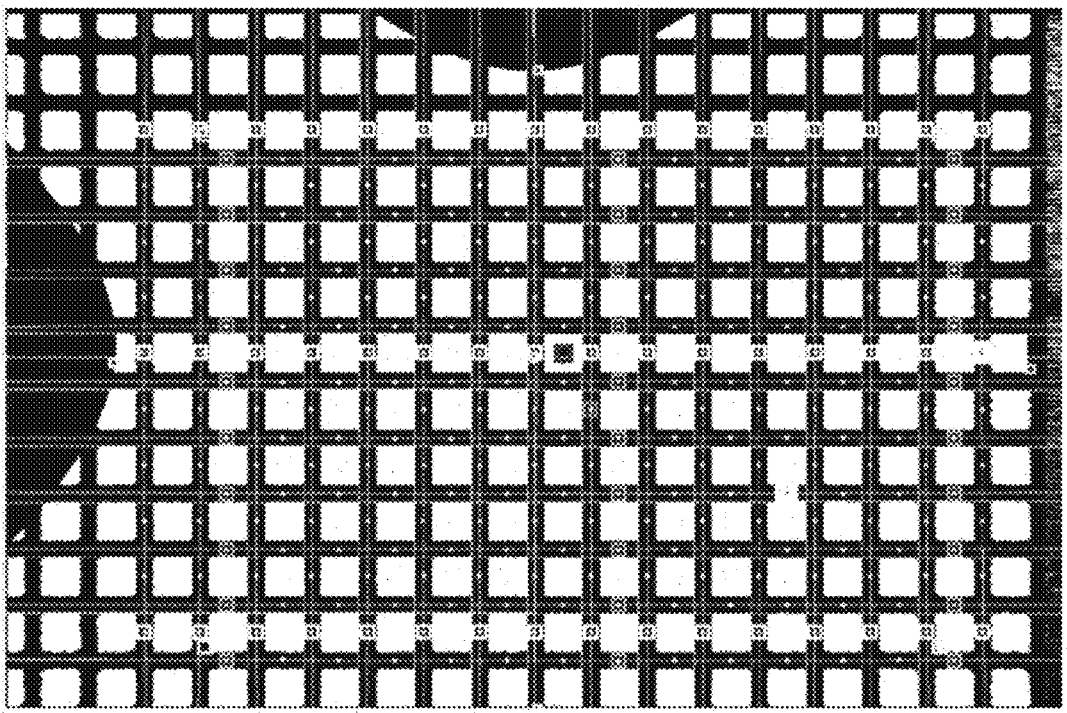
FIG. 20 is a diagram illustrating an image after the correction of the pseudo image illustrated in FIG. 19.

FIG. 19 exemplifies an actual pseudo image generated by the pseudo image drawing unit 42. That is, FIG. 19 illustrates a captured image when the chart arranged in the virtual space is to be captured by the virtual camera including the fish-eye lens. However, the position of the virtual camera is the position after the adjustment by the point-of-view adjustment unit 44. As a result, it can be recognized that an image substantially the same as the captured image 50 of FIG. 7 is obtained. FIG. 20 illustrates an image after the correction of the pseudo image illustrated in FIG. 19. The image is also substantially the same as the image 52 after the correction in FIG. 7.

Strictly speaking, in the image 52 after the correction of the actual captured image, the distortion characteristics slight vary depending on the position on the image. Therefore, the grid lines may be slightly distorted. However, there is no such a variation in the image of FIG. 20. Therefore, the correction process can reproduce the chart pattern including the grid lines orthogonal to each other. Furthermore, the intervals of the grid lines and the position of the marker in the image obtained first by correcting the pseudo image are actually different from the actual intervals of the grid lines and the position of the marker depending on the setting position of the virtual camera. The position of the point of view can be adjusted so that the intervals of the grid lines and the position of the marker become the same as the actual intervals of the grid lines and the position of the marker, and an image substantially the same as the image 52 after the correction of the captured image can be obtained as illustrated in FIG. 20.

FIG. 21 illustrates another example of the pattern of the chart 200 that can be applied to the present embodiment. The illustrated pattern is called a fractal barcode which is disclosed in the specification of U.S. Pat. No. 7,857,232. In the fractal barcode, a minimum unit of two-dimensional barcode is arranged in two rows and two columns, and this is further arranged in two rows and two columns. In this way, a repeated pattern of a nested layered structure is provided, and the information to be embedded can also be provided in a layered structure. In addition, each barcode includes information regarding the position with respect to the entire barcodes. Therefore, necessary information can be obtained even if only a partial region of the barcodes is imaged by bringing the imaging apparatus close.

Thus, the fractal barcode can be used as a marker of the chart pattern of the present embodiment, or a plurality of fractal barcodes can be arranged in the entire chart to substantially specify the position of the imaging apparatus with respect to the chart based on the captured image. Therefore, the virtual camera in the pseudo image drawing unit 42 can be accurately set compared to the original setting, and the processing efficiency can be improved. In addition, a similar effect can be obtained even if only part of the chart is imaged, and the necessity of positioning in imaging can be further reduced. For example, the calibration can be performed if the fractal barcode is in part of the wide field of view of the fish-eye lens.

FIG. 22 exemplifies captured images of the chart 200, (a) illustrating a captured image in a case where the chart pattern including the grid and the marker is displayed on the display screen of a mobile terminal, (b) illustrating a captured image in a case where the chart pattern including the fractal barcode is displayed on a television receiver. The pattern of the chart can be clearly imaged even when the pattern is displayed on the screen of an electronic device in this way. Furthermore, in the case of (b) fractal barcode, the calibration can be performed even when only a partial region is imaged as illustrated. Therefore, a general user can cause an electronic device possessed by the user to display the chart at arbitrary timing during operation to thereby easily carry out the calibration.

For example, the chart can be displayed on a stand-alone monitor or television receiver, and calibration of an imaging apparatus included in a head mounted display worn by the user can be performed. In this way, the position and the posture of the head mounted display with respect to the monitor or the like are found out. This state can be set as the start point, and the images continuously captured by the imaging apparatus can be tracked to track the motion of the head mounted display. In addition, the relationship between an object in the field of view and the monitor can be found out, and an indoor environment map can be easily created. Simultaneous localization and mapping (SLAM) is known as a technique of analyzing images to create a surrounding environment map. The present embodiment can also be applied to such an image analysis technique.

Figure 23:
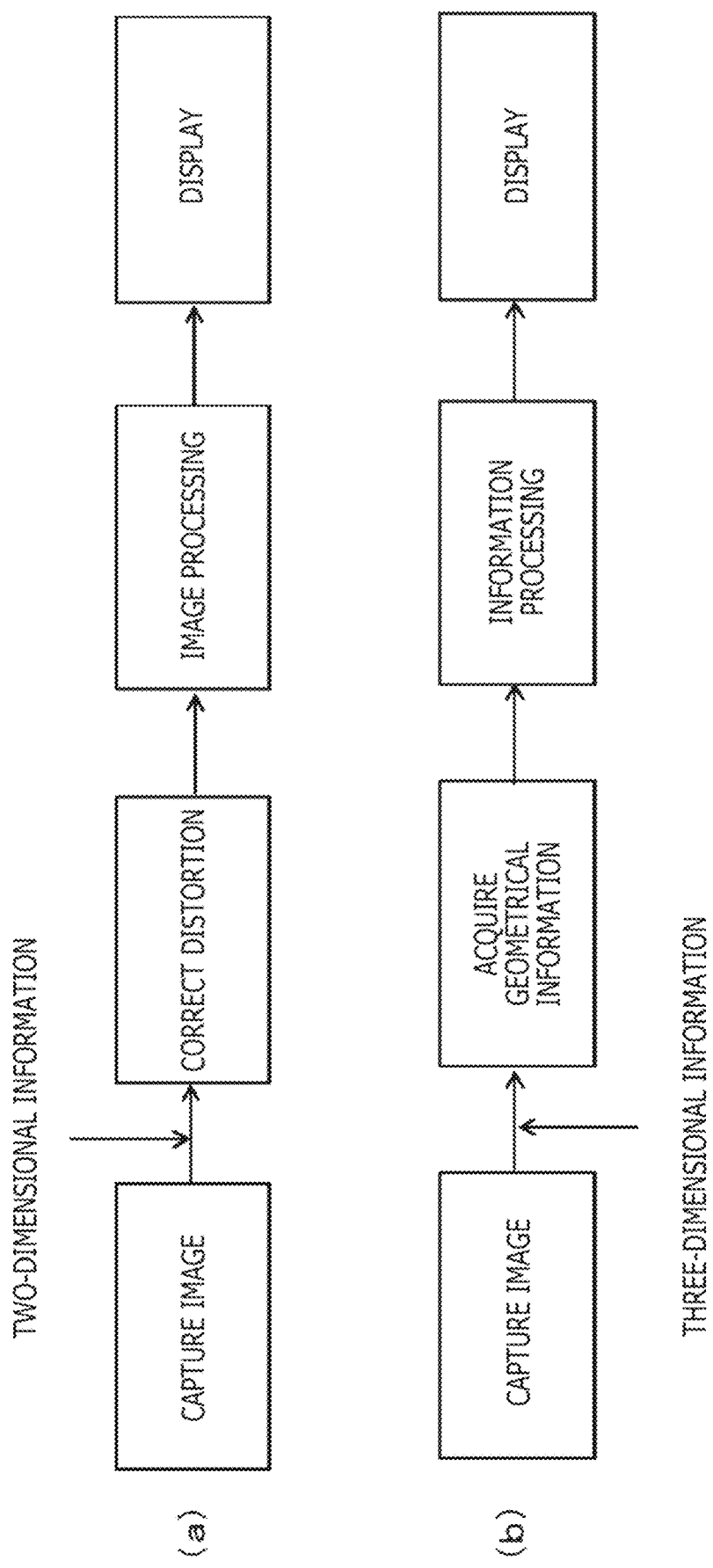
FIG. 23 is a diagram for describing a difference between a system of a general process using an imaging apparatus including a wide-angle lens during operation and a system of the process using the present embodiment.

FIG. 23 is a diagram for describing a difference between the system of the general process using the imaging apparatus including the wide-angle lens during operation and the system of the process using the present embodiment. In the general process illustrated in (a), the two-dimensional correction information on the image plane is mainly used. As illustrated in (a), the image processing is executed, and then the correction information on the plane is provided. The distortion correction and the like can be carried out according to the correction information. As a result, the image processing can be easily executed, and an image without a sense of discomfort in displaying the image can be obtained. To attain the purpose, the image captured by the fish-eye lens can be transformed into planar information early in the calibration.

On the other hand, in the present embodiment, the distortion of the fish-eye lens can be used in the calibration to obtain three-dimensional information, such as a relationship between the position and posture of the imaging apparatus and the position and posture of the chart. The angle of view is also three-dimensional information in terms of defining the field of view with respect to the point of view. Therefore, the three-dimensional information is provided for the captured image during operation as illustrated in (b), and geometrical information in the three-dimensional space can be acquired. For example, the information can be used to create the environment map. The result can be used to significantly increase the variations of information processing. In a case of displaying the result, more attractive image world, such as virtual reality and augmented reality, can be accurately expressed.

According to the present embodiment described above, the fish-eye lens is used to image the chart of a predetermined pattern to perform the calibration. In this case, the distortion caused by the fish-eye lens is used to obtain the angle of view of the imaging apparatus. As a result, one of the angle of view and the point-of-view position, which are difficult to isolate in one imaging, can be known. Furthermore, the obtained posture can be used to draw an image on the model of the chart as viewed from the virtual camera and compare the image with the actual image to thereby specify the point-of-view position.

As a result, general parameters, such as a correction coefficient, can also be acquired without the burden of fixing the interval between the chart and the imaging apparatus to capture an image or the burden of changing the direction of the imaging apparatus to repeatedly capture images for a plurality of times. In addition, to correct the lens distortion, the image of the equidistant projection of the fish-eye lens is first corrected to the image of the central projection, and then the general correction equation is applied. This can improve the conventionally observed situation that the longer the distance from the center of the image, the lower the correction accuracy. As a result, the information can be acquired from the entire image, and the accuracy of the calibration and the information processing using the calibration can be improved.

To obtain various parameters from the imaging apparatus, the correction is repeated while the parameters are adjusted until the target image is obtained. In this case, the optimal value of the parameter can be efficiently obtained by focusing on only the sampling point to be evaluated in the target image and tracking the change due to the adjustment. The present embodiment is none other than using the fish-eye lens to acquire the three-dimensional information from one captured image. Therefore, the present embodiment can be used for a geometrical process in the three-dimensional space, such as creating an environment map, during operation, and variations of the process using the captured image can be increased.

The present embodiment can be applied to the multi-lens camera to acquire the relative position of all cameras and the difference in posture. This can be used to adjust the position of the image captured by each camera, and the position of the subject can be easily acquired by using this. In a stitching process of connecting the captured images of the multi-lens camera to provide a display image, the difference in the relative position and the posture of the cameras can be taken into account to make a slight adjustment based on the projective transformation in the three-dimensional space, and more precise connection can be realized.

In addition, the position and the posture of the captured image with respect to the chart are also found out, and the chart and the imaging apparatus do not have to be strictly positioned in the calibration. The fractal barcode can be used as a chart pattern to specify the position of the imaging apparatus even when only a partial region is imaged, and this further increases the degree of freedom in imaging. The chart can also be displayed on an electronic device, and the user can easily carry out the calibration regardless of time or location. This can be used as a basis for the subsequent continuous acquisition of information, and the latest correction environment can be provided in relation to the temporal change in the apparatus.

The present invention has been described based on the embodiment. The embodiment is exemplary, and it can be understood by those skilled in the art that various modifications can be made regarding the combinations of the constituent elements and the processes, and the modifications are also within the scope of the present invention.

For example, the distortion correction unit of the present embodiment makes an assumption of the parameters to correct the captured image of the chart and derives the parameters by making an adjustment until the image becomes equivalent to the original chart pattern. In the time course of the process, the distortion correction unit performs distortion correction specific to the fish-eye lens based on the difference in the projective transformation. On the other hand, the correction method can be used not only for the calibration, but also for the correction of any image captured by the fish-eye camera.

That is, an image of outdoors or indoors captured by the fish-eye camera is transformed into an image of the central projection as illustrated in FIG. 11. Furthermore, a general correction equation using a correction coefficient is applied to perform the correction as necessary, and this is displayed or used for information processing. In this case, the entire image can be accurately corrected, and the distortion that often occurs in the image with a wide field of view can be minimized.

Furthermore, in the present embodiment, the distortion correction unit adjusts the parameters, such as an angle of view and a correction coefficient, as described above, and the pseudo image drawing unit uses the parameters to set the virtual camera. On the other hand, other means may be used to acquire the parameters, and the pseudo image drawing unit may use the data to set the virtual camera. For example, a general calibration method is used to acquire the correction coefficient, and a motion sensor included in the imaging apparatus acquires the posture of the imaging apparatus. The result may be used to generate a pseudo image, and the point of view of the virtual camera may be adjusted as in the present embodiment to specify the position of the imaging apparatus.

Alternatively, the posture may also be unknown in addition to the position of the imaging apparatus. In this case, while both the point-of-view position and the line-of-sight vector of the virtual camera are adjusted, the pseudo image obtained as a result of the adjustment can be checked. The point-of-view position and the line-of-sight vector when the pseudo image matches the captured image can be determined as the position and the posture of the imaging apparatus. For the comparison with the captured image, the grid lines and the marker in the image after the correction can be used as in the present embodiment to accurately evaluate the degree of coincidence.

In addition, although the distortion correction unit 34 in the present embodiment performs the set of the correction for transforming the project system, the general correction using the correction coefficient, and the projective transformation based on the difference in posture from the reference state, one or two of these may not be performed. For example, the correction using the correction coefficient may not be performed as long as the accuracy required only in the correction for transforming the projection system can be obtained. Furthermore, in a situation where it is apparent that the imaging apparatus directly faces the chart, the projective transformation may not be performed. An advantageous effect similar to the present embodiment can also be obtained in this way.

Embodiment 2

In Embodiment 1, the distortion specific to the fish-eye lens is basically transformed into the image of the central projection in the positional relationship in which the optical axis of the imaging apparatus matches the line perpendicular to the chart surface as illustrated in FIG. 11. According to the method, the distortion correction of the chart pattern can be realized by easy calculation. On the other hand, the wider the angle of the lens is, the lower the correction accuracy of the pattern in a region away from the optical axis may be. Therefore, in the present embodiment, accurate correction is made possible in the entire captured image regardless of the angle of view of the imaging apparatus 12. The configuration of the functional blocks of the calibration apparatus 10 and the main procedure of calibration are similar to those illustrated in FIGS. 5 and 6. Hereinafter, differences from Embodiment 1 will be mainly described.

FIG. 24 exemplifies captured images of a chart pattern in which the position and the posture with respect to the fish-eye lens are different. An upper part of FIG. 24 illustrates bird's-eye views of positional relationships between the screen surface and the surface of the chart when each image is captured. In FIG. 24, (a) illustrates a captured image of a case in which a chart surface 302a directly faces a screen surface 300 as illustrated in Embodiment 1, (b) illustrates a captured image of a case in which a line perpendicular to a chart surface 302b is tilted 45° to the left with respect to an optical axis oa, and (c) illustrates a captured image of a case in which a line perpendicular to a chart surface 302c is titled 90° to the left with respect to the optical axis oa.

According to the wide-angle fish-eye lens, a chart in a wide range can be imaged. Therefore, if the image can be corrected with the same accuracy regardless of the position and the direction of the chart as long as the pattern is imaged, the calibration that can utilize the characteristics of the fish-eye lens to the maximum extent can be realized by one imaging. Therefore, the distortion correction unit 34 and the pseudo image drawing unit 42 of the present embodiment perform calculation different from Embodiment 1 to restore the chart pattern including orthogonal grid lines from an illustrated captured image or to generate a pseudo image of the captured image.

Figure 25:
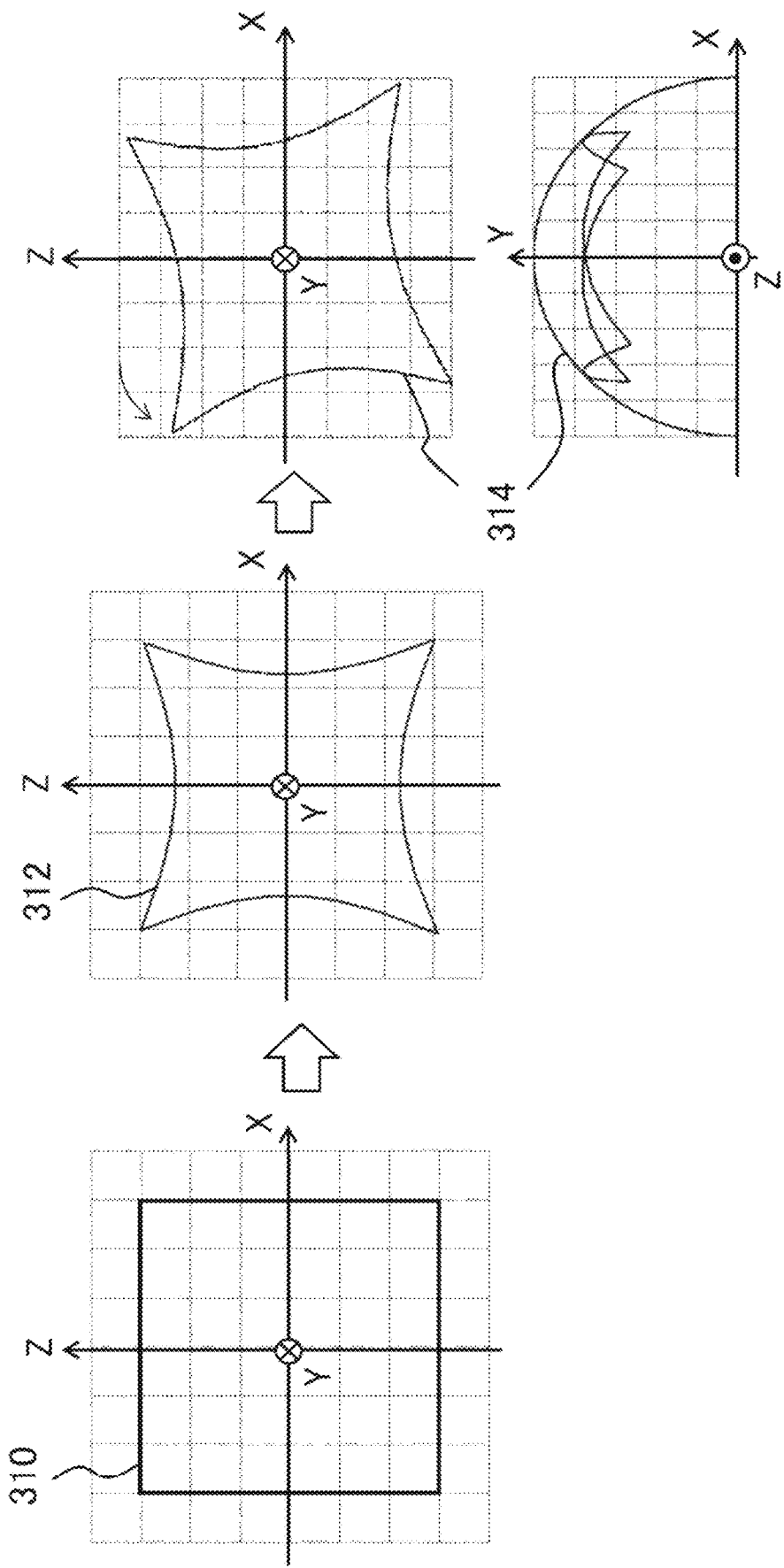
FIG. 25 is a diagram for describing a procedure of generating the pseudo image in the present embodiment.
Figure 27:
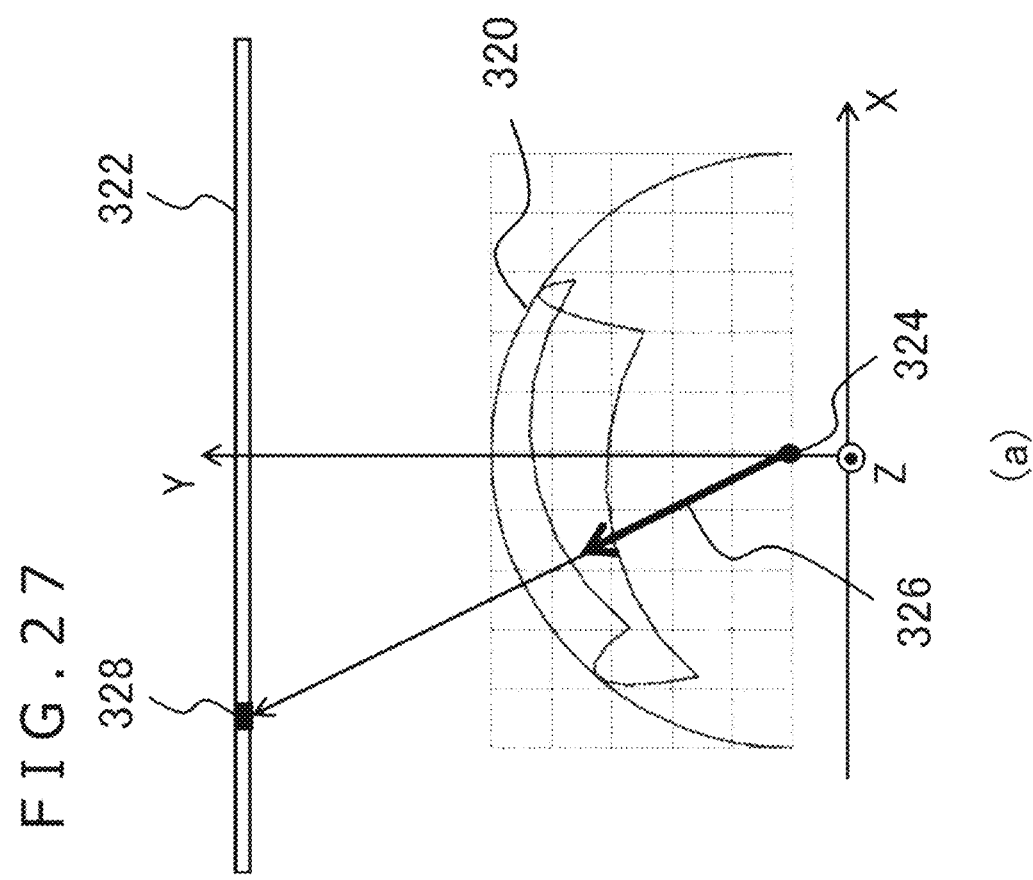
FIG. 27 is a diagram for describing a procedure of generating the pseudo image in the present embodiment.

First, a method of generating a pseudo image executed by the pseudo image drawing unit 42 will be described. FIGS. 25, 26, and 27 are diagrams for describing the procedure of generating the pseudo image in the present embodiment. As described in FIG. 18, the pseudo image drawing unit 42 arranges the object model of the chart and the virtual camera in the virtual three-dimensional space similar to FIG. 10 and sets each pixel of the image plane corresponding to the screen surface of the virtual camera as a start point to obtain the position on the chart indicated there.

In the present embodiment, the screen surface is originally spherical in the distortion correction of the lens in S106 of FIG. 18, and based on this, the screen surface is modified and rotated in the three-dimensional space. A coordinate system illustrated in FIGS. 25, 26, and 27 is similar to FIG. 10, and the coordinate system is defined by an XZ plane parallel to the chart and a Y-axis vertically intersecting at the center of the chart. First, a region 310 in FIG. 25 represents an initial state in which a square region directly facing the chart pattern in the screen surface of the virtual camera is indicated by an XZ space.

Although the screen surface is actually curved in the Y-axis direction, the region 310 in the XZ space corresponds to a state in which the original chart pattern is viewed from the front. The following process corresponds to obtaining a change in position on the chart pattern projected onto each pixel of the region 310 when the curve of the screen surface is taken into account. Note that the point of view matches the origin at this stage.

A region 312 is obtained by applying, to the region 310, the inverse correction of the general distortion correction using the correction coefficient. The recursive method illustrated in FIG. 13 can be used for the process. However, only the general distortion correction calculation using the lens distortion correction coefficient and the tangential distortion correction coefficient is considered here. In addition, although the correction equation up to the sixth degree is illustrated in Embodiment 1, terms of a higher degree may be included. In a case where a coefficient for correcting the barrel distortion is provided, the region 312 has a pincushion shape as illustrated.

As described above, the screen surface is actually attached to a sphere around the point of view. Therefore, when the posture of the virtual camera is to be changed, the screen surface in the spherical state can be rotated according to the roll angle r, the tilt angle q, and the pan angle p to accurately reflect the original situation. The rotation in the roll direction is rotation about the Y-axis of the three-dimensional space, that is, rotation in the XZ plane. In the illustrated example, the screen surface is rotated by roll angle r=10° to provide a region 314. A lower part illustrates the state of the region 314 in the XY space when the imaging environment is looked down from above. As illustrated in the lower part, the region 314 is considered to be attached to the sphere of the lens.

With reference to FIG. 26, the rotation in the tilt direction is rotation about the X-axis in the three-dimensional space. In the illustrated example, the region 314 of FIG. 25 is rotated by tilt angle q=10° to obtain a region 316, and a bird's-eye view of the region 316 is illustrated. The rotation in the pan direction is rotation about the Z-axis in the three-dimensional space. In the illustrated example, the region 316 is rotated by pan angle p=10° to obtain a region 318, and a bird's-eye view of the region 318 is illustrated. In a case where the point of view is not at the origin, the sphere is further moved parallel in the three-dimensional space. In the illustrated example, the sphere is moved 200 mm closer to the plane of the chart to provide a region 320. Note that the order of the rotation of the pan, the tilt, and the roll and the parallel movement is not limited to the illustrated one.

FIG. 27 illustrates a state of projecting the image of the chart onto the screen surface after the transformation. In FIG. 27, (a) illustrates a bird's-eye view of the region 320 of the screen surface after the transformation and a chart 322, as illustrated in FIG. 26. As a result of the illustrated transformation, the location in the three-dimensional space after the displacement of each pixel of the region 310 in the XZ space is found out. Therefore, a vector 326 from a point of view 324 of the virtual camera to the location after the displacement is obtained for each pixel. A point 328 on the chart 322 displayed as an image on the pixel exists at a location of extension of the vector 326.

That is, the vector 326 can be obtained for each pixel to acquire the position on the chart pattern displayed on the pixel. In FIG. 27, (b) illustrates a region on the chart 322 projected onto the region 320. The region has a pincushion shape as a whole as a result of the inverse correction of the barrel distortion. In addition, as a result of applying the rotation of pan, tilt, and roll in the forward direction for the posture of the virtual camera, a region with asymmetric distortion is formed as illustrated. The image of the region can be arranged as pixels of the original image plane to generate a pseudo image captured by the fish-eye lens.

As a result of the procedure, the pseudo image can be basically generated without a restriction on the angle of view. FIGS. 28 and 29 illustrate examples of the pseudo image that can be generated in the present embodiment. FIGS. 28 and 29 illustrate a situation in which the chart pattern is displayed inside each of the six surfaces of the cubes, and the point of view of the virtual camera is placed at the center. Note that the color of the chart varies according to the surface. FIG. 28 illustrates pseudo images when the posture of the virtual camera with the horizontal angle of view of 140° is changed.

Among these, as illustrated in a left bird's-eye view, (a) illustrates a pseudo image generated in a state in which the virtual camera directly faces a surface 330 of the cube, that is, all of the pan angle, the tilt angle, and the roll angle are 0° when the surface parallel to the surface is defined as an XZ plane. As illustrated in a right bird's-eye view, (b) illustrates a pseudo image in a state in which the pan angle is 30° and the tilt angle and the roll angle are 0°, and as illustrated in a left bird's-eye view, (c) illustrates a pseudo image in a state in which the tilt angle is 45° and the pan angle and the roll angle are 0°. As illustrated in a right perspective view, (d) illustrates a pseudo image in a state in which the pan angle is 60°, the tilt angle is 20°, and the roll angle is 45°.

FIG. 29 illustrates pseudo images when the horizontal angle of view of the virtual camera is changed in the state in which the virtual camera directly faces one surface of the cube. The horizontal angle of view is 90° in (a). The point of view is at the center of the cube, and as a result, the breadth of the image of the chart matches the breadth of the captured image. The horizontal angle of view is 140° in (b), and the horizontal angle of view is 180° in (c). In the case of (c), the front half of the left and right surfaces of the cube is in the angle of view. The horizontal angle of view is 270° in (d), and the horizontal angle of view is 360° in (e).

In the case of (e), the surface in the backward direction of the optical axis among the six surfaces of the cube is in the peripheral region of the field of view, and the marker at the center of the chart on the surface is displayed on the circumference of the edges of the field of view. In this way, according to the method of the present embodiment, the change in the captured image dependent on the posture and the angle of view of the virtual camera can be truly reproduced. In addition, general lens distortion, such as barrel distortion, can also be reflected.

Figure 30:
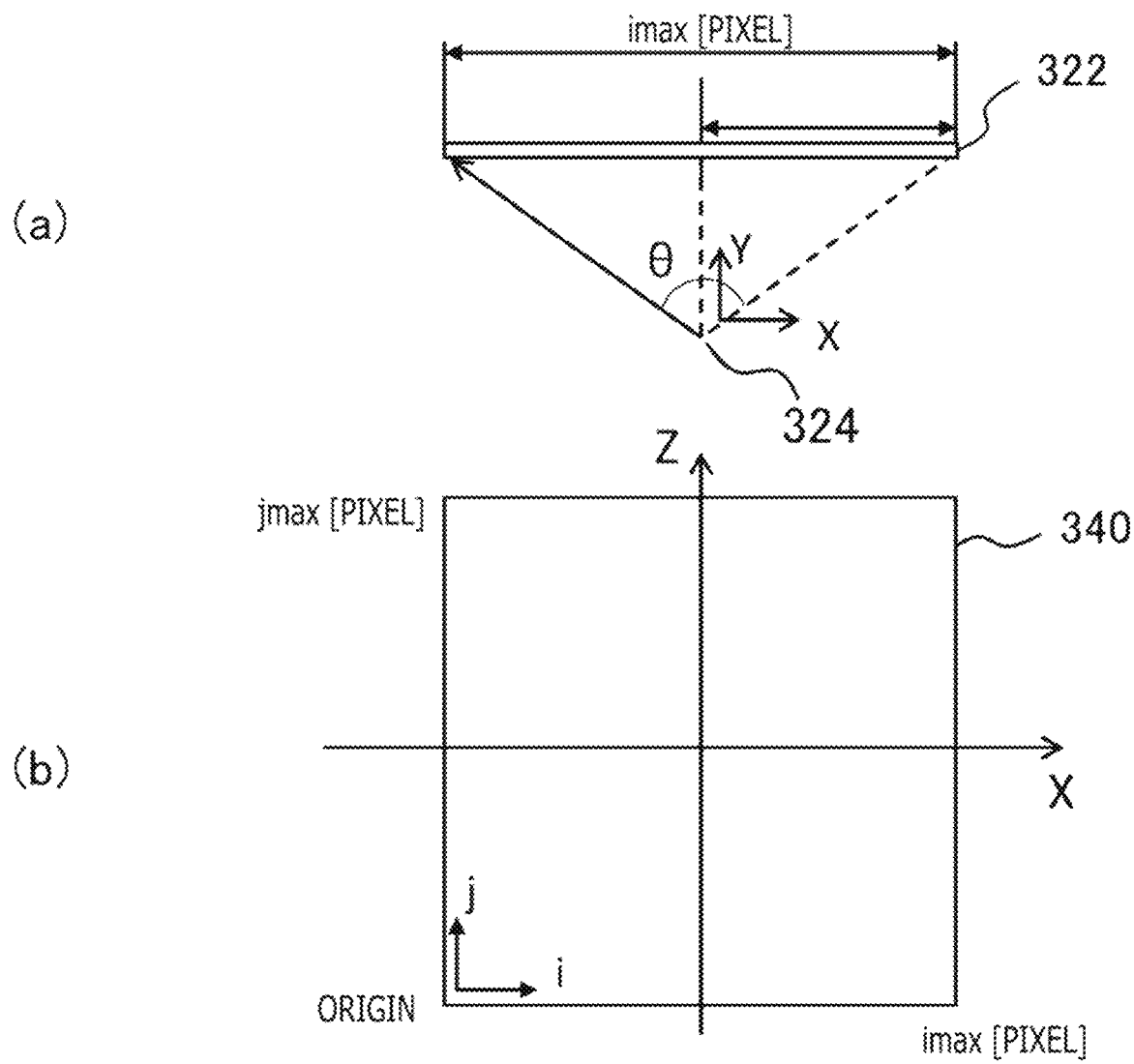
FIG. 30 is a diagram illustrating definition of parameters used for calculation in the present embodiment.

Next, a method of acquiring position coordinates in the three-dimensional space from two-dimensional coordinates of a pixel defined in the XZ space when the screen surface is attached to the sphere will be described. FIG. 30 illustrates definition of parameters used for the calculation. In FIG. 30, (a) illustrates a state in which the three-dimensional space is looked down from above, and (b) illustrates the XZ space. An image plane 340 represents a region in which the chart pattern is imaged, as in the region 310 of FIG. 25. The position coordinates of each pixel are expressed by (i, j), with the origin at the lower left.

The sizes in the horizontal direction and the vertical direction of the chart 322 in the image plane 340 correspond to the number of horizontal pixels imax and the number of vertical pixels jmax of the image plane 340. In addition, when the angle range in the horizontal direction of the chart 322 from the point of view 324 is defined as θ, the number of pixels (pixel density) Dens of the image plane 340 corresponding to the angle of view of 1° in the horizontal direction is as follows.

$$dens=i\,max/(2*\theta)$$

Figure 31:
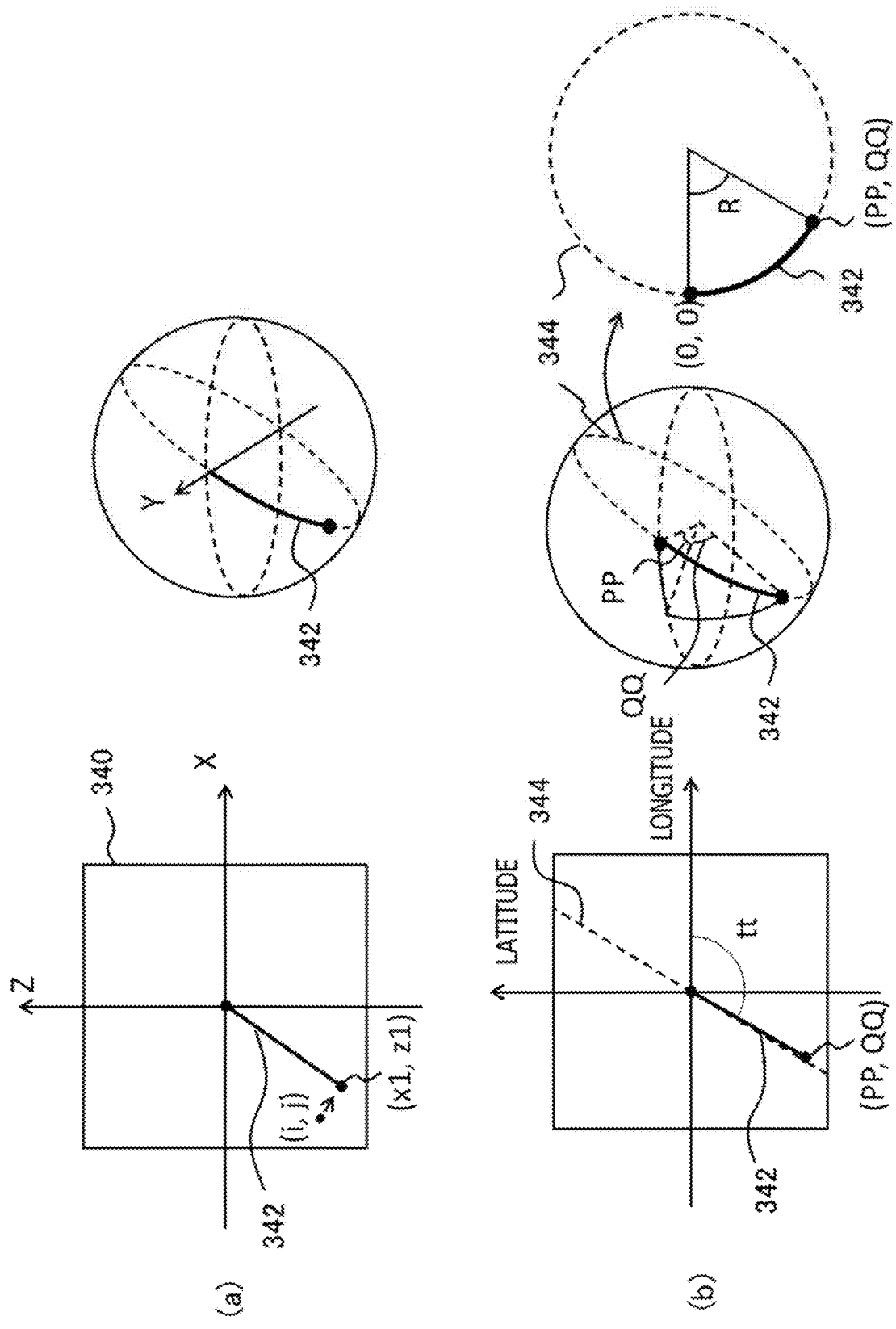
FIG. 31 is a diagram schematically illustrating a procedure of obtaining position coordinates in a three-dimensional space corresponding to position coordinates in the image plane in the present embodiment.
Figure 32:
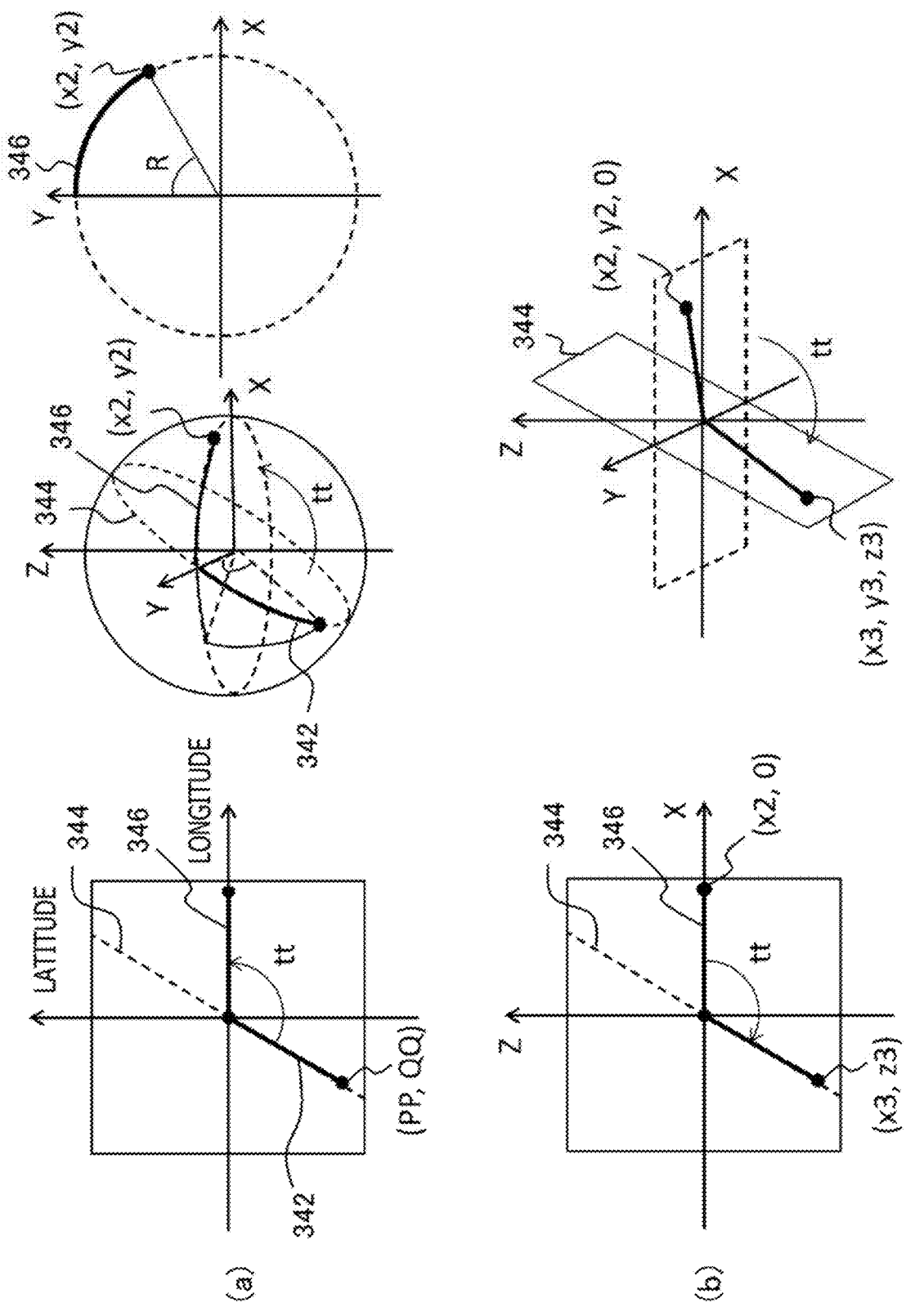
FIG. 32 is a diagram schematically illustrating a procedure of obtaining the position coordinates in the three-dimensional space corresponding to the position coordinates in the image plane in the present embodiment.

FIGS. 31 and 32 schematically illustrate a procedure of obtaining the position coordinates in the three-dimensional space corresponding to the position coordinates (i, j) in the image plane. First, (a) illustrated in an upper part of FIG. 31 illustrates the position coordinates (i, j) on the image plane 340. The position coordinates (i, j) are converted into the position coordinates in the XZ space with the origin at the center of the image plane 340, and the inverse correction of the lens distortion correction is carried out. The equations of general lens distortion and tangential distortion are used to carry out the correction as described in FIG. 13. The coordinates obtained in this way will be referred to as (x1, z1).

Although a line 342 from the origin of the XZ space to (x1, z1) is linear in the XZ space, the line 342 is wound along a unit sphere in the three-dimensional space as illustrated on the right side of (a). Therefore, the position coordinates (x1, z1) are transformed into the position coordinates in the two-dimensional space including the longitude and the latitude as illustrated in (b) of a lower part. Assuming that a point of Y=1 on the Y-axis is the origin in the longitude and latitude space, longitude PP and latitude QQ after the transformation are as follows.

$$PP=x1/dens$$

$$QQ=z1/dens$$

A diagram at the center of (b) illustrates a perspective view of the longitude PP and the latitude QQ in the unit sphere. Furthermore, in a diagram at the right edge, a plane 344 including the line 342 from the origin to the coordinates (PP, QQ) in the longitude and latitude plane is extracted and illustrated. As illustrated in (b), an angle R of the line 342 wound around the unit sphere is an angle of a combination of the longitude PP and the latitude QQ and is obtained as follows.

$$R=(PP^2+QQ^2)^{1/2}$$

In addition, an angle tt of the line 342 from the longitude axis in the longitude and latitude space corresponds to an angle of the plane 344, which includes the line 342, from the XY plane and is obtained as follows.

$$tt=atan(QQ/PP)$$

To obtain position coordinates (x3, y3, z3) of the coordinates (PP, QQ) in the three-dimensional space, the plane 344 is first rotated by the angle tt to bring the plane 344 into line with the XY plane as illustrated in an upper part (a) of FIG. 32.

As a result of the transformation, the line 342 is changed to a line 346, and the following equations are used to transform the position coordinates (PP, QQ) in the longitude and latitude plane into position coordinates (x2, y2) of the XY plane.

$$x2=\sin(R)$$

$$y2=\cos(R)$$

The Y coordinate of the position coordinates (PP, QQ) in the XYZ space is maintained even after the rotation, and y2 is none other than Y coordinate y3 of the position coordinates (x3, y3, z3) in the three-dimensional space to be obtained.

Furthermore, as illustrated in a lower part (b), the plane rotated in this way is rotated in the backward direction by the angle tt this time to restore the original plane 344 (however, defined in the XYZ space), and the position coordinates (x3, y3, z3) of the position coordinates (PP, QQ) in the XYZ space are eventually obtained as follows.

$$x3=x2*\cos(tt)$$

$$y3=y2$$

$$z3=x2*\sin(tt)$$

The process can be applied to all pixels of the image plane 340 illustrated in FIG. 30 to transform the image plane into the screen surface of the three-dimensional space. The screen surface is further transformed according to the posture (pan angle p, tilt angle q, roll angle r) of the virtual camera. In this case, the rotation in the roll direction about the Y-axis can be carried out at the same time as the rotation by the angle tt illustrated in (b) of FIG. 32. The transformation equations in this case are as follows.

$$x3=x2*\cos(tt+r)$$

$$y3=y2$$

$$z3=x2*\sin(tt+r)$$

Furthermore, position coordinates (x4, y4, z4) after the rotation in the tilt direction can be obtained by the following transformation equations.

$$x4=x3$$

$$y4=y3*\cos(q)+z3*\sin(q)$$

$$z4=y3*\sin(q)+z3*\cos(q)$$

Furthermore, position coordinates (x5, y5, z5) after the rotation in the pan direction can be obtained by the following transformation equations.

$$x5=y4*\cos(p)+z4*\sin(p)$$

$$y5=y4*\sin(p)+z4*\cos(p)$$

$$z5=z4$$

Furthermore, in a case where the position coordinates of the point of view are deviated by (Δx, Δy, Δz) from the origin, position coordinates (x6, y6, z6) moved parallel are further obtained as follows.

$$x6=x5+Dx$$

$$y6=y5+Dy$$

$$z6=z5+Dz$$

The process can realize the transformation into the region 320 illustrated in FIG. 27, and the corresponding point 328 on the chart 322 can be specified by the vector 326 from the point of view to the position coordinates after transformation. The point 328 can be set as a sampling point, and bilinear interpolation or the like can be appropriately applied to determine the pixel value. As a result, the pseudo images as illustrated in FIGS. 28 and 29 can be generated.

The transformation process from the two-dimensional space to the three-dimensional space illustrated in FIGS. 31 and 32 is reversible. That is, the procedure of obtaining the position coordinates (x3, y3, z3) of the three-dimensional space from the pixel array of (i, j) in the two-dimensional space corresponding to the original chart pattern can be followed backward to obtain the position coordinates (i, j) of the image of the original chart pattern from the position coordinates (x3, y3, z3). In other words, the two-dimensional information without the distortion can be generated from the three-dimensional information defining the distortion specific to the fish-eye lens.

The distortion correction unit 34 in the present embodiment uses this to execute a process opposite the process of generating the pseudo image executed by the pseudo image drawing unit 42 to thereby correct the image of the chart pattern in the captured image. Although the basic action of the distortion correction unit 34 is as illustrated in FIG. 9, the distortion correction unit 34 executes a process opposite the process of generating the pseudo image illustrated in FIGS. 31 and 32 in the distortion correction carried out in S44, S50, and S52. Because of the reversibility, it is only necessary to apply the recursive transformation process illustrated in FIG. 13 to the reverse process of the general distortion correction using the correction coefficient.

Figure 33:
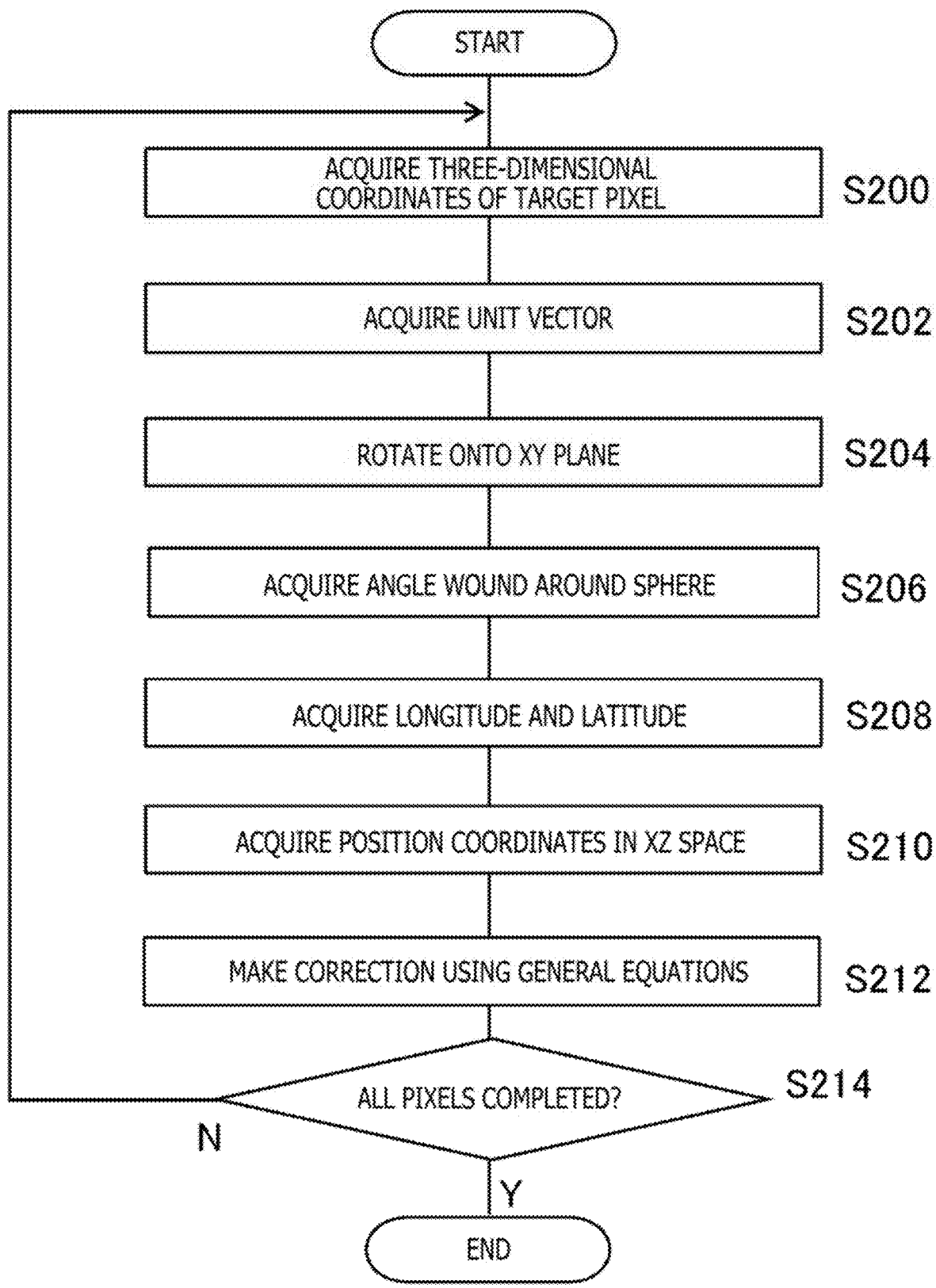
FIG. 33 is a flow chart illustrating a procedure of applying the distortion correction to the image of the chart pattern of the captured image executed by the distortion correction unit according to the present embodiment.

FIG. 33 is a flow chart illustrating a procedure of applying the distortion correction to the image of the chart pattern of the captured image executed by the distortion correction unit 34. First, a target pixel in the captured image is set, and position coordinates (x7, y7, z7) in the three-dimensional space are acquired from the position coordinates of the target pixel (S200). In the captured image of the equidistant projection exemplified in FIG. 24, the position of the pixel can be expressed by polar coordinates (r, θ) with the origin at the image center. Here, the distance r from the image center is proportional to the zenith angle when the optical axis is set vertically upward in the three-dimensional space, and the angle θ from the reference axis represents the azimuth in the three-dimensional space.

Therefore, the position coordinates (x7, y7, z7) in the three-dimensional space can be easily acquired from the position of the pixel in the captured image. In addition, a unit vector (x8, y8, z8) from the point of view toward the target pixel is obtained as follows (S202).

$$x8=x7/(x7^2+y7^2+z7^2)^{1/2}$$

$$y8=y7/(x7^2+y7^2+z7^2)^{1/2}$$

$$z8=z7/(x7^2+y7^2+z7^2)^{1/2}$$

Next, a process opposite of (b) in FIG. 32 is executed with the origin at the point of view. That is, a line connecting the origin and the position coordinates (x8, y8, z8) is rotated so that the line is positioned on the XY plane (S204). A rotation angle tta in this case can be obtained as follows.

$$tta=\operatorname{atan}(z8/x8)$$

In addition, the rotation changes the position coordinates (x8, y8, z8) to the following position coordinates (x9, y9, z9).

$$x9=x8/\cos(tta)$$

$$y9=y8$$

$$z9=0$$

Subsequently, a process opposite of (a) in FIG. 32 is executed. That is, an angle Ra of position coordinates (x9, y9) in the Z plane wound around the unit sphere is obtained (S206), and the angle Ra is rotated in the backward direction by the angle tta to restore the angle to thereby obtain longitude Pa1 and latitude Qa1 as follows (S208).

$$Ra = \mathrm{atan}(x9/y9)$$

$$Pa1 = Ra*\cos(tta)$$

$$Qa1 = Ra*\sin(tta)$$

In addition, opposite to (b) of FIG. 31, the pixel density dens that is the number of pixels per angle of view of 1° is used to obtain position coordinates (x10, z10) in the XZ space as follows (S210).

$$x10 = Pa1*dens$$

$$z10 = Qa1*dens$$

Furthermore, opposite to (a) of FIG. 31, the correction using the equations of general lens distortion and tangential distortion is applied to move the origin to the lower left to obtain the position coordinates in the original image plane (S212). The processes from S200 to S212 are executed for each pixel of the image of the chart pattern (N in S214), and the process ends once the position coordinates after transformation are obtained for all pixels (Y in S214). The process can obtain an image in which the grid of the chart pattern is substantially linear. The process of searching for the posture of the imaging apparatus that can obtain the orthogonality of the grid and searching for the angle of view and the correction coefficient that can obtain more accurate straight lines while performing the illustrated distortion correction is similar to Embodiment 1.

Incidentally, the position and the posture of the chart pattern are accepted in a wide range in the present embodiment, and there are various positions for the image of the chart pattern in the captured image as illustrated in FIG. 24. Therefore, preferably, the distortion correction unit 34 searches in advance for an approximate region of the chart pattern in the captured image and an approximate direction of the chart pattern in the three-dimensional space.

Figure 34:
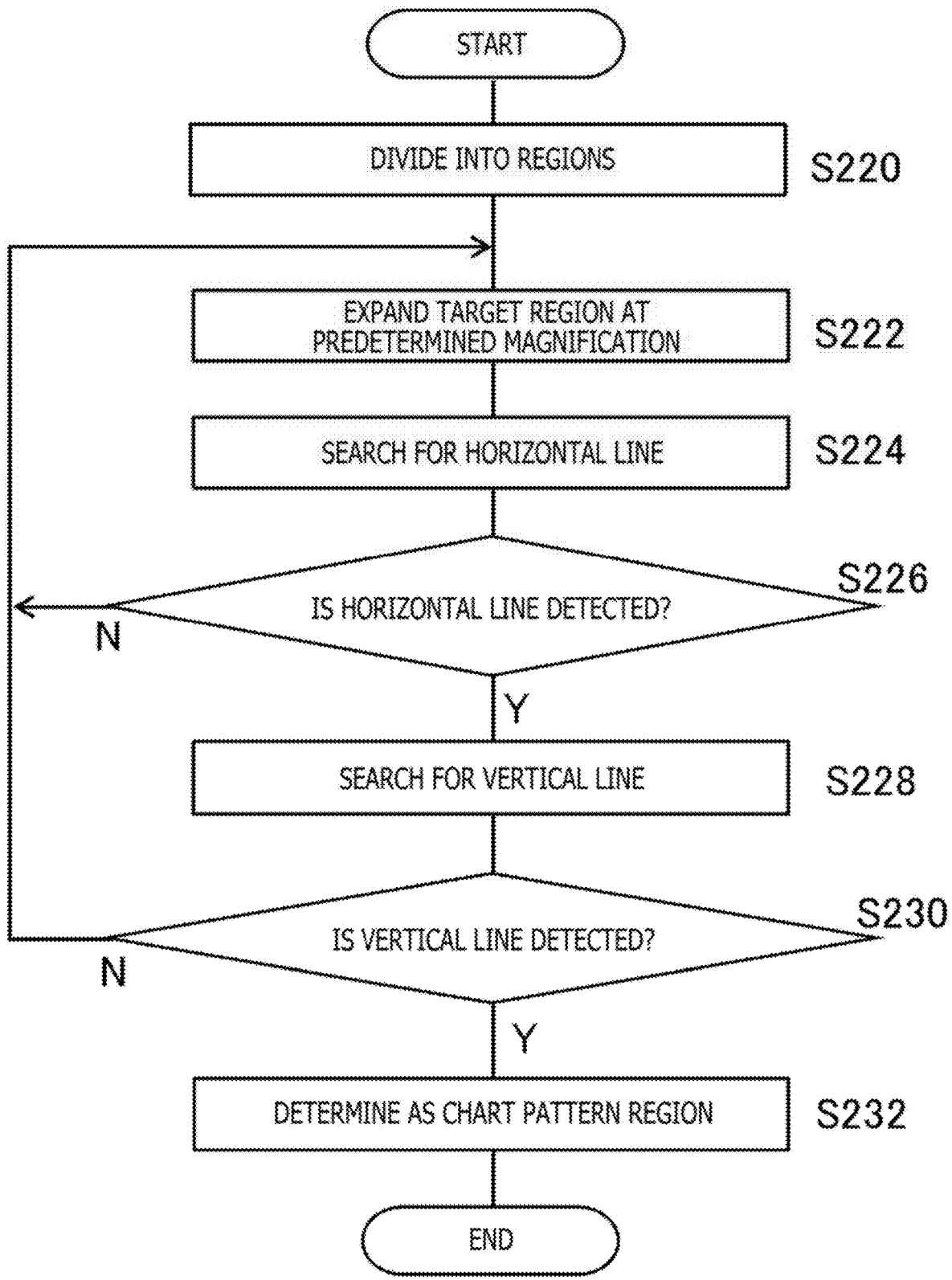
FIG. 34 is a flow chart illustrating a procedure of detecting a region of the chart pattern executed by the distortion correction unit according to the present embodiment.

FIG. 34 is a flow chart illustrating a procedure of detecting the region of the chart pattern executed by the distortion correction unit 34. The distortion correction unit 34 first divides the captured image into regions (S220). For example, the angle of view is divided by a predetermined number in the horizontal direction and the vertical direction to divide the captured image into regions on the image corresponding to each angle range. For example, in a case of the imaging apparatus with the angle of view of 210°, the captured image is divided every 70° to obtain 3×3 regions. Next, one of the regions is set as a target, and the image of the region is expanded to a separately prepared image plane at a predetermined magnification (S222).

Subsequently, a horizontal line of the grid lines of the chart pattern is searched from the expanded partial image (S224). The method illustrated in FIG. 14 can be used for the search. As a result of the search, in a case where an effective angle or position is not obtained (N in S226), the search for the horizontal line is repeated by changing the magnification of the image in the same region or setting again the next region as a target (S222, S224).

Once an efficient result is obtained in the search for the horizontal line (Y in S266), a vertical line is then similarly searched (S208). As a result of the search for the vertical line, in a case where an effective result is not obtained (N in S230), the search for the vertical line is performed again by changing the magnification in the same region or setting again the next region as a target (S222 to S228). In this way, once an effective result is also obtained in the search for the vertical line (Y in S230), it is determined that the region is a region in which the chart pattern is imaged (S232), and the search process ends.

The distortion correction process is applied to the region of the image of the chart pattern detected in the process, and the substantially linearly corrected chart pattern is used to obtain the posture of the imaging apparatus 12. The substantial procedure is as illustrated in FIG. 16. That is, the adjustment of the posture and the acquisition of the slope of the line are alternately repeated to bring the four outermost straight lines of the detected grid lines into line with the horizontal and vertical directions of the image plane.

FIG. 35 is a diagram for describing the parameters to be evaluated in the posture detection process of the imaging apparatus based on the orthogonality of the chart pattern. An illustrated rectangle represents the image plane, and straight lines illustrated inside indicate the four outermost straight lines of the detected grid lines or indicate two straight lines facing each other.

First, (a) illustrates a state without an error in any of the pan angle, the tilt angle, and the roll angle representing the posture of the imaging apparatus 12. In this case, four straight lines of the image of the grid are parallel to the horizontal direction and the vertical direction of the image plane as illustrated. On the other hand, (b) illustrates an image of the grid lines in a case where there is an error in the pan angle, (c) illustrates an image of the grid lines in a case where there is an error in the tilt angle, and (d) illustrates an image of the grid lines in a case where there is an error in the roll angle.

For example, in the state of (b), a difference epan between the slopes of upper and lower lines is evaluated as an error in the pan angle. The difference epan is positive when, for example, the right side is narrowed as illustrated. In the state of (c), a difference etil between the slopes of the left and right lines is evaluated as an error in the tilt angle. The difference etil is positive when, for example, the lower side is narrowed as illustrated. In the state of (d), an average value erol of the slopes of the upper, lower, left, and right straight lines is evaluated as an error in the roll angle. The average value erol is positive in, for example, the counter-clockwise direction as illustrated.

In Embodiment 1, it is assumed that the chart pattern is imaged from substantially the front. Therefore, an adjustment can be made by acquiring the errors epan, etil, and erol based on the relationships between the straight lines as illustrated and subtracting the epan, etil, and erol from the set pan angle, tilt angle, and roll angle, respectively, to converge the angles into correct pan angle, tilt angle, and roll angle. On the other hand, in the case where the state that the chart pattern is parallel to the optical axis is accepted as in the present embodiment, the correspondence between the positional relationship between the straight lines and the rotation direction with an error may change.

For example, in a case where there is a chart 360a directly facing the optical axis direction as viewed from the point of view 324 as illustrated in a bird's-eye view on the right side of FIG. 35, the condition of gap between the left and right straight lines changes as illustrated in (c) as a result of rotation in the tilt direction indicated by an arrow. On the other hand, in a case where a chart 360b close to parallel to the optical axis is right next to the optical axis, there is a change similar to the original rotation in the roll direction as illustrated in (d) as a result of the same rotation in the tilt direction. On the other hand, if the chart is rotated in the roll direction in the state of the chart 360b, there is a change similar to the original rotation in the tilt direction illustrated in (c). In this way, the evaluation parameters are switched between the roll and the tilt.

Similarly, in a case where the chart is right above or right below, the evaluation parameters are switched between the roll and the pan. Therefore, the switches are taken into account depending on the case, and the errors epan, etil, and erol are appropriately combined to calculate the errors in the pan angle p, the tilt angle q, and the roll angle r. Furthermore, the errors can be subtracted from the set values of the pan angle p, the tilt angle q, and the roll angle r until the errors become smaller than thresholds, and the posture of the imaging apparatus can be accurately acquired regardless of the position of the chart.

Figure 36:
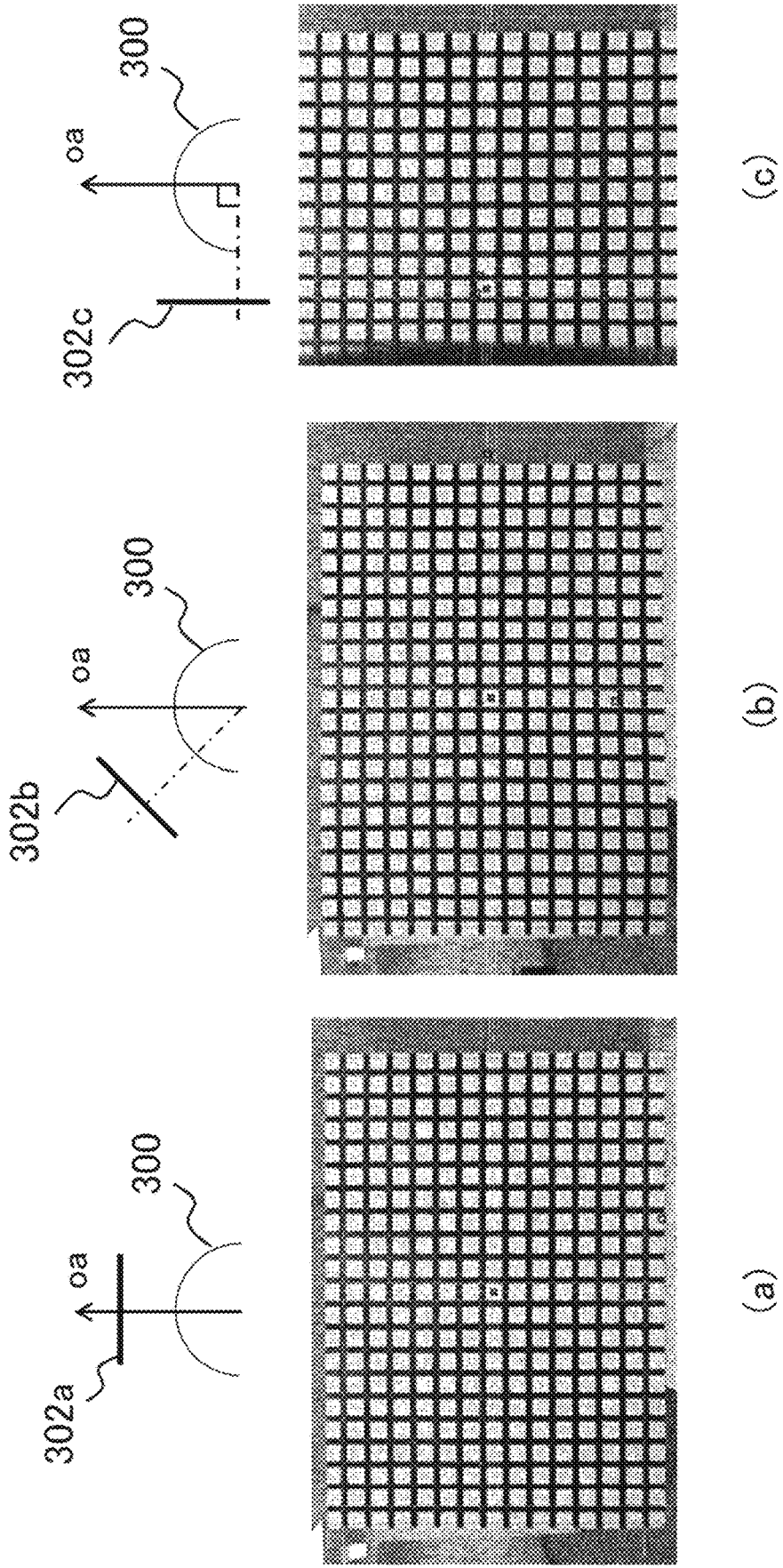
FIG. 36 is a diagram illustrating results of the correction of the image of the chart pattern in the captured image executed by the distortion correction unit according to the present embodiment.

Once the posture of the imaging apparatus 12 is obtained in this way, a procedure similar to the procedure illustrated in FIG. 17 is executed to adjust the correction coefficient and the angle of view until the image of the grid of the chart pattern indicates straight lines to thereby determine the final values of the correction coefficient and the angle of view. FIG. 36 illustrates results of the correction of the image of the chart pattern in the captured image executed by the distortion correction unit 34. Images of (a), (b), and (c) are images after correction generated from the captured images illustrated in (a), (b), and (c) of FIG. 24, respectively.

That is, (a) illustrates a correction result of the captured image of the case in which the chart surface 302a directly faces the screen surface 300, (b) illustrates a correction result of the captured image of the case in which the line perpendicular to the chart surface 302b is tilted 45° to the left with respect to the optical axis oa, and (c) illustrates a correction result of the captured image of the case in which the line perpendicular to the chart surface 302c is tilted 90° to the left with respect to the optical axis oa. It can be recognized that the chart pattern is favorably restored regardless of the position or the posture of the chart with respect to the lens.

In other words, the posture, the correction coefficient, and the angle of view of the imaging apparatus 12 can be accurately obtained without placing the chart at the center of the field of view to capture an image. The point-of-view adjustment unit 44 compares the chart pattern restored in this way and the chart pattern restored in a similar process applied to the pseudo image to acquire the position of the imaging apparatus 12. Here, a method similar to the method described in the present embodiment is also used to generate the pseudo image generated at the adjustment of the point of view.

In the mode described so far, it is assumed that the acceptable range of the position and the posture of the chart pattern of one surface is increased. This enables the calibration in the state in which part of the chart pattern is in a corner of the field of view. As a result, information processing using the captured image, such as imaging an object to progress a game according to the motion of the object and generating a display image in accordance with the field of view of the captured image, can be executed in parallel with the calibration. On the other hand, the chart pattern can include a plurality of surfaces as illustrated in FIGS. 28 and 29, and even an imaging apparatus that images the whole sky can accurately calibrate the entire field of view by one imaging.

FIG. 37 illustrates images obtained by restoring the chart of each surface from a pseudo image, in which the chart pattern is indicated inside the cube, and the images are captured at the angle of view of 220°, with the point of view at the center of the chart pattern. In this case, the definition of the three-dimensional space varies in each surface of the chart. Therefore, the correction process is executed by setting a region on the image corresponding to the angle of view including each surface, and the correction process is executed on the basis of this unit. According to the angle of view of 220°, the entire front side and part of the upper, lower, left, and right surfaces are imaged as illustrated in a captured image of (a). Five three-dimensional spaces can be set for the surfaces, and the correction process can be applied to each image to generate five corrected images as illustrated in (b). As illustrated, the chart pattern of all surfaces can be restored in the range in which the images are captured.

Replacing the situation illustrated in FIG. 37 with captured images, the correction process is independently applied as illustrated in (b) to each region cut out according to the angle of view in the images obtained by imaging a plurality of chart patterns at one time as illustrated in (a). As a result, the correction coefficients can be accurately obtained for all regions of the captured images. In addition, the information of the point of view and the posture can be obtained for each of the imaged surfaces. Therefore, the information can be combined to more accurately obtain the point of view, the posture, and the angle of view of the imaging apparatus.

FIG. 38 illustrates a result of restoration of the chart of a surface from a pseudo image in which it is assumed that the inside of the cube is imaged at an arbitrary posture. In FIG. 38, (a) illustrates a pseudo image with the pan angle of 60°, the tilt angle of 20°, and the roll angle of 45° illustrated in (d) of FIG. 28, and (b) illustrates an image after correction of a chart surface 370 positioned in front when the pan angle is 0°, the tilt angle is 0°, and the roll angle is 0°. In this case, the part corresponding to the original chart pattern is also accurately reproduced from only the part of the chart pattern in the field of view.

Replacing the situation illustrated in FIG. 38 with a captured image, an adjustment can be made until the original chart pattern as illustrated in (b) is obtained even if the posture in capturing the captured image illustrated in (a) is unknown and even if the correction coefficient and the angle of view are unknown. In this way, the parameters can be acquired.

According to the present embodiment described above, the image plane is provided as a spherical screen surface and mapped in the three-dimensional space to accurately reproduce the distortion specific to the fish-eye lens in the calibration using the characteristics of the fish-eye lens. In addition, the sphere is rotated about each axis to accurately reflect the change in the posture of the imaging apparatus on the image. There is no constraint condition regarding the optical axis in mapping the region including the image of the chart pattern to the sphere, and a similar process can be executed regardless of the location of the chart pattern in the captured image.

As a result, the accuracy is improved by reproducing the actual situation, and in addition, the acceptable range of the position and the posture of the chart pattern with respect to the field of view in imaging can be significantly increased. This further enables the calibration in the state in which only part of the chart pattern is in the field of view, and a process in parallel with the original operation process can improve the processing efficiency of the calibration and maintain the accuracy of the operation process.

In addition, since the transformation from the image plane into the sphere is a reversible process, the process of setting the reaching point and searching for the initial state leading to the reaching point can be minimized, and the processing efficiency and the accuracy of the calibration can be improved. Furthermore, the fact that there are few restrictions on the position and the posture of the chart pattern can be utilized to use the chart pattern with a plurality of surfaces to cover the angle of view of the captured image, and accurate calibration can be realized by one imaging regardless of the angle of view. As a result of these, advantageous effects similar to the advantageous effects described in Embodiment 1 can be applied in a wider imaging environment, and the versatility and the convenience can be improved.

Note that in the present embodiment, the chart pattern is also not limited to the grid with straight lines, and the chart pattern may be another pattern, such as the fractal barcode described in Embodiment 1. In addition, the modifications of the usage and the process of the calibration apparatus are similar to the modifications described in Embodiment 1.

REFERENCE SIGNS LIST

10 Calibration apparatus, 12 Imaging apparatus, 30 Captured image acquisition unit, 34 Distortion correction unit, 36 Image storage unit, 38 Parameter storage unit, 40 Chart image storage unit, 44 Point-of-view adjustment unit, 46 Output data generation unit, 122 CPU, 124 GPU, 126 Main memory, 200 Chart

INDUSTRIAL APPLICABILITY

In this way, the present invention can be used for various information processing apparatuses, such as a calibration apparatus, an imaging apparatus, an image processing apparatus, a display apparatus, a robot, and a personal computer, and for a system and the like including any of these.

The invention claimed is:

1. An apparatus comprising:
a calibration apparatus including:
a captured image acquisition unit that acquires data of a captured image of a calibration chart from an imaging apparatus including a fish-eye lens; and
a correction unit that corrects distortion caused by the fish-eye lens based on a relationship between a position on a screen corresponding to the fish-eye lens and a position on a surface of the chart imaged at the position and that evaluates the corrected image to derive and output a value of a parameter regarding the imaging apparatus,
wherein the correction unit obtains, for each pixel of the captured image, position coordinates on a sphere with a center at a point of view of the imaging apparatus in a three-dimensional space defined by an image plane parallel to the surface of the chart and by a line perpendicular to the surface of the chart and transforms, based on longitude and latitude coordinates of the sphere corresponding to the position coordinates, the position coordinates into position coordinates in a space of the image plane to thereby correct the distortion caused by the fish-eye lens.

2. The apparatus according to claim 1, wherein the correction unit compares an image, which is obtained by correcting the distortion caused by the fish-eye lens by making an assumption of an angle of view of the imaging apparatus, with a pattern of the chart to evaluate the image and derives the angle of view based on a result of the evaluation.

3. The apparatus according to claim 1, wherein the correction unit further makes an assumption of a posture of the imaging apparatus to perform projective transformation of the corrected image and compares the image with the pattern of the chart to make an evaluation to derive the posture based on a result of the evaluation.

4. The apparatus according to claim 1, further comprising:
a pseudo image drawing unit that arranges a virtual camera and an object model of the chart in a virtual three-dimensional space and that uses the value of the parameter to execute a process opposite the correction unit to generate a pseudo image of the captured image as an image captured by the virtual camera; and
a point-of-view adjustment unit that compares the generated pseudo image and the captured image to derive a position of the imaging apparatus with respect to the chart.

5. The apparatus according to claim 4, wherein
the correction unit applies, to the generated pseudo image, the same correction as the correction applied to the captured image, and
the point-of-view adjustment unit compares the corrected images to derive the position of the imaging apparatus.

6. The apparatus according to claim 1, wherein the correction unit makes a correction based on an angle formed by a line-of-sight vector to each pixel position in the captured image and an optical axis and then makes a correction based on a distance from a position corresponding to a lens center to each pixel position.

7. The apparatus according to claim 1, wherein the correction unit makes the correction while adjusting the parameter and repeats evaluation of a predetermined sampling point in the corrected image to determine the value of the parameter.

8. The apparatus according to claim 1, wherein the correction unit individually corrects the distortion caused by the fish-eye lens according to ranges of the angle of view of the imaging apparatus.

9. The apparatus according to claim 1, wherein the captured image acquisition unit acquires the data of the captured image of the chart including grid lines, which include a plurality of straight lines extending in a horizontal direction and a vertical direction of the image plane, and including a marker in a predetermined shape, which is arranged in a rectangular region at a predetermined position among rectangular regions surrounded by the straight lines.

10. The apparatus according to claim 1, wherein the captured image acquisition unit acquires the data of the captured image of the chart including a nested barcode array including a plurality of arrays of two-dimensional barcodes of a lower layer contained in an array of two-dimensional barcodes of an upper layer.

11. The apparatus of claim 1, further comprising the imaging apparatus including the fish-eye lens.

12. The apparatus according to claim 1, wherein
the captured image acquisition unit acquires data of an image obtained by imaging, at one time, the chart displayed on each of a plurality of surfaces at different angles, and
the correction unit defines a corresponding three-dimensional space for each surface of the chart to correct the distortion caused by the fish-eye lens to derive the value of the parameter.

13. An apparatus comprising:
a calibration apparatus including:
a captured image acquisition unit that acquires data of a captured image of a calibration chart from an imaging apparatus including a fish-eye lens;
a parameter acquisition unit that acquires a value of a parameter regarding the imaging apparatus;
a pseudo image drawing unit that arranges a virtual camera and an object model of the chart in a virtual three-dimensional space and that uses the value of the parameter to generate a pseudo image of the captured image as an image captured by the virtual camera; and
a point-of-view adjustment unit that compares the generated pseudo image and the captured image to derive a position of the imaging apparatus with respect to the chart.

14. The apparatus according to claim 13, wherein the pseudo image drawing unit transforms position coordinates of pixels of an image plane parallel to a surface of the chart into position coordinates on a screen surface on a sphere with a center at a point of view of the virtual camera in a three-dimensional space defined by the image plane and by a line perpendicular to the surface of the chart and acquires, for each of the pixels, a sampling point on the surface of the chart based on the point of view and the position coordinates after the transformation to thereby generate the pseudo image of the captured image.

15. The apparatus according to claim 14, wherein the pseudo image drawing unit transforms the position coordinates of the pixels of the image plane into longitude and latitude coordinates of the sphere to obtain corresponding positions on the sphere and obtains the position coordinates after the transformation in the three-dimensional space based on results of obtaining the positions.

16. The apparatus according to claim 14, wherein
the parameter acquisition unit acquires information regarding a posture of the imaging apparatus, and
the pseudo image drawing unit rotates the sphere in the three-dimensional space based on the posture to transform the position coordinates into position coordinates corresponding to the posture.

17. The apparatus of claim 13, further comprising the imaging apparatus including the fish-eye lens.

18. A calibration method, comprising:
acquiring data of a captured image of a calibration chart from an imaging apparatus including a fish-eye lens;
correcting distortion caused by the fish-eye lens based on a relationship between a position on a screen corresponding to the fish-eye lens and a position on a surface of the chart imaged at the position; and
evaluating the corrected image to derive and output a value of a parameter regarding the imaging apparatus,
wherein the correcting distortion includes obtaining, for each pixel of the captured image, position coordinates on a sphere with a center at a point of view of the imaging apparatus in a three-dimensional space defined by an image plane parallel to the surface of the chart and by a line perpendicular to the surface of the chart and transforms, based on longitude and latitude coordinates of the sphere corresponding to the position coordinates, the position coordinates into position coordinates in a space of the image plane to thereby correct the distortion caused by the fish-eye lens.

19. A non-transitory, computer-readable storage medium containing a computer program, which when executed by a computer, causes the computer to carry out actions, comprising:
acquiring data of a captured image of a calibration chart from an imaging apparatus including a fish-eye lens;
correcting distortion caused by the fish-eye lens based on a relationship between a position on a screen corresponding to the fish-eye lens and a position on a surface of the chart imaged at the position; and
evaluating the corrected image to derive and output a value of a parameter regarding the imaging apparatus,
wherein the correcting distortion includes obtaining, for each pixel of the captured image, position coordinates on a sphere with a center at a point of view of the imaging apparatus in a three-dimensional space defined by an image plane parallel to the surface of the chart and by a line perpendicular to the surface of the chart and transforms, based on longitude and latitude coordinates of the sphere corresponding to the position coordinates, the position coordinates into position coordinates in a space of the image plane to thereby correct the distortion caused by the fish-eye lens.

* * * * *